US012516892B2

(12) United States Patent
Mason et al.

(10) Patent No.: US 12,516,892 B2
(45) Date of Patent: Jan. 6, 2026

(54) INVERTED BAROCALORIC EFFECTS

(71) Applicant: President and Fellows of Harvard College, Cambridge, MA (US)

(72) Inventors: Jarad A. Mason, Cambridge, MA (US); Jinyoung Seo, Cambridge, MA (US); Adam H. Slavney, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 18/827,071

(22) Filed: Sep. 6, 2024

(65) Prior Publication Data

US 2025/0012516 A1    Jan. 9, 2025

Related U.S. Application Data

(63) Continuation of application No. PCT/US2023/035046, filed on Oct. 12, 2023.

(60) Provisional application No. 63/415,566, filed on Oct. 12, 2022.

(51) Int. Cl.
*F28D 20/02* (2006.01)
*C09K 5/06* (2006.01)
*C09K 5/14* (2006.01)

(52) U.S. Cl.
CPC ............ *F28D 20/02* (2013.01); *C09K 5/063* (2013.01); *C09K 5/14* (2013.01)

(58) Field of Classification Search
CPC ....... C09K 5/063; C09K 5/14; F28D 20/0056; F28D 2020/006; F28D 20/02; F25D 9/00
See application file for complete search history.

(56) References Cited

U.S. PATENT DOCUMENTS

| | | | |
|---|---|---|---|
| 7,575,804 B2 | 8/2009 | Lang-Wittkowski et al. | |
| 7,892,644 B2 | 2/2011 | Amrhein et al. | |
| 7,923,112 B2 | 4/2011 | Christ et al. | |
| 7,981,532 B2 | 7/2011 | Mori et al. | |
| 8,262,925 B2 | 9/2012 | Fieback et al. | |
| 8,304,075 B2 | 11/2012 | Lang-Wittkowski et al. | |
| 8,580,171 B2 | 11/2013 | Christ et al. | |
| 8,828,530 B2 | 9/2014 | Schutz et al. | |
| 9,797,087 B2 | 10/2017 | Hartmann et al. | |
| 10,468,164 B2 | 11/2019 | Heinemann et al. | |
| 10,800,130 B2 | 10/2020 | Büttner et al. | |
| 11,230,656 B2 | 1/2022 | Moya Raposo et al. | |
| 11,306,238 B2 | 4/2022 | Zahir et al. | |
| 11,312,655 B2 | 4/2022 | Wang et al. | |
| 11,332,650 B2 | 5/2022 | Zahir et al. | |
| 11,404,657 B2 | 8/2022 | Choy et al. | |
| 11,560,504 B2 | 1/2023 | Odukomaiya et al. | |
| 11,643,584 B2 | 5/2023 | DeWitt et al. | |
| 2012/0192979 A1 | 8/2012 | Barth et al. | |
| 2017/0130702 A1 | 5/2017 | Agnon et al. | |
| 2018/0371959 A1 | 12/2018 | Ebert et al. | |
| 2019/0032969 A1 | 1/2019 | Bartholome et al. | |
| 2020/0123426 A1 | 4/2020 | Moya Raposo et al. | |
| 2020/0332167 A1 | 10/2020 | Bermudez Garcia et al. | |
| 2020/0378655 A1 | 12/2020 | Schroeder | |
| 2021/0028319 A1 | 1/2021 | Snaith et al. | |
| 2021/0341232 A1 | 11/2021 | Kitanovski et al. | |
| 2022/0195281 A1 | 6/2022 | Bissell et al. | |
| 2022/0316809 A1 | 10/2022 | Rohskopf et al. | |
| 2024/0230171 A1 | 7/2024 | Mason et al. | |
| 2025/0020371 A1 | 1/2025 | Mason et al. | |

FOREIGN PATENT DOCUMENTS

| | | |
|---|---|---|
| CN | 107418517 A | 12/2017 |
| CN | 112503798 A | 3/2021 |
| CN | 114350325 A | 4/2022 |
| CN | 115181028 A | 10/2022 |
| EP | 3526302 B1 | 2/2023 |
| EP | 4407011 A1 | 7/2024 |
| ES | 2931216 A1 | 12/2022 |
| KR | 10-2021-0125501 A | 10/2021 |
| WO | WO-2022110508 A1 | 6/2022 |
| WO | WO-2022216969 A1 | 10/2022 |
| WO | WO-2023001018 A1 | 1/2023 |
| WO | WO-2023012393 A1 | 2/2023 |
| WO | WO-2023133909 A1 | 7/2023 |
| WO | WO-2024039720 A1 | 2/2024 |
| WO | WO-2024081374 A1 | 4/2024 |
| WO | WO-2024081377 A1 | 4/2024 |

OTHER PUBLICATIONS

Bermudez-Garcia et al. "a new playground for organic-inorganic hybrids: barocaloric materials for pressure-induced solid-state cooling", Journal of Physical Chemistry Letters, 2017, 8, 4419-4423. published online Sep. 21, 2017. (Year: 2017).*
Girdzis et al. "revealing local disorder in a silver-bismuth halide perovskite upon compression", Journal of Physical Chemistry Letters, 2021, 12, 532-536. Published online Dec. 30, 2020. (Year: 2020).*
U.S. Appl. No. 18/826,883, Mason et al.
"Energy Savings Potential and RD&D Opportunities for Commercial Building HVAC Systems" (U.S. Department of Energy, Office of Energy Efficiency and Renewable Energy, 2017) (172 pages).
"Energy Savings Potential and RD&D Opportunities for Non-Vapor-Compression HVAC Technologies" (U.S. Department of Energy, Office of Energy Efficiency and Renewable Energy, 2014) (199 pages).
"The future of cooling: Opportunities for energy efficient air conditioning" (International Energy Agency, 2018), (available at www.iea.org/reports/ the-future-of-cooling) (92 pages).
Abbate et al., Infrared and Raman intensities of polyethylene and perdeuteropolyethylene: Factor group splittings. J. Chem. Phys. 70, 3577-3585 (1979).
Almeida et al., Lamellar Metallo-Alkylphosphonates as Solid-State Phase-Change Materials. Chem. Mater. 7, 2039-2044 (1995).
Almirante et al., Mechanism of solid to liquidlike phase transition of alkyl chains in bilayer systems. An infrared spectroscopic study of tetradecylammonium tetrachloromanganate [CH3(CH2)13NH3]2MnCl4 and tetradecylammonium tetrachlorozincate [CH3(CH2)13NH3]2ZnCl4. J. Phys. Chem. 90, 852-859 (1986).

(Continued)

*Primary Examiner* — Jane L Stanley
(74) *Attorney, Agent, or Firm* — Clark & Elbing LLP

(57) ABSTRACT

The provided application describes methods and systems directed to the transfer of energy employing pressure sensitive materials.

30 Claims, 42 Drawing Sheets

(56) References Cited

OTHER PUBLICATIONS

Aprea et al., Solid-State Refrigeration: A Comparison of the Energy Performances of Caloric Materials Operating in an Active Caloric Regenerator. *Energy* 2018, 165, 439-455.
Arend et al., Layer perovskites of the (CnH2n+1NH3)2MX4 and NH3(CH2)mNH3MX4 families with M=Cd, Cu, Fe, Mn OR Pd and X=Ci OR Br: Importance, solubilities and simple growth techniques. J. Cryst. Growth. 43, 213-223 (1978).
Aznar et al., "Giant and Reversible Inverse Barocaloric Effects near Room Temperature in Ferromagnetic MnCoGeB0.03," Adv Mater. 31(37):e1903577 (Sep. 2019) (6 pages).
Aznar et al., Giant Barocaloric Effect in All-d-Metal Heusler Shape Memory Alloys. *Phys. Rev. Materials*, Feb. 2019, 3 (4), 044406 (7 pages).
Aznar et al., Giant barocaloric effects over a wide temperature range in superionic conductor AgI. Nature Communications. 8, 1-6 (2017).
Aznar et al., Reversible and irreversible colossal barocaloric effects in plastic crystals. J. Mater. Chem. A. 8, 639-647 (2019).
Barman et al., Phase Transitions in the Anchored Organic Bilayers of Long-Chain Alkylammonium Lead Iodides (CnH2n+1NH3)2PbI4; n=12, 16, 18. *J. Phys. Chem. B.* Feb. 2003, 107 (8), 1875-1883.
Bermúdez-García et al., "Giant barocaloric effect in the ferroic organic-inorganic hybrid [TPrA][Mn(dca)$_3$] perovskite under easily accessible pressures," Nat Commun. 8:15715, pp. 1-8, (Jun. 2017).
Bermúdez-García et al., Giant Barocaloric Tunability in [(CH3CH2CH2)4N]Cd[N(CN)2]3 Hybrid Perovskite. *J. Mater. Chem. C*, 6(37): 9867-9874 (Aug. 2018) (8 pages).
Billing et al., Synthesis, characterization and phase transitions of the inorganic-organic layered perovskite-type hybrids [(CnH2n+1NH3)2PbI4] (n=12, 14, 16 and 18). New J. Chem. 32, 1736-1746 (2008).
Bom et al., Giant Barocaloric Effects in Natural Rubber: A Relevant Step toward Solid-State Cooling. *ACS Macro Lett.* 7(1): 31-36 (Dec. 2017) (6 pages).
Booten et al., Theoretical Minimum Thermal Load in Buildings. Joule. 5: 24-46 (Jan. 2021) (23 pages).
Brown et al., A Review of Alternative Cooling Technologies. Applied Thermal Engineering 2014, 64 (1), 252-262.
Buergi et al., From crystal statics to chemical dynamics. Acc. Chem. Res. 16, 153-161 (1983).
Busico et al., Diffusion of Long Chain N-Alkylammonium Cations in Layer Compounds (n-CnH2n+1NH3)2MCl4. *Molecular Crystals and Liquid Crystals* 1983, 95 (3-4), 251-269.
Busico et al., The layer perovskites as thermal energy storage systems. Solar Energy. 24, 575-579 (1980).
Cameron et al., A fourier transform infrared study of the coagel to micelle transitions of sodium laurate and sodium oleate. Colloids and Surfaces. 4, 131-145 (1982).
Campbell et al., "Solving the global cooling challenge: How to counter the climate threat from room air conditioners" (Rocky Mountain Institute, 2018).
Cao et al., Layered Metal Phosphates and Phosphonates: From Crystals to Monolayers. Acc. Chem. Res. 1992, 25 (9), 420-427.
Casal et al., A vibrational spectroscopic characterization of the solid-phase behavior of n-decylammonium chloride (n-C10H21NH3Cl) and bis(n-decylammonium) tetrachlorocadmate (n-C10H21NH3)2CdCl4]. J. Phys. Chem. 89, 5557-5565 (1985) (9 pages).
Casal et al., Interchain vibrational coupling in phase II (hexagonal) n-alkanes. J. Chem. Phys. 77, 2825-2830 (1982).
Catalá, Nuria Pol, Thesis: "Barocaloric effects in crystal plastics" Graduate in Engineering in Industrial Technologies, Higher Technical School Industrial Engineering of Barcelona, Jun. 2016 (78 pages).
Chanh et al., "Structural and Vibrational Study of the Phase Transitions in Crystalline bis(n-decylammonium) tetrachlorocuprate", Molecular Crystals and Liquid Crystals Science and Technology. Section A. Molecular Crystals and Liquid Crystals. 238, 93-108 (1994) (17 pages).
Chanh et al., Polymorphism in organo-metallic bidimensional structures: The bis(n-octylammonium) tetrachlorocadmate. Journal of Physics and Chemistry of Solids. 44, 589-594 (1983).
Chanh et al., Polymorphism in the Bidimensional compound (n-C16H33NH3)2CdCl4. Journal of Physics and Chemistry of Solids. 50, 829-838 (1989).
Choy et al., X-ray diffraction, differential scanning calorimetry, and spectroscopic studies of phase transitions in FeOCl-n-alkylamine intercalation complexes. J. Solid State Chem. 77, 60-66 (1988).
Chupas et al., A versatile sample-environment cell for non-ambient X-ray scattering experiments. J Appl Cryst. 41, 822-824 (2008).
Ciajolo et al., Bis(n-Dodecylammonium) Tetrachlorozincate. *Acta Cryst B* 1977, 33 (2), 553-555.
Ciajolo et al., Comparative Studies of Layer Structures: The Crystal Structure of Bis(Monodecylammonium)tetrachloromanganate(II). Gazzetta Chimica Italiana. 106, 807-817 (1976) (11 pages).
Connor et al., Layered Halide Double Perovskites: Dimensional Reduction of Cs2AgBiBr6. *J. Am. Chem. Soc.* 2018, 140 (15), 5235-5240.
Coulomb, et al., "The Impact of the Refrigeration Sector on Climate Change," 35th Informatory Note on Refrigeration Technologies (International Institute of Refrigeration, 2017) pp. 1-17 (17 pages).
Crossley et al., "New developments in caloric materials for cooling applications" *AIP Advances* 5, 067153. Jun. 2015 (8 pages).
Dannenfelser et al., Estimation of Entropy of Melting from Molecular Structure :? A Non-Group Contribution Method. Ind. Eng. Chem. Res. 35, 1483-1486 (1996).
De Oliveira et al., Magnetocaloric and barocaloric effects: Theoretical description and trends, Effets magnétocaloriques et barocaloriques: Description théorique et tendances, *IJR*, vol. 37: 237-248 (Jun. 2013) (12 pages).
De Oliveira, "Barocaloric effect and the pressure induced solid state refrigerator" *J. Appl. Phys.* 109, 053515. (Mar. 2011) (3 pages).
Demo videos of an Organic Rankine Cycle by Turboden (an Italian energy company), Organic Rankine Cycle Solutions for Power Generation with Turbogenerators: retrieved on Oct. 23, 2024 at <https://www.turboden.com/products/2463/orc-system>. (12 pages).
Dolomanov et al., OLEX2: a complete structure solution, refinement and analysis program. J Appl Cryst. 42, 339-341 (2009) (5 pages).
Domalski et al., Heat Capacities and Entropies of Organic Compounds in the Condensed Phase. vol. III. Journal of Physical and Chemical Reference Data. 25, 1-523 (1996).
Domanski et al., A thermodynamic analysis of refrigerants: Performance limits of the vapor compression cycle. International Journal of Refrigeration. 38, 71-79 (2014).
Dunlap-Shohl et al., Synthetic Approaches for Halide Perovskite Thin Films. *Chem. Rev.* 119(5): 3193-3295 (Nov. 2018) (103 pages).
El-Sayed et al. A Review of the Potential Replacements of HCFC/HFCs Using Environment-Friendly Refrigerants. *Int. J. Air-Cond. Ref.* Jul. 2018, 26 (03), 1830002. (24 pages).
Engelbrecht et al., Future Prospects for Elastocaloric Devices. *J. Phys. Energy*, May 2019, 1 (2), 021001 (9 pages).
Fallahi et al., Review on solid-solid phase change materials for thermal energy storage: Molecular structure and thermal properties. Applied Thermal Engineering. 127, 1427-1441 (2017).
Fenrych et al., Molecular Motions and Phase Changes in the Perovskite-Type Compound (C13H27NH3)2ZnCl4. *Molecular Physics* 1993, 79 (3), 559-569.
Fultz et al., Phase Transitions in Materials (Cambridge University Press, Cambridge, United Kingdom; New York, 2nd edition., 2020).
Gabbott, Principles and Applications of Thermal Analysis (John Wiley & Sons, Ltd, 2008).
Gao et al., Phase Transitions in Lamellar Alkylphosphonate Salts. Chem. Mater. 9, 3113-3120 (1997).
Garimella, et al. "Electronics Thermal Management in Information and Communications Technologies: Challenges and Future Directions." *CTRC Research Publications*: Paper 321 (2017) (20 pages).

(56) References Cited

OTHER PUBLICATIONS

Goetzler, et al. Energy Savings Potential and RD&D Opportunities for Non-Vapor-Compression HVAC Technologies. Office of Energy Efficiency and Renewable Energy, U.S. Department of Energy Mar. 2014.

Gorev et al., T-p phase diagrams and the barocaloric effect in materials with successive phase transitions. J. Phys. D: Appl. Phys. 50, 384002: pp. 1-10 (2017).

Gottschall et al., Making a Cool Choice: The Materials Library of Magnetic Refrigeration. Advanced Energy Materials. 9, 1901322: pp. 1-13 (Jul. 2019).

Guillaume et al., Molecular motions of decylammonium chains in the perovskite type layered compound (C10H21NH3)2MnCl4. Molecular Physics. 67(3) 665-679 (1989) (15 pages).

Gutfleisch et al., Mastering hysteresis in magnetocaloric materials. Philosophical Transactions of the Royal Society A, 374, 20150308: pp. 1-21 (2016).

Gómez, Lorena Iglesias, Thesis: "Colossal barocaloric effects on neopentane-derived plastic crystals" Graduate in Engineering in Industrial Technologies, Higher Technical School Industrial Engineering of Barcelona, 2016 (101 pages).

Heinz et al., Self-Assembly of Alkylammonium Chains on Montmorillonite: Effect of Chain Length, Head Group Structure, and Cation Exchange Capacity. Chem. Mater. 19, 59-68 (2007).

Hess et al., Thermal hysteresis and its impact on the efficiency of first-order caloric materials. Journal of Applied Physics. 127, 075103 (2020).

Hoffmann et al., Flexible Molecules with Defined Shape-Conformational Design. Angew. Chem. Int. Ed. 31, 1124-1134 (1992).

Hoshino et al., Negative-to-Positive Thermal Conductivity Temperature Coefficient Transition Induced by Dynamic Fluctuations of the Alkyl Chains in the Layered Complex (C4H9NH3)2CuCl4. Chemistry—A European Journal. 26, 2610-2618 (2020).

Hung, "Waste heat recovery of organic Rankine cycle using dry fluids" Energy Conversion & Management. 42: 539-553 (2001) (15 pages).

Höhne et al., Differential Scanning Calorimetry, Second Edition. Springer-Verlag 2003, pp. 1-298 (301 pages).

Höhne et al., On the pressure dependence of the heat of fusion and melting temperature of indium. Thermochimica Acta. 273, 17-24 (1996).

Jaffe et al., High Compression-Induced Conductivity in a Layered Cu—Br Perovskite. *Angewandte Chemie International Edition*, Wiley Online Library, 10.1002/anie.201912575 (Dec. 2019) (8 pages).

Kahwaji et al., A comprehensive study of properties of paraffin phase change materials for solar thermal energy storage and thermal management applications. Energy. 162, 1169-1182 (2018).

Kang et al., Phase transition behavior in the perovskite-type layer compound (n-C12H25NH3)2CuCl4. J. Phys. Chem. Solids. 54, 1567-1577 (1993).

Kenisarin, Thermophysical Properties of Some Organic Phase Change Materials for Latent Heat Storage. A Review. *Solar Energy* 2014, 107, 553-575.

Kind et al., Erratum: Dynamics of the n-decylammonium chains in the perovskite-type layer structure compound (C10H21NH3)2CdCl4. J. Chem. Phys. 71, 2118-2130 (1979).

Kitanovski et al., Present and Future Caloric Refrigeration and Heat-Pump Technologies. *International Journal of Refrigeration* 2015, 57, 288-298.

Koželj et al., 13C Nmr study of the "bilayer" phase transitions in (C10H21NH3)2CuCl4. J. Chem. Phys. 74, 4123-4129 (1981).

Landi et al., Metal-Dependent Thermal Behaviour in (n-CnH2n+1NH3)2MCl4. *Thermochimica Acta* 1975, 13 (4), 441-447.

Landi et al., New Disordered Polymorphs in Long Chain Alkylammonium Tetrachlorocobaltates(II). *Thermochimica Acta* 1975, 12 (2), 141-146.

Ledru et al., High pressure differential scanning calorimetry: Aspects of calibration. Thermochimica Acta. 446, 66-72 (2006).

Lemmerer et al., Synthesis, characterization and phase transitions of the inorganic-organic layered perovskite-type hybrids [(CnH2n+1NH3)2PbI4], n=7, 8, 9 and 10. Dalton Trans. 41(4): 1146-1157 (Jan. 2012) (12 pages).

Li et al., "Colossal reversible barocaloric effects in layered hybrid perovskite $(C_{10}H_{21}NH_3)_2MnCl_4$ under low pressure near room temperature," Adv Funct Mater. 31:2105154 pp. 1-8 (Aug. 2021).

Li et al., Colossal barocaloric effects in plastic crystals. Nature. 567, 506-510, and methods and figures (Mar. 2019) (17 pages).

Li et al., Conformational disorder of organic cations tunes the charge carrier mobility in two-dimensional organic-inorganic perovskites. Nature Communications. 11: 5481 (Oct. 2020) (8 pages).

Li et al., Reversible barocaloric effects over a large temperature span in fullerite C60. J. Mater. Chem. A. 8, 1-9 (2020).

Li et al., Soft Perovskite-Type Antiferroelectric with Giant Electrocaloric Strength near Room Temperature. J. Am. Chem. Soc. 142, 20744-20751 (2020).

Li et al., Study of solid-solid phase change of (n-CnH2n+1NH3)2MCl4 for thermal energy storage. Thermochimica Acta. 326, 183-186 (1999).

Li et al., The 2D Halide Perovskite Rulebook: How the Spacer Influences Everything from the Structure to Optoelectronic Device Efficiency. Chem. Rev. 121, 2230-2291 (Feb. 2021).

Li, et al., High-Temperature Phase Transitions, Switchable Dielectric Behaviors and Barocaloric Effects in Three New Organic Molecule-Based Crystals. *New Journal of Chemistry* 2019, 43 (1), 154-161.

Lin et al., Giant room-temperature barocaloric effect at the electronic phase transition in Ni1—xFexS. Mater. Horiz. 7, 2690-2695 (Jul. 2020) (6 pages).

Liu et al., Direct and Indirect Measurements on Electrocaloric Effect: Recent Developments and Perspectives. *Applied Physics Reviews*, Jul. 2016, 3: 031102 (19 pages).

Liu et al., Response of Methylammonium Lead Iodide to External Stimuli and Caloric Effects from Molecular Dynamics Simulations. *J. Phys. Chem. C* 2016, 120 (31), 17274-17281.

Lloveras et al., Colossal barocaloric effects near room temperature in plastic crystals of neopentylglycol. Nat Commun. 10:1803 (Apr. 2019) (7 pages).

Lloveras et al., Giant barocaloric effects at low pressure in ferrielectric ammonium sulphate. Nat Commun. 6, 1-6 (2015).

Lu et al. "Mechanocaloric materials for solid-state cooling" *Science Bulletin* 60(19) pp. 1638-1643 (Sep. 2015) (6 pages).

Mao et al., Two-Dimensional Hybrid Halide Perovskites: Principles and Promises. *J. Am. Chem. Soc.* 2019, 141 (3), 1-22.

Maroncelli et al., Nonplanar conformers and the phase behavior of solid n-alkanes. J. Am. Chem. Soc. 104, 6237-6247 (1982).

Masche et al., Impact of hysteresis on caloric cooling performance. International Journal of Refrigeration. 121, 302-312 (2021).

Mathey et al., Phase transitions in layer-intercalation compounds of nickel cyanide with n-alkylamines. J. Phyique Lett. 36, 243-245 (1975).

Matsunami et al., Giant Barocaloric Effect Enhanced by the Frustration of the Antiferromagnetic Phase in Mn3GaN. *Nature Mater* 2015, 14 (1), 73-78.

Mañosa et al., Advanced materials for solid-state refrigeration. Journal of Materials Chemistry A. 1, 4925-4936 (2013).

Mañosa et al., Giant Solid-State Barocaloric Effect in the Ni—Mn—In Magnetic Shape-Memory Alloy. *Nature Mater* 2010, 9 (6), 478-481.

Mañosa et al., Inverse Barocaloric Effect in the Giant Magnetocaloric La—Fe—Si—Co Compound. *Nat Commun* 2011, 2 (1), 1-5.

Mañosa et al., Materials with Giant Mechanocaloric Effects: Cooling by Strength. Advanced Materials. 29, 1603607: 1-25 (2017).

Mañosa et al., Solid-state cooling by stress: A perspective. Appl. Phys. Lett. 116, 050501 (2020) (8 pages).

McGillicuddy et al., Metal-Organic Phase-Change Materials for Thermal Energy Storage. J. Am. Chem. Soc. 142, 19170-19180 (2020).

McLinden et al., New refrigerants and system configurations for vapor-compression refrigeration. Science. 370, 791-796 (2020).

(56) References Cited

OTHER PUBLICATIONS

McLinden et al., Thermophysical properties of refrigerants. ASHRAE Handbook: Fundamentals. (ASHRAE, Atlanta, 2009) (75 pages).
Mitzi, Synthesis, Structure, and Properties of Organic-Inorganic Perovskites and Related Materials. *Progress in Inorganic Chemistry*; John Wiley & Sons, Ltd, vol. 48:; pp. 1-121 (1999) (121 pages).
Morss et al., Preparation of Cubic Chloro Complex Compounds of Trivalent Metals: Cs2NaMCl6. *Inorg. Chem.* 1970, 9 (7), 1771-1775.
Moya et al. Caloric Materials near Ferroic Phase Transitions. *Nature Materials* 13(5): 439-450 (Apr. 2014) (12 pages).
Moya et al., Caloric materials for cooling and heating. Science. 370, 797-803 (2020).
Nair et al., Large electrocaloric effects in oxide multilayer capacitors over a wide temperature range. Nature. 575, 468-472 (Oct. 2019).
Needham et al., Phase transitions in crystalline models of bilayers. 1. Differential scanning calorimetric and x-ray studies of (C12H25NH3)2MCl4 and (NH3C14H29NH3)2MCl4 salts (M=Mn2+, Cd2+, Cu2+). J. Phys. Chem. 88, 674-680 (1984).
Nikitin et al., The Magnetocaloric Effect in Fe49Rh51 Compound. *Physics Letters A* 1990, 148 (6), 363-366 (5 pages).
Ning, Characterization of the Solid-Phase Behavior of n-Nonylammonium Tetrachlorocuprate by Fourier Transform Infrared Spectroscopy. Journal of Solid State Chemistry. 117, 97-102 (1995) (7 pages).
Osman et al., Structure and Properties of Alkylammonium Monolayers Self-Assembled on Montmorillonite Platelets. J. Phys. Chem. B. 108, 2580-2588 (2004).
Parikh et al., Characterization of Chain Molecular Assemblies in Long-Chain, Layered Silver Thiolates: A Joint Infrared Spectroscopy and X-ray Diffraction Study. J. Phys. Chem. B. 103, 2850-2861 (1999).
Patel et al. "Elastocaloric and barocaloric effects in polyvinylidene di-fluoride-based polymers" *Appl. Phys. Lett.* 108, 072903 (Feb. 2016) (5 pages).
Pechhold et al., On Present Theories of the Condensed Polymer State, Pergamon Press, Pure & Appl. Chem., vol. 46, pp. 127-134. (1976) (8 pages).
Pechhold, Molekülbewegung in Polymeren. Kolloid-Z.u.Z. Polymere. 228, 1-38 (1968).
Qin et al., "Tuning pressure-induced phase transitions, amorphization, and excitonic emissions of 2D hybrid perovskites via varying organic amine cations," J Phys Chem C. 123:22491-8 (2019).
Ricard et al., Vibrational study of the dynamics of n-alkylammonium chains in the perovskite-type layer compounds (CnH2n+1NH3)2CdCl4 (n=8, 12, 16). J. Phys. Chem. 89, 4887-4894 (1985).
Ricard et al., Vibrational study of the dynamics of n-decylammonium chains in the perovskite-type layer compound (C10H21NH3)2CdCl4. J. Phys. Chem. 88, 5614-5620 (1984).
Rodriquez et al. "Thermoelastic temperature changes in poly(methyl methacrylate) at high hydrostatic pressure: Experimental" *J. Appl. Phys.* 53(10): 6536-6540 (Oct. 1982) (5 pages).
Romanini et al., Giant and Reversible Barocaloric Effect in Trinuclear Spin-Crossover Complex Fe3(bntrz)6(tonset)6. Advanced Materials. 33, 2008076: pp. 1-9 (Feb. 2021).
Salerno et al., Ordered and Disordered Phases in Mixed Dodecylammonium and Hexadecylammonium Tetrachloromanganate(II). *J. Phys. Chem.* 1976, 80 (22), 2444-2448.
Salgado-Beceiro et al., Near-room-temperature reversible giant barocaloric effects in [(CH3)4N]Mn[N3]3 hybrid perovskite. Mater. Adv. 1, 3167-3170 (2020) (5 pages).
Samara et al., Effects of pressure and ambient species on the orientational ordering in solid C60. Phys. Rev. B. 47(8): 4756-4764 (Feb. 1993) (9 pages).
Sari et al., Thermal conductivity and latent heat thermal energy storage characteristics of paraffin/expanded graphite composite as phase change material. Applied Thermal Engineering. 27, 1271-1277 (2007) (8 pages).

Seo et al., "Barocaloric Effects in Dialkylammonium Halide Salts" *J. Am. Chem. Soc.* Jan. 2024, 146, 2736-2747.
Seo et al., "Colossal Barocaloric Effects with Ultralow Hysteresis in Two-Dimensional Metal-Halide Perovskites" *Nat. Commun.* May 2022, 13:2536 (15 pages).
Seo et al., "Driving Barocaloric Effects in a Molecular Spin-Crossover Complex at Low Pressures" *J. Am. Chem. Soc.* Apr. 2022, 144, 6493-6503.
Sharma et al., Review on Thermal Energy Storage with Phase Change Materials and Applications. *Renewable and Sustainable Energy Reviews* 13(2): 318-345 (2009) (28 pages).
Shchukina et al., Nanoen-capsulation of phase change materials for advanced thermal energy storage systems. Chem. Soc. Rev. 47, 4156-4175 (2018).
Sheldrick, Crystal structure refinement with SHELXL. Acta Cryst C. 71, 3-8 (2015).
Sheldrick, SHELXT—Integrated space-group and crystal-structure determination. Acta Cryst A. 71, 3-8 (2015).
Smith et al., Between the Sheets: Postsynthetic Transformations in Hybrid Perovskites. Chem. Mater. 29, 1868-1884 (2017) (17 pages).
Smith et al., The Diversity of Layered Halide Perovskites. Annual Review of Materials Research. 48, 111-136 (2018) (26 pages).
Snyder et al., C—H stretching modes and the structure of n-alkyl chains. 1. Long, disordered chains. J. Phys. Chem. 86, 5145-5150 (1982).
Snyder, Vibrational spectra of crystalline n-paraffins: II. Intermolecular effects. Journal of Molecular Spectroscopy. 7, 116-144 (1961).
Snyder, Vibrational spectra of crystalline n-paraffins: Part I. Methylene rocking and wagging modes. Journal of Molecular Spectroscopy. 4, 411-434 (1960).
Snyder, Vibrational Study of the Chain Conformation of the Liquid n-Paraffins and Molten Polyethylene. J. Chem. Phys. 47(4), 1316-1360 (Aug. 1967) (46 pages).
Steinert et al., Thermal characteristics of solid-solid phase transitions in long-chain dialkyl ammonium salts. Thermochimica Acta. 435, 28-33 (2005) (7 pages).
Stern-Taulats et al., Barocaloric and magnetocaloric effects in Fe49Rh51. Phys. Rev. B. 89:214105: pp. 1-8 (2014) (9 pages).
Stern-Taulats et al., Inverse Barocaloric Effects in Ferroelectric BaTIO3 Ceramics. *APL Materials*, Sep. 2016, 4(9):091102 pp. 1-7.
Stern-Taulats et al., Multicaloric materials and effects. MRS Bulletin. 43, 295-299 (2018) (6 pages).
Takeuchi et al., Solid-state cooling with caloric materials. Physics Today. 68: 48-54 (Dec. 2015) (7 pages).
Temperley, Residual Entropy of Linear Polymers. J. Res. Natl. Bur. Stand. 56, 55-66 (1956).
Turturro et al., Conformational contribution to the entropy of melting. I. Linear chain hydrocarbons. J. Chem. Phys. 62, 1668-1673 (1975) (7 pages).
UNEP 2010 Report of the Refrigeration, Air Conditioning and Heat Pumps Technical Options Committee 2011 (245 pages).
United Nations Environment Programme. The Importance of Energy Efficiency in the Refrigeration, Air-Conditioning and Heat Pump Sectors. Briefing Note A. United Nations Environment Programme, May 2018, pp. 1-15.
Vacatello et al., Relationships between structure and properties in long-chain bis(n-alkylammonium)tetrabromocuprates(II) and bis(n-alkylammonium)tetrabromomanganates(II). J. Chem. Soc., Faraday Trans. 1. 77, 2367-2375 (1981).
Vacatello, Solid-Solid Phase—Transitions in Compounds of Type (N-CNH2N 1NH3)2CuCl4, Ann. Chim. Rome. 64: 13-18 (1974) (7 pages).
Vaia et al., Interlayer Structure and Molecular Environment of Alkylammonium Layered Sili-cates. Chem. Mater. 6, 1017-1022 (1994).
Vallone et al., Giant Barocaloric Effect at the Spin Crossover Transition of a Molecular Crystal. Advanced Materials. 31, 1807334 (2019) (20 pages).
Van Oort et al., A linear entropy relationship for fusion of n-alkyl chains. Thermochimica Acta. 86, 1-6 (1985).
Van Oort et al., General trends in phase transitions in an homologous series. Polymorphism in (n-C6H13NH3)2MnCl4 as deter-

(56) References Cited

OTHER PUBLICATIONS mined by adiabatic calorimetry from 18 K to 313 K. J. Chem. Soc., Faraday Trans. 1. 81, 3059-3065 (1985).

Van Oort et al., Polymorphism in Dialkylammonium Chlorides. An Adiabatic Calorimetry Study. Berichte der Bunsengesellschaft für physikalische Chemie. 92, 168-176 (1988) (9 pages).

Walker et al., Complexes between n-alkylamines and nickel cyanide. Trans. Faraday Soc. 63, 166-174 (1967).

Wang et al., Electric-field-induced phase transition in 2D layered perovskite (BA)2PbI4 microplate crystals. Appl. Phys. Lett. 116, 051102: pp. 1-4 (Feb. 2020) (5 pages).

White et al., Polymorphism in (n-C7H15NH3)2MnCl4 and (n-C7H15NH3)2CdCl4 as determined by heat-capacity measurements from 10 to 325 K. J. Chem. Soc., Faraday Trans. 2. 79, 1653-1661 (1983).

Whitman et al., Characterization of thermal performance of a solid-solid phase change material, di-n-hexylammonium bromide, for potential integration in building materials. Thermochimica Acta. 531, 54-59 (2012) (7 pages).

Würflinger A., Differential thermal analysis under high pressure IV: Low-temperature DTA of solid-solid and solid-liquid transitions of several hydrocarbons up to 3 kbar. Berichte der Bunsengesellschaft für physikalische Chemie. 79, 1195-1201 (1975).

Würflinger, Conformational properties of n-alkanes. Colloid & Polymer Sci. 262, 115-118 (1984).

Xie et al. "Demonstration of liquid crystal for barocaloric cooling application." arXiv:1609.07939. Sep. 2016 (6 pages).

Yuce et al., Barocaloric Effect in the Magnetocaloric Prototype $Gd_5Si_2Ge_2$. *Appl. Phys. Lett.* 101 (7), 071906: pp. 1-4 (Aug. 2012) (5 pages).

Zbinden, Infrared Spectroscopy of High Polymers, table of contents, Academic Press, 1964 (8 pages).

Zerbi et al., Molecular mechanics for phase transition and melting of n-alkanes: A spectroscopic study of molecular mobility of solid n-nonadecane. J. Chem. Phys. 75, 3175-3194 (Oct. 1981) (21 pages).

Zerbi, Static and dynamic structural properties of macromolecules from FT vibrational spectroscopy. Mikrochim Acta. 93, 325-335 (1987).

\* cited by examiner

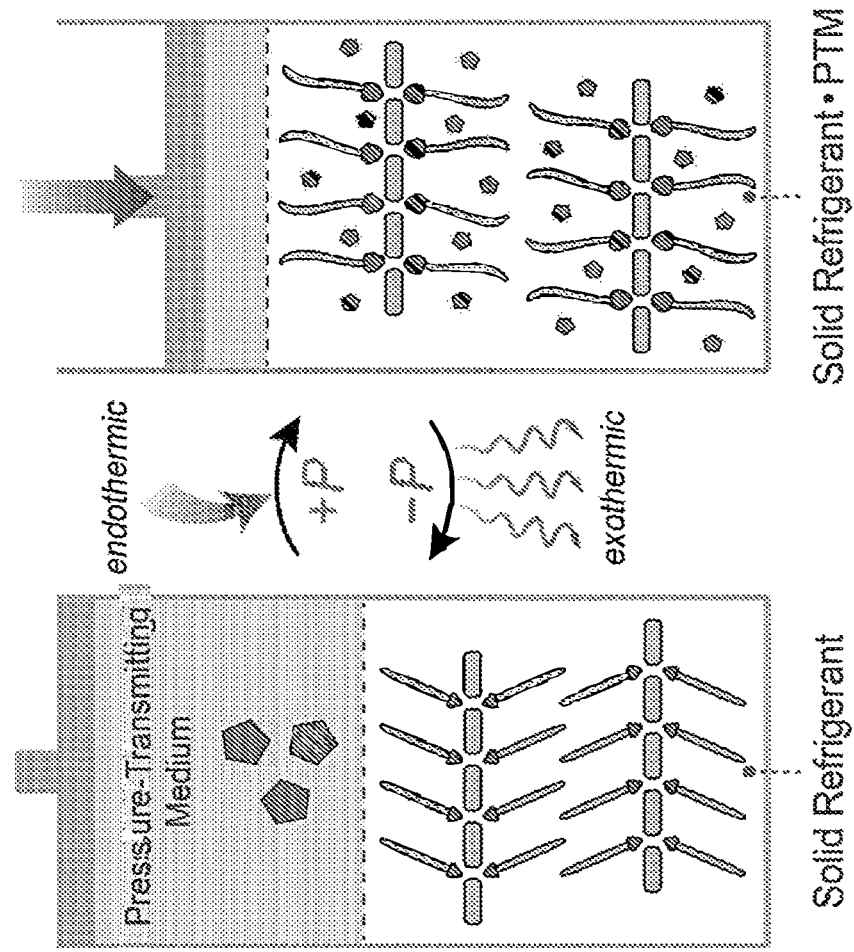

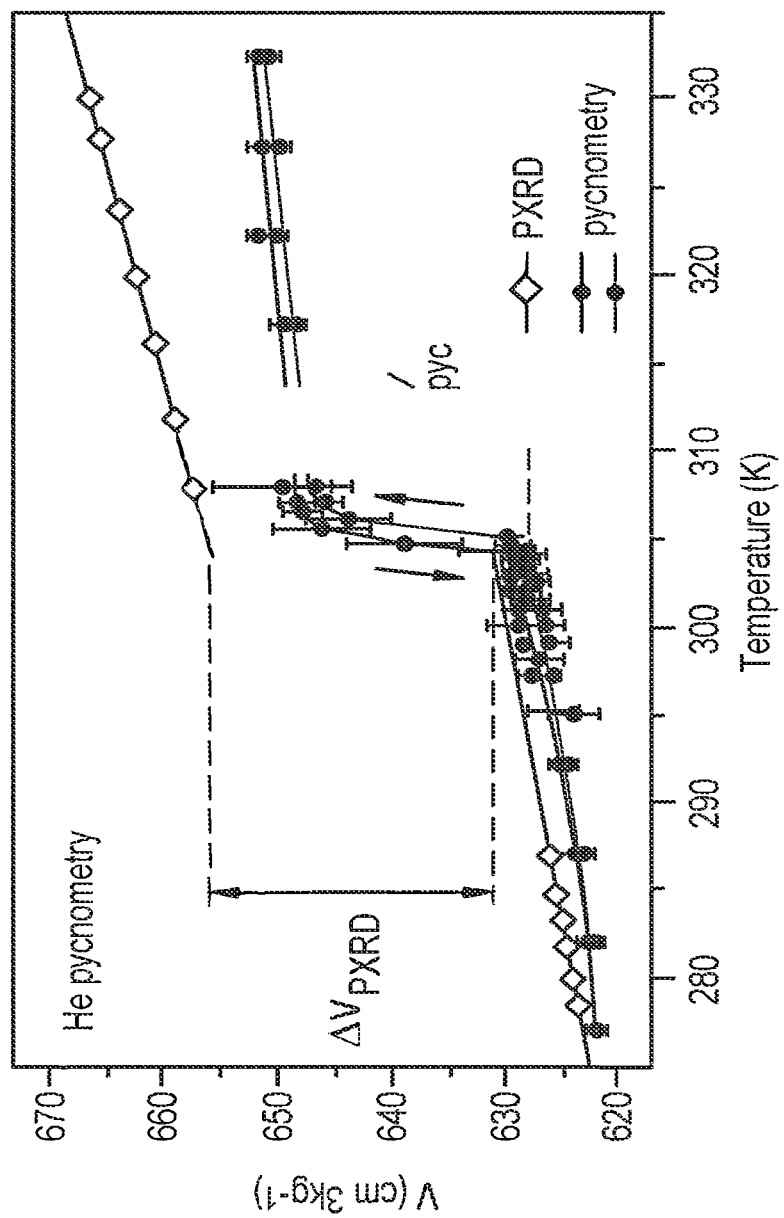

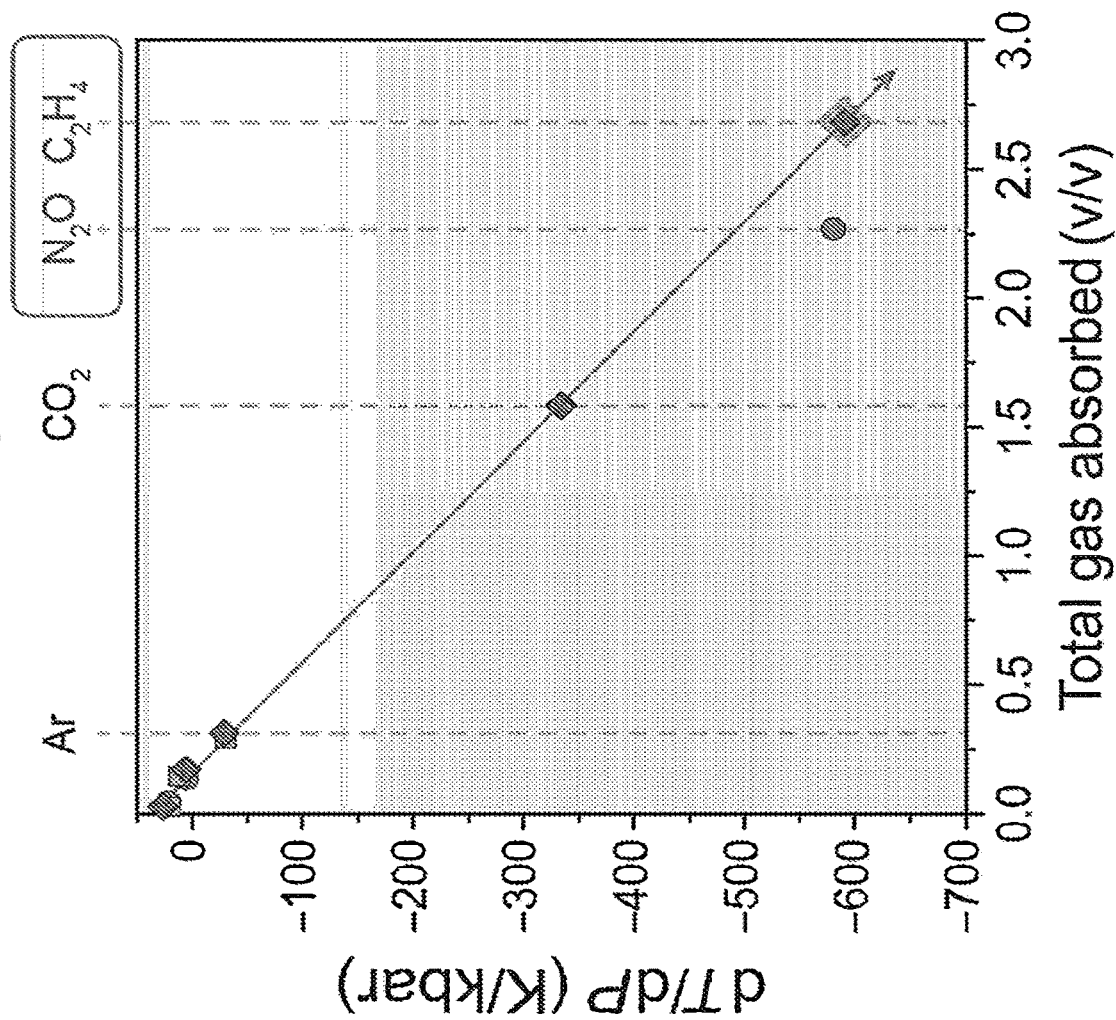

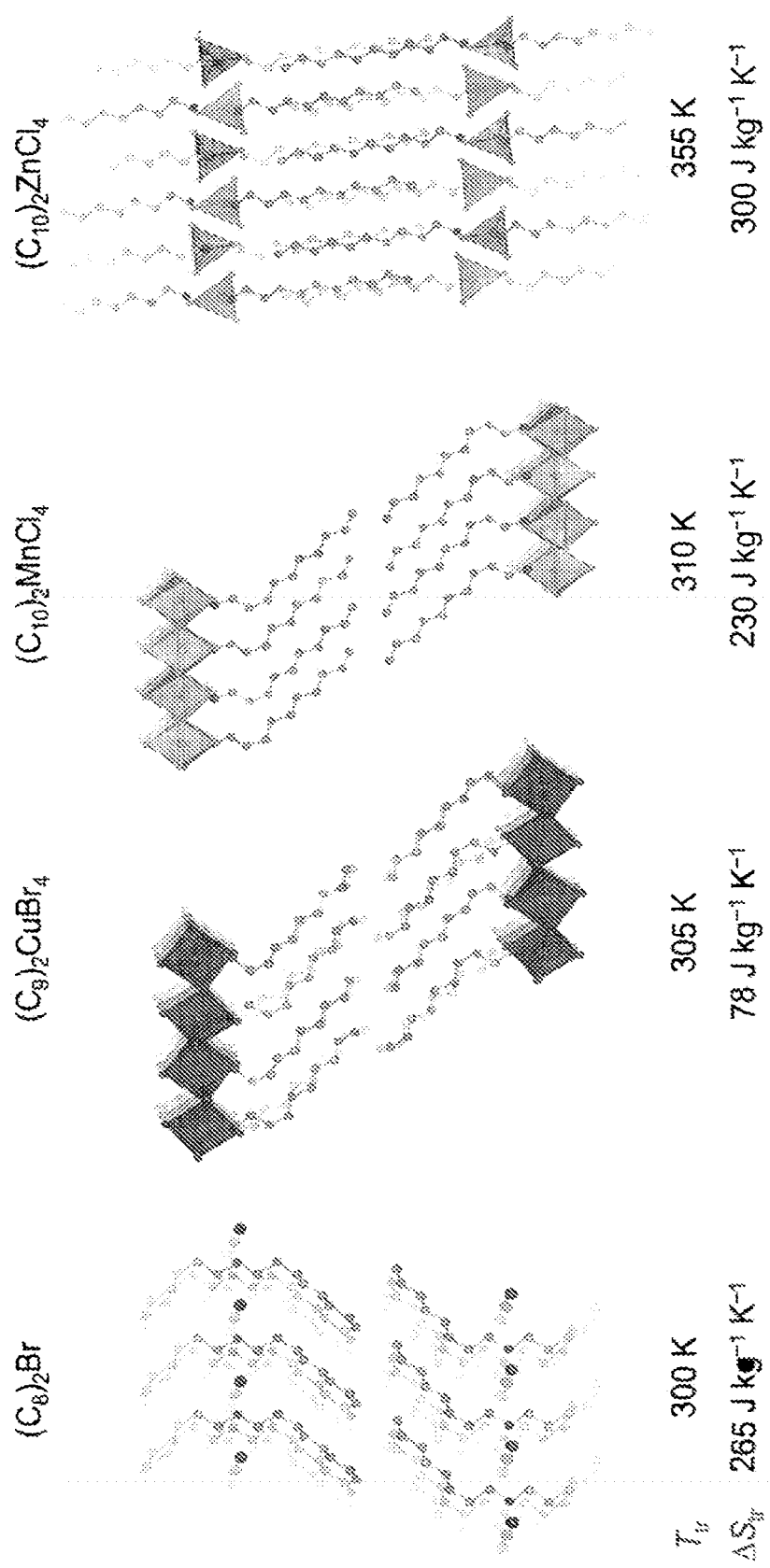

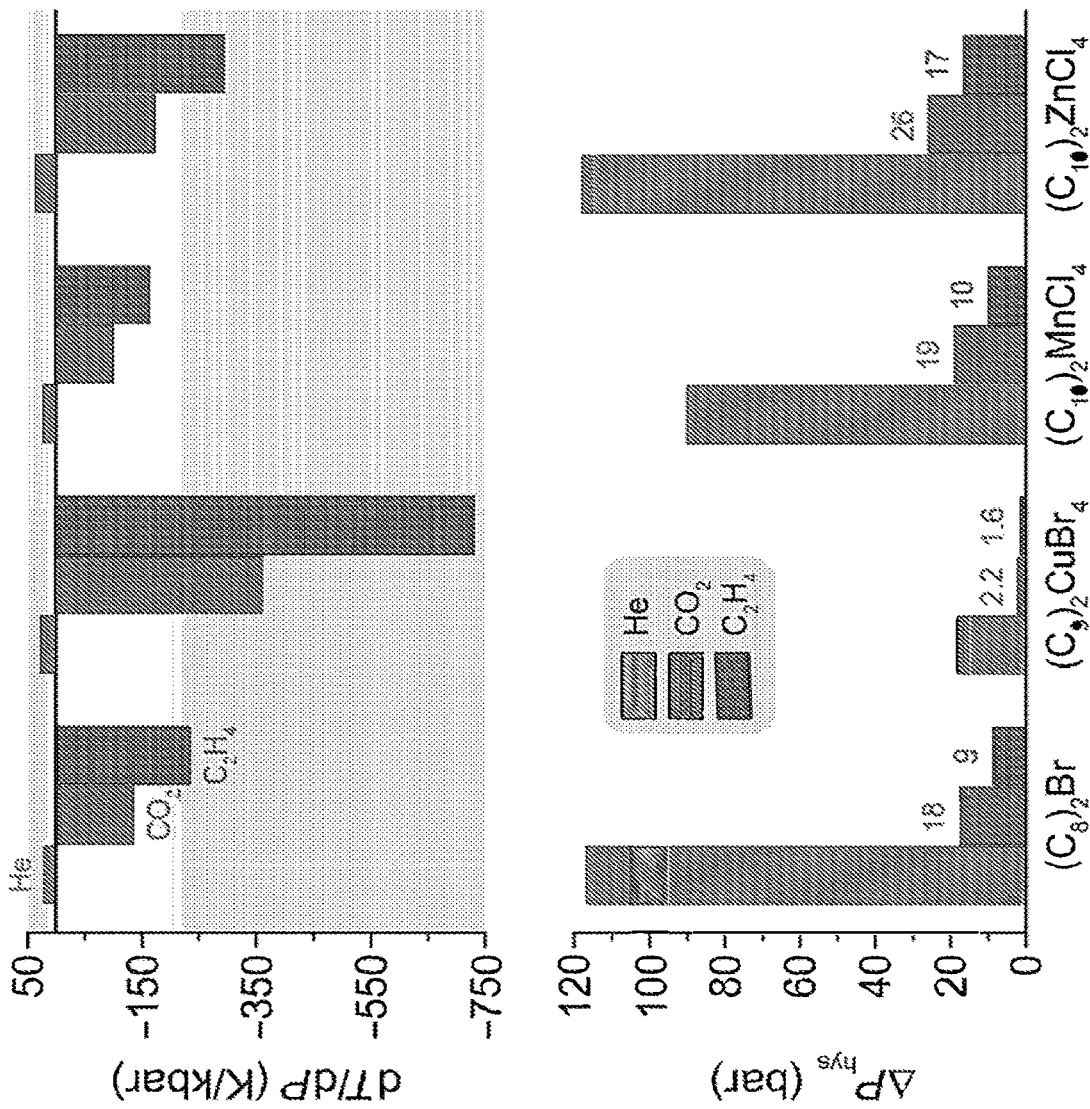

INVERTED BAROCALORIC EFFECTS

BACKGROUND

With rapidly rising average temperatures and climate change accelerating faster than most predictions, the demand for cooling is set to dramatically increase over the next few decades. This alarming trend is driven by adoption of domestic air conditioners, which have become a necessity for survival on the warming planet. Accordingly, the demand for space cooling, which currently accounts for nearly 20% of the total electricity used in buildings around the world, will more than triple by 2050. Many cooling technologies, however, rely on vapor-compression cycles of volatile greenhouse gases (such as Freon), and are thus not sustainable. Note that vapor-compression cooling is currently responsible for nearly 10% of global greenhouse gas (GHG) emissions.

SUMMARY

Recognized herein is a need to replace volatile and environmentally harmful refrigerants with refrigerants that provide a promising and more sustainable alternative.

Provided herein is a method of transferring energy comprising applying energy to a composition comprising a pressure transmitting medium in contact with a pressure sensitive material, wherein the composition is compressed; decompressing the composition to allow the pressure sensitive material to undergo an exothermic phase transition; and removing the energy from the composition; wherein the pressure sensitive material undergoes a reversible phase transition upon application of pressure. In some embodiments, the reversible phase transition comprises an order-disorder transition upon application of pressure. In some embodiments, the reversible phase transition comprises a solid-solid transition upon application of pressure. In some embodiments, the reversible phase transition comprises a solid-liquid transition upon application of pressure.

In some embodiments, the pressure sensitive material comprises an organic component. In some embodiments, the pressure sensitive material comprises a hydrocarbon chain component. In some embodiments, the hydrocarbon chain component comprises an organic molecule portion with the formula $C_nH_{2n+1}$, wherein n is at least 4. In some embodiments, the pressure sensitive material comprises a liquid crystal. In some embodiments, the pressure sensitive material comprises a polymer that undergoes a solid-solid or solid-liquid transition. In some embodiments, the pressure sensitive material comprises an organic solvent. In some embodiments, the pressure sensitive material comprises an ionic liquid. In some embodiments, the pressure sensitive material comprises a deep eutectic solvent. In some embodiments, the pressure sensitive material comprises a biopolymer. In some embodiments, the pressure sensitive material comprises a sugar alcohol. In some embodiments, the pressure sensitive material comprises an organic plastic crystal. In some embodiments, the pressure sensitive material comprises a solid electrolyte material. In some embodiments, the pressure sensitive material comprises a liquid electrolyte. In some embodiments, the pressure sensitive material comprises a guanidinium-based salt. In some embodiments, the pressure sensitive material comprises a biocompatible material.

In some embodiments, the pressure sensitive material comprises a matrix that can house a greater amount of the pressure transmitting medium in a disordered state than an ordered state. In some embodiments, the pressure transmitting medium comprises a material capable of dissolving in the pressure sensitive material upon compression. In some embodiments, the pressure transmitting medium comprises nitrogen, argon, krypton, xenon, methane, ethane, propane, butane, sulfur hexafluoride, carbon dioxide, helium, nitrous oxide, cyclopropane, chloroform, dichloromethane, halothane, isoflurane, desflurane, sevoflurane, acetylene, R-134a, HFO-1234ze, diethyl ether, ethylene, water, ethylene glycol, an alcohol, an ionic liquid, or combinations thereof. In some embodiments, the pressure transmitting medium comprises nitrous oxide, cyclopropane, chloroform, dichloromethane, halothane, isoflurane, desflurane, sevoflurane, acetylene, R-134a, HFO-1234ze, diethyl ether, ethylene, or combinations thereof. In some embodiments, the pressure transmitting medium comprises nitrous oxide, cyclopropane, chloroform, dichloromethane, halothane, isoflurane, desflurane, sevoflurane, acetylene, R-134a, HFO-1234ze, diethyl ether, ethylene, or combinations thereof.

In some embodiments, the method further comprises providing a transfer fluid. In some embodiments, the transfer fluid comprises a thermally conductive fluid. In some embodiments, the transfer fluid is in thermal communication with the composition and a heat sink or a heat source. In some embodiments, the transfer fluid is circulated between the composition and a heat sink or a heat source. In some embodiments, the transfer fluid is circulated by a pump. In some embodiments, removing the energy from the composition or applying the energy to the composition comprises transferring the energy from or to the transfer fluid.

In some embodiments, the method further comprises compressing the composition to allow the pressure sensitive material to undergo an endothermic phase transition. In some embodiments, compression or decompression is accomplished by a providing a controllable pressure source. In some embodiments, the change in pressure is at least about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or at least about 40 bar. In some embodiments, the change in pressure is at most about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or at most about 40 bar. In some embodiments, the pressure sensitive material comprises a pressure sensitivity comprising a change in temperature over change in pressure (dT/dP) of at least about 5, 7, 10, 15, 20, 25, 27, or at least about 30 K per kbar. In some embodiments, the pressure sensitive material comprises a pressure sensitivity comprising a change in temperature over change in pressure (dT/dP) of at most about 5, 7, 10, 15, 20, 25, 27, or at most about 30 K per kbar. In some embodiments, the pressure sensitive material comprises a pressure sensitivity comprising a change in temperature over change in pressure (dT/dP) of at most about −0.1, −0.2, −0.3, −0.4, −0.5, −0.6, −0.7, −0.8, −0.9, −1, −2, −3, −4, −5, −6, −7, −8, −9, −10, −29, −50, −77, −100, −126, −157, −175, −200, −225, −250, −275, −300, −325, −334, −350, −387, −400, −425, −450, −475, −500, −525, −550, −575, −600, −625, −650, −672, −700, −725, −750, −762, or at most about −800 K per kbar. In some embodiments, the pressure sensitive material comprises a pressure sensitivity comprising a change in temperature over change in pressure (dT/dP) of at least about −0.1, −0.2, −0.3, −0.4, −0.5, −0.6, −0.7, −0.8, −0.9, −1, −2, −3, −4, −5, −6, −7, −8, −9, −10, −29, −50, −77, −100, −126, −157, −175, −200, −225, −250, −275, −300, −325, −334, −350, −387, −400, −425, −450, −475, −500, −525, −550, −575, −600, −625, −650, −672, −700, −725, −750, −762, or at least about −800 K per kbar.

In some embodiments, the pressure sensitive material comprises components to enhance the thermal conductivity of the pressure sensitive material. In some embodiments, the pressure sensitive material is encapsulated. In some embodiments, the pressure sensitive material is encapsulated in a shell. In some embodiments, the shell comprises silica, tetraethoxysilane, paraffin, melamine-formaldehyde, urea-formaldehyde, polystyrene, polyurethane, butyl stearate polyurethane, polymethyl methacrylate, or combinations thereof. In some embodiments, the shell comprises multiple layers of materials. In some embodiments, the pressure sensitive material is encapsulated by suspension polymerization, dispersion, coacervation, electrostatic encapsulation, spray-drying, supercritical $CO_2$-assisted encapsulation emulsion polymerization, in situ polymerization, interfacial polymerization, sol-gel encapsulation, or combinations thereof.

In some embodiments, the pressure sensitive material is shape stabilized. In some embodiments, the pressure sensitive material is shape stabilized in a supporting matrix. In some embodiments, the supporting matrix comprises diatomite, vermiculite, perlite, kaolin, bentonite, pumice, sepiolite, polyethylene, polyurethane, acyclic resin, porous silica, porous metal, or combinations thereof. In some embodiments, a geometry of the supporting matrix comprises a lattice, fibers, a porous foam, or combinations thereof.

In some embodiments, the pressure sensitive material comprises components to enhance a stability of the pressure sensitive material. In some embodiments, the pressure sensitive material comprises components to enhance a porosity of the pressure sensitive material. In some embodiments, decompression is triggered in response to a demand for the energy. In some embodiments, the composition comprises a thermal battery.

Provided herein is a method of transferring energy comprising mixing a pressure transmitting medium with a working material; applying energy from a heat source to the mixture of the pressure transmitting medium and the working material; separating the pressure transmitting medium from the working material; and exposing the pressure transmitting material to a heat sink to transfer the energy; wherein mixing the pressure transmitting medium with the working material drives a reversible endothermic phase transition in the working material. In some embodiments, the reversible endothermic phase transition is driven by pressure-induced absorption or desorption. In some embodiments, the reversible endothermic phase transition is driven by dissolving the pressure transmitting medium in the working material. In some embodiments, the reversible endothermic phase transition is driven by the entropy of mixing the pressure transmitting medium in the working material. In some embodiments, the mixing is driven by compressing the pressure transmitting medium with the working material. In some embodiments, the pressure transmitting medium permeates the working material.

In some embodiments, the pressure transmitting medium comprises a gas, an inert gas, a fluorinated gas, a liquid, a supercritical fluid, an ionic liquid, an aqueous salt solution, a liquid hydrocarbon, an alcohol, an oil, a perfluorocarbon, or combinations thereof. In some embodiments, the pressure transmitting medium comprises nitrogen, argon, krypton, xenon, methane, ethane, propane, butane, sulfur hexafluoride, carbon dioxide, helium, nitrous oxide, cyclopropane, chloroform, dichloromethane, halothane, isoflurane, desflurane, sevoflurane, acetylene, R-134a, HFO-1234ze, diethyl ether, ethylene, water, ethylene glycol, an alcohol, an ionic liquid, or combinations thereof. In some embodiments, the pressure transmitting medium comprises nitrous oxide, cyclopropane, chloroform, dichloromethane, halothane, isoflurane, desflurane, sevoflurane, acetylene, R-134a, HFO-1234ze, diethyl ether, ethylene, or combinations thereof. In some embodiments, the mole fraction of the working material when mixed with the pressure transmitting material is less than 1, and the entropy of mixing the working material and the pressure transmitting material is greater than 0 J $mol^{-1}$ $K^{-1}$. In some embodiments, the pressure transmitting medium comprises a solubility in n-decane of at least 0.10 volume of gas per volume of n-decane at atmospheric pressure. In some embodiments, the pressure transmitting medium comprises components to enhance the thermal conductivity of the pressure transmitting medium. In some embodiments, the mixing of the pressure transmitting medium and the working material produces a mixture that is capable of functioning as a thermal battery.

Provided herein is a system comprising a chamber; a first reservoir in fluid connection with the chamber; a pressure source configured to control a pressure of the chamber; a working material disposed within the chamber; a pump configured to pump fluid between the first reservoir and the chamber; wherein the working material undergoes a reversible and endothermic phase transition upon pressurization with the pressure transmitting medium. In some embodiments, the working material comprises an organic component. In some embodiments, the working material comprises an organic molecule portion with the formula $C_nH_{2n+1}$, wherein n is at least 4. In some embodiments, the working material comprises a liquid crystal. In some embodiments, the working material comprises a polymer that undergoes a solid-solid or solid-liquid transition. In some embodiments, the working material comprises an organic solvent. In some embodiments, the working material comprises an ionic liquid. In some embodiments, the working material comprises a biopolymer. In some embodiments, the working material comprises a biocompatible material. In some embodiments, the pressure transmitting medium comprises a gaseous refrigerant. In some embodiments, the gaseous refrigerant increases in temperature when compressed, or undergoes an endothermic liquid-to-gas phase transition. In some embodiments, the gaseous refrigerant comprises $CO_2$, a hydrocarbon (e.g., ethane, propane, n-butane, 2-methylpropane, n-pentane, ethene, or propene), or combinations thereof.

Provided herein is a system comprising a first chamber; a pressure source configured to control a pressure of the chamber; a working material disposed within the first chamber; a pressure transmitting medium disposed within the first chamber; a thermal transfer chamber at least partially surrounding (e.g., surrounding) the first chamber; a thermal transfer fluid disposed in the thermal transfer chamber; a first fluid reservoir in fluid connection with the thermal transfer chamber; a pump configured to circulate the thermal transfer fluid between the thermal transfer chamber and the first fluid reservoir; wherein the working material undergoes a reversible and endothermic phase transition upon pressurization with the pressure transmitting medium. In some embodiments, the pressure transmitting medium dissolves in the working material upon pressurization. In some embodiments, the working material comprises an organic component. In some embodiments, the working material comprises an organic molecule portion with the formula $C_nH_{2n+1}$, wherein n is at least 4. In some embodiments, the working material comprises a liquid crystal. In some embodiments, the working material comprises a polymer that undergoes a solid-solid or solid-liquid transition. In some embodiments, the working material comprises an organic solvent. In some embodiments, the working material comprises an ionic liquid. In some embodiments, the working material comprises a biopolymer. In some embodiments, the working material comprises a biocompatible material. In some embodiments, the system further comprises a second fluid reservoir in fluid communication with the thermal transfer chamber; a second pump configured to circulate the thermal transfer fluid between the thermal transfer chamber and the second fluid reservoir; a high pressure gas reservoir in fluid communication with the first chamber, wherein the high pressure gas reservoir is in thermal communication with the second fluid reservoir via the thermal transfer fluid; and a low pressure gas reservoir in fluid communication with the first chamber, wherein the low pressure gas reservoir is in thermal communication with the first fluid reservoir via the thermal transfer fluid; wherein the pressure source is further configured to control a pressure of the high pressure gas reservoir and the low pressure gas reservoir.

In some embodiments, the system further comprises a first pressure valve between the first chamber and the high pressure gas reservoir and a second pressure valve between the first chamber and the low pressure gas reservoir. In some embodiments, the pressure transmitting medium comprises a gas. In some embodiments, the pressure transmitting medium or the thermal transfer fluid comprises a gaseous refrigerant.

Provided herein is a system comprising a refrigerant; a compressor that controls a pressure of the refrigerant; a condenser comprising a pressure sensitive material disposed therein, wherein the condenser is in fluid communication with the compressor; an evaporator in fluid communication with the compressor; and an expansion valve in fluid communication with the condenser and the evaporator; wherein the pressure sensitive material undergoes a reversible phase transition upon application of pressure. In some embodiments, the reversible phase transition comprises an order-disorder transition upon application of pressure. In some embodiments, the reversible phase transition comprises a solid-solid transition upon application of pressure. In some embodiments, the reversible phase transition comprises a solid-liquid transition upon application of pressure. In some embodiments, the pressure sensitive material comprises an organic component. In some embodiments, the pressure transmitting medium comprises a material capable of dissolving in the pressure sensitive material upon compression. In some embodiments, refrigerant comprises a gaseous pressure transmitting medium. In some embodiments, the pressure transmitting medium comprises carbon dioxide. In some embodiments, the expansion valve is disposed between the condenser and the evaporator. In some embodiments, the system further comprises a heat sink in thermal communication with the condenser, and a heat source in thermal communication with the evaporator.

Provided herein are methods and systems for energy transfer. In some embodiments, the energy transfer can be for barocaloric applications. Barocaloric applications can include at least cooling, heating, energy transfer, and energy storage. The methods and systems may employ a working material. In some embodiments, the working material may comprise a pressure sensitive material. In some embodiments, a pressure sensitive material can comprise a barocaloric material. A barocaloric material can be a material that undergoes an endothermic or exothermic state change in response to a pressure change.

In one aspect, a method of transferring energy is provided. The energy can comprise thermal energy. In some embodiments energy can be transferred by employing a barocaloric cycle. The barocaloric cycle can be a conventional barocaloric cycle or an inverted barocaloric cycle. In some embodiments, employing an inverted barocaloric cycle can comprise a) applying heat energy to a composition including a pressure transmitting medium (PTM) and a pressure sensitive material, wherein the composition is compressed, b) decompressing the composition to allow the pressure sensitive material to undergo an exothermic phase transition, and c) removing the energy from the composition, wherein the pressure sensitive material undergoes a reversible phase change transition upon application of pressure. In some embodiments, the pressure sensitive material comprises a barocaloric material. In some embodiments, the barocaloric material can be in a disordered state caused by compression of the composition, and the disordered state (i.e., higher entropy) of the barocaloric material includes (e.g., by dissolution, intercalation, absorption, etc.) a greater amount of the pressure transmitting medium than an ordered state (i.e., lower entropy) of the barocaloric material. In some embodiments, decompressing the composition can allow the barocaloric material to undergo an exothermic transition to an ordered state, releasing the heat energy.

The method may further include after (c) compressing the composition so that the pressure sensitive material is in a disordered state. In some embodiments, the pressure transmitting medium (PTM) can be a fluid. The PTM can be, for example, a gas, liquid, or supercritical fluid. For example, the pressure transmitting medium can be nitrogen, argon, krypton, xenon, methane, ethane, propane, butane, sulfur hexafluoride, carbon dioxide, helium, nitrous oxide, cyclopropane, chloroform, dichloromethane, halothane, isoflurane, desflurane, sevoflurane, acetylene, R-134a, HFO-1234ze, diethyl ether, ethylene, or combinations thereof, such as nitrous oxide, cyclopropane, chloroform, dichloromethane, halothane, isoflurane, desflurane, sevoflurane, acetylene, R-134a, HFO-1234ze, diethyl ether, ethylene, or combinations thereof. In certain embodiments, the PTM is not nitrogen, argon, helium, krypton, xenon, methane, ethane, propane, butane, sulfur hexafluoride, or carbon dioxide.

In some embodiments, the composition in (a) is compressed by at least about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 50, 60 70, 80, 90, 100, 110, 120, 130, 140, 150, 160, 170, 180, 190, 200, 225, 250, 275, 300, 325, 350, 375, 400, 450, 500, 550, 600, 650, 700, 750, or at least about 800 bar In some embodiments, the pressure transmitting medium has a solubility in n-decane of at least 0.10 volume of gas per volume of n-decane at atmospheric pressure. In some embodiments, the magnitude of the pressure sensitivity of the composition is greater than $-200$ K kbar$^{-1}$.

In some embodiments, the barocaloric material is a $C_{>3}$ alkyl ammonium species. In some embodiments, the barocaloric material includes an alkyl ammonium of the following:

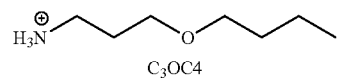

C₃OC4

-continued

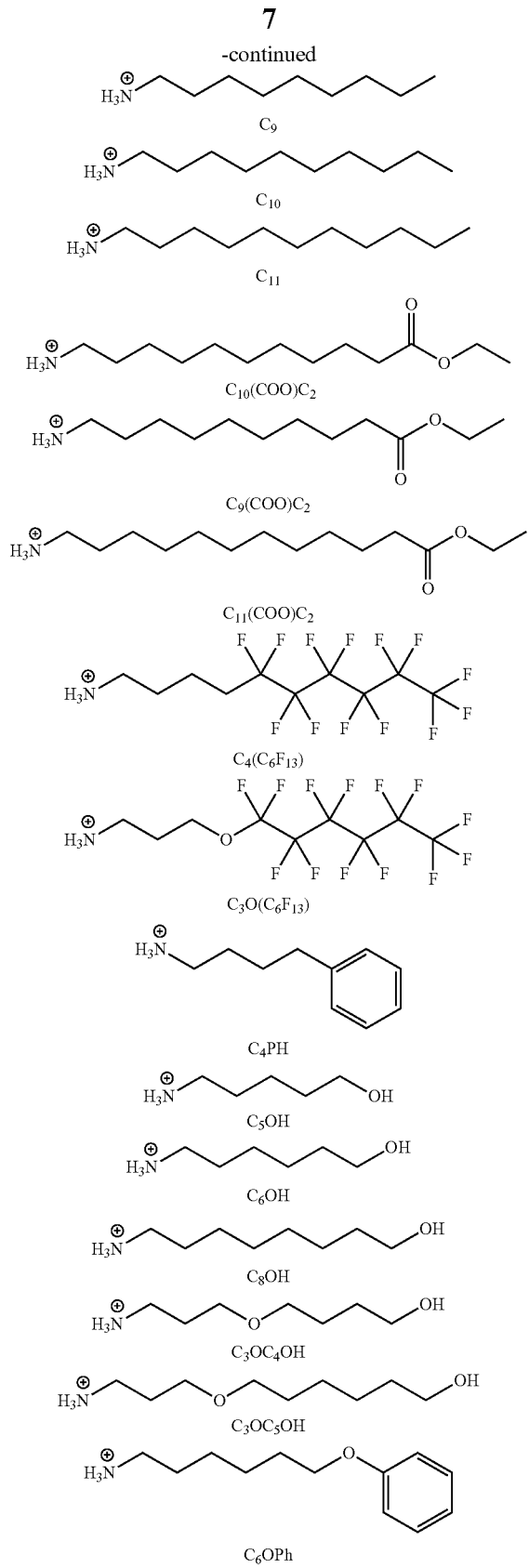

| Type | Chemical Formula |
|---|---|
| 2-D perovskite or perovskite-like | $(OA)_2MnCl_4$ |
| | $(NA)_2MnCl_4$ |
| | $(NA)_2CuCl_4$ |
| | $(DA)_2CuCl_4$ |
| | $(NA)_2CuBr_4$ |
| | $(DA)_2ZnCl_4$ |
| Mixed 2D perovskites | $(NA)_2CuCl_3Br$ |
| | $(NA)_2CuCl_2Br_2$ |
| | $(NA)_2CuClBr_3$ |
| | $(DA)_2CuCl_3Br$ |
| | $(DA)_2CuCl_2Br_2$ |
| | $(DA)_2CuClBr_3$ |
| | $[(NA)_{0.75}(DA)_{0.25}]_2CuCl_4$ |
| | $[(NA)_{0.5}(DA)_{0.5}]_2CuCl_4$ |
| | $[(NA)_{0.25}(DA)_{0.75}]_2CuCl_4$ |
| | $[(NA)_{0.25}(UA)_{0.75}]_2CuCl_4$ |
| | $[(NA)_{0.5}(UA)_{0.5}]_2CuCl_4$ |
| | $[(NA)_{0.5}(DA)_{0.5}]_2CuCl_2Br_2$ |
| Di-n-alkyl ammonium salt | $(n-C_6H_{13})_2NH_2Br$ |
| | $(n-C_8H_{17})_2NH_2Cl$ |
| | $(n-C_6H_{13})_2NH_2Cl$ |
| | $(n-C_6H_{13})_2NH_2I$ |
| | $(n-C_8H_{17})_2NH_2Br$ |
| | $(n-C_{12}H_{25})_2NH_2Cl$ |
| | $(n-C_8H_{17})_2NH_2I$ |
| | $(n-C_{10}H_{21})_2NH_2Cl$ |
| | $(n-C_{10}H_{21})_2NH_2Br$ |
| | $(n-C_{10}H_{21})_2NH_2I$ |
| | $(n-C_{12}H_{25})_2NH_2Br$ |
| | $(n-C_{18}H_{37})_2NH_2Cl$ |
| | $(n-C_{18}H_{37})_2NH_2Br$ |
| | $(n-C_{12}H_{25})(CH_3)NH_2Br$ |
| | $(n-C_{12}H_{25})(CH_3)NH_2Cl$ |
| Intercalation compound (first-row transition metal) intercalated between montmorillonite (smectite) | $FeOCl \cdot C_{14}H_{29}NH_2{}^g$ |
| | $Ni(CN)_2 \cdot C_{12}H_{25}NH_2{}^h$ |
| | $Ni(CN)_2 \cdot C_{12}H_{25}NH_2{}^h$ |
| | $(C_{18}H_{37})_3NH^+$ |
| | Self-Assembled Monolayer |
| | $(C_{18}H_{37})_4N^+$ |
| | Self-Assembled Monolayer |
| Layered metallo-alkylphosphonate | $Mg(O_3PC_{22}H_{45})$ |

In some embodiments the barocaloric material is not $(DA)_2MnCl_4$ or $(NA)_2CuBr_4$.

In some embodiments, the heat energy is transferred from a heat source to ambient atmosphere. In some embodiments, the heat energy is transferred from the ambient atmosphere to a heat sink. In some embodiments, the composition is disposed within a condenser in a vapor compression cooling device.

In an aspect, a barocaloric heat transfer system is provided including: a) a chamber including a composition including a pressure transmitting medium in contact with a matrix including a barocaloric material, wherein a disordered state of the barocaloric material includes a greater amount of the pressure transmitting medium than an ordered state of the barocaloric material; b) a first reservoir in thermal contact with a heat sink and having a first recirculating flow path in thermal contact with the chamber; c) a second reservoir in thermal contact with a heat source and having a second recirculating flow path in thermal contact with the chamber; d) one or more valves configured to control flow in the first and second recirculating flow paths; e) a pressure source for the chamber; and f) one or more pumps to transport a heat transfer fluid in the first and second recirculating paths.

In one embodiment, the system further includes a high pressure gas reservoir and a low pressure gas reservoir, wherein the chamber is in fluid communication with the high pressure and low pressure gas reservoirs; the first recirculating flow path is in thermal contact with the high pressure gas reservoir and the second recirculating flow path is in In some embodiments, the barocaloric material includes a 2D perovskite. In some embodiments, the barocaloric material includes a compound of the following:

thermal contact with the low pressure gas reservoir; and the pressure transmitting medium circulates between the high pressure gas reservoir, the chamber, and the low pressure gas reservoir.

In one embodiment, the system further includes a low pressure gas reservoir and a high pressure gas reservoir, wherein the chamber is in fluid communication with the low pressure and high pressure gas reservoirs; the first recirculating flow path is in thermal contact with the low pressure gas reservoir and a heat sink and the second recirculating flow path is in thermal contact with the high pressure gas reservoir and a heat source; and the pressure transmitting medium circulates between the low pressure gas reservoir, the chamber, and the high pressure gas reservoir.

In one embodiment, the system further includes a condenser and an expansion valve wherein the composition is disposed in the condenser and the pressure source is a compressor.

Definitions

By "hydrocarbyl," as used herein, is meant straight chain or branched saturated or unsaturated groups of carbons. For example, hydrocarbyl groups can include alkyl (saturated), alkenyl (unsaturated with at least one carbon double bond and no carbon triple bonds), and alkynyl (unsaturated with at least one carbon triple bond). Alkyl groups are exemplified by n-, sec-, iso- and tert-butyl, neopentyl, nonyl, decyl, and the like, and may be optionally substituted with one or more, substituents. Hydrocarbyl groups may include 1 or more carbon atoms, e.g., greater than 2, e.g., 6-15, such as 8-12, or 4-36 in the main chain. Carbon atoms in the main chain may or may not be interrupted with one or more heteroatoms, e.g., O, S, or N.

By "aryl" is meant an aromatic cyclic group in which the ring atoms are all carbon. For example, aryl groups include phenyl, naphthyl, and anthracenyl. Aryl groups may be optionally substituted with one or more substituents.

By "alkyl" as used herein, is meant straight-chain or branched saturated groups of carbons. Alkyl groups are exemplified by n-, sec-, iso-, tert-butyl, neopentyl, nonyl, decyl, and the like, and may be optionally substituted with one or more substituents. Alkyl groups may include >9 carbon atoms. Carbon atoms in the main chain may be interrupted with one or more heteroatoms, e.g., O, S, or N.

By "carbocyclyl" is meant a non-aromatic cyclic group in which the ring atoms are all carbon. For example, carbocyclyl groups can include cyclopropyl, cyclobutyl, cyclopentyl, cyclohexyl, cycloheptyl, and cyclooctyl. Carbocyclyl groups may be optionally substituted with one or more substituents. A carbocyclyl group may or may not be saturated.

By "halo" is meant, fluoro, chloro, bromo, or iodo.

By "heteroaryl" is meant an aromatic cyclic group in which the ring atoms include at least one carbon and at least one O, N, or S atom, provided that at least three ring atoms are present. For example, heteroaryl groups can include oxazolyl, isoxazolyl, tetrazolyl, pyridyl, thienyl, furyl, pyrrolyl, imidazolyl, pyrimidinyl, thiazolyl, indolyl, quinolinyl, isoquinolinyl, benzofuryl, benzothienyl, pyrazolyl, pyrazinyl, pyridazinyl, isothiazolyl, benzimidazolyl, benzothiazolyl, benzoxazolyl, oxadiazolyl, thiadiazolyl, and triazolyl. Heteroaryl groups may be optionally substituted with one or more substituents.

By "heterocyclyl" is meant a non-aromatic cyclic group in which the ring atoms include at least one carbon and at least one O, N, or S atom, provided that at least three ring atoms are present. For example, heterocyclyl groups can include epoxide, thiiranyl, aziridinyl, azetidinyl, thietanyl, dioxetanyl, morpholinyl, thiomorpholinyl, piperazinyl, piperidinyl, pyrrolidinyl, tetrahydropyranyl, tetrahydrofuranyl, dihydrofuranyl, tetrahydrothienyl, dihydrothienyl, dihydroindolyl, tetrahydroquinolyl, tetrahydroisoquinolyl, pyranyl, pyrazolinyl, pyrazolidinyl, dihydropyranyl, tetrahydroquinolyl, imidazolinyl, imidazolidinyl, pyrrolinyl, oxazolidinyl, isoxazolidinyl, thiazolidinyl, isothiazolidinyl, dithiazolyl, and 1,3-dioxanyl. Heterocyclyl groups may be optionally substituted with one or more substituents.

Optional substituents include halo, optionally substituted $C_{3-10}$ carbocyclyl; optionally substituted $C_{1-9}$ heterocyclyl having one to four heteroatoms independently selected from O, N, and S; optionally substituted $C_{6-20}$ aryl; optionally substituted $C_{1-9}$ heteroaryl having one to four heteroatoms independently selected from O, N, and S; —CN; —NO$_2$; —OR$_a$; —N(R$_a$)$_2$; —C(=O)R$_a$; —C(=O)OR$_a$; —S(=O)$_2$R$_a$; —S(=O)$_2$OR$_a$; —P(=O)R$_{a2}$; —O—P(=O)(OR$_a$)$_2$, or —P(=O)(OR$_a$)$_2$, or an ion thereof; wherein each R$_a$ is independently H, optionally substituted $C_{1-36}$ hydrocarbyl (e.g., $C_{1-36}$ alkyl); optionally substituted $C_{3-10}$ carbocyclyl; optionally substituted $C_{1-9}$ heterocyclyl having one to four heteroatoms independently selected from O, N, and S; optionally substituted $C_{6-20}$ aryl; or optionally substituted $C_{1-9}$ heteroaryl having one to four heteroatoms independently selected from O, N, and S. Cyclic groups may also be substituted with $C_{1-36}$ hydrocarbyl (e.g., $C_{1-36}$ alkyl).

BRIEF DESCRIPTION OF THE DRAWINGS

FIG. 1a demonstrates an example response of a conventional barocaloric material. Ordering, volume-contracting and exothermic transitions can occur upon compression (and volume-expanding endothermic transitions can occur upon decompression), and the thermal changes driven by compression-induced ordering effects can drive a cooling cycle. FIG. 1b demonstrates an example response of an inverted barocaloric material when the PTM permeates into the structure of the material. When the PTM directly interacts with the lattice (such as by being absorbed in the organic layers), inversion of barocaloric effects can occur. Compression can induce endothermic order-to-disorder transition, and decompression can induce an ordering transition. The solubility of PTM molecules can be larger for expanded/disordered phases of the material. Because the solubility can increase in proportion to PTM pressure, compression can drive the disordering transition.

FIG. 2a shows a schematic illustration for inverted barocaloric effects in layered materials. When a pressure medium directly interacts with the lattice by being absorbed in and mixed with organic layers, inversion of barocaloric effects can occur. Compression can induce an endothermic, order-to-disorder transition and decompression can induce an exothermic, ordering transition.

FIGS. 6a-6c shows an example of results of pycnometry experiments. FIG. 6a and FIG. 6c show example results of pycnometry experiments for $(DA)_2MnCl_4$ using He (FIG. 6a) and $N_2$ (FIG. 6c). The $N_2$ pycnometry experiment for $(DA)_2MnCl_4$ also indicates that the effective volume change directly measured in $N_2$ environment can be lower than that measured in He environment. FIG. 6b shows an example result of pycnometry experiments for $(NA)_2CuBr_4$ using He.

FIG. 16a shows an example of a prediction of large inverted barocaloric effects under anesthetic agents (such as $N_2O$ and $C_2H_4$) for 2-D perovskites (diamonds).

FIG. 22a shows that compression can induce an endothermic transition. FIG. 22b shows that decompression can induce an exothermic transition. Note that the pressure swing of 15 bar can be sufficient to reversibly induce the phase transitions in full.

FIG. 28a shows an example of layered barocaloric solids that display inverted barocaloric effects. Crystal structures of low-temperature phases of $(C_8)_2Br$ [$(C_8)_2$=dioctylammonium], $(C_9)_2CuBr_4$ [$C_9$=nonylammonium], $(C_{10})_2MnCl_4$ [$C_{10}$=decylammonium], and $(C_{10})_2ZnCl_4$ [$C_{10}$=decylammonium] are shown.

FIG. 30a shows example pressure sensitivity (dT/dP, top) and pressure hysteresis ($\Delta P_{hys}$, bottom) for layered barocaloric solids under He (red), $CO_2$ (purple), $C_2H_4$ (navy).

FIG. 31a shows the device when the internal chamber is pressurized. When the internal chamber is pressurized, the barocaloric material can cool down and adsorb heat from the heat source reservoir. FIG. 31b shows the device when the inner chamber is then depressurized. When the internal chamber is depressurized, the direction of heat transfer fluid flow can reverse.

FIG. 32a shows the device when the internal chamber containing the barocaloric is in thermal contact with the heat sink, which can remove heat from the PTM after a decompression step. FIG. 32b shows the device when the internal chamber containing the barocaloric is in thermal contact with the heat source, which can add heat to the PTM after a compression step.

DETAILED DESCRIPTION

Provided herein are methods and systems for energy transfer. In some embodiments, the methods can cause a state change in a working material. The state change can comprise a solid-solid or a solid-liquid phase transition. The state change can be pressure sensitive. The state change may be reversible. A working material can undergo a reversible phase change transition upon application of pressure. In some embodiments, the state change increases the disorder of a second state relative to a starting state. In some embodiments, the disorder of a second state relative to a starting state can be accomplished via incorporation of solute material. The solute material can comprise a pressure transmitting medium (PTM). In some embodiments, the state change of the working material comprises an exothermic or endothermic phase transition. In some embodiments, the working material comprises a pressure sensitive material. The phase transition can be exothermic upon an increase in pressure or endothermic upon an increase in pressure. The phase transition can be exothermic upon a decrease in pressure or endothermic upon a decrease in pressure. An inverted barocaloric effect can be an exothermic phase change in response to a decrease in pressure or an endothermic phase change in response to an increase in pressure. In some embodiments, the state transition of the working material is driven by the entropy of mixing. An inverted barocaloric effect can be an endothermic phase change in response to a dissolution of a pressure transmitting medium in a working material.

Figure 1A:
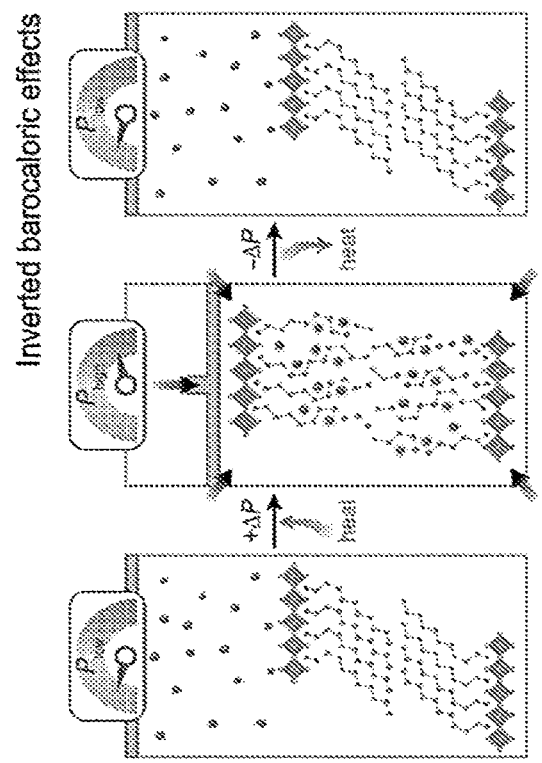
FIGS. 1a-1b show example schematic illustrations for the conventional barocaloric and inverted barocaloric effects in layered materials in response to applied pressure in the presence of a PTM.
Figure 1B:
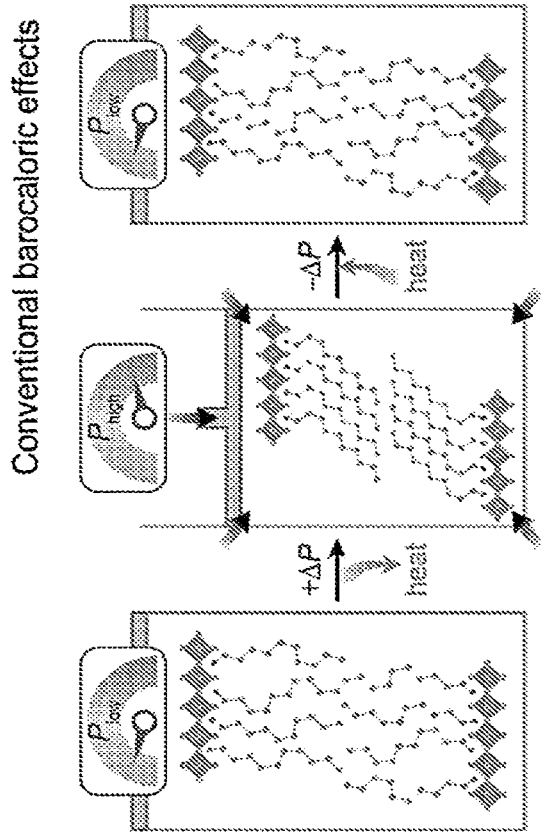

Described herein are uses of reversible, solid-state order-disorder transitions. These transitions can be impacted by a pressure induced solubility of gaseous molecules originating from a pressure transmitting medium in contact with a solid-state material for inverted barocaloric cooling. In some embodiments a solid state material comprises a working material. This working material can comprise a matrix, a lattice, a porous material, or other material comprising ordered and disordered states. In some embodiments, the working material comprises layered solids with long chain organic molecules. The long chain organic molecules can comprise alkyl chains of the form $C_nH_{2n+2}$, wherein n>3. In some embodiments, the layered solids can comprise organic or inorganic layers. In some embodiments, the layered solids can host guest molecules. In some embodiments, a guest molecule can comprise a molecule of a solute material or PTM. In some embodiments, a working material may undergo an exothermic phase transition from a starting state to a state of higher order under compression in the absence of a PTM. This exothermic response to pressure is termed a "conventional" barocaloric effect (FIG. 1a).

Figure 2B:
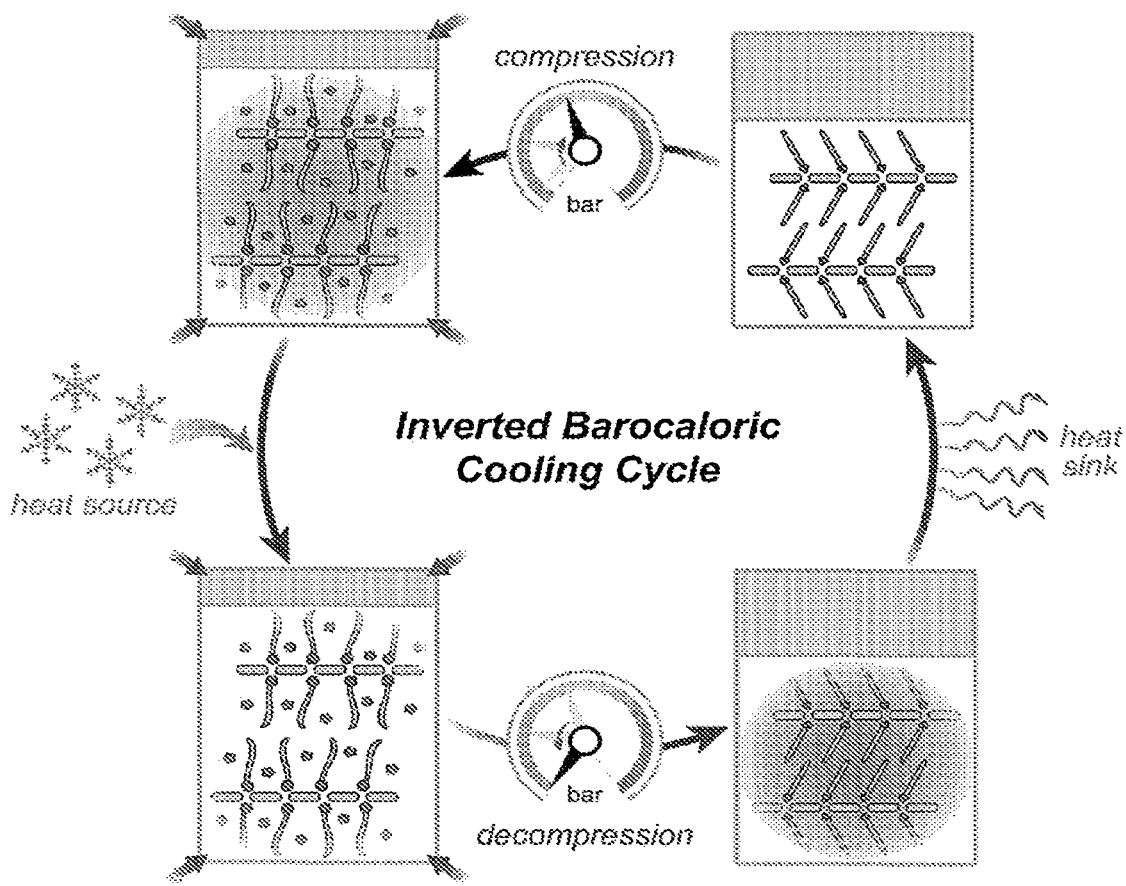
FIG. 2b shows example steps of an inverted barocaloric cooling cycle. Adiabatic compression can induce disordering, volume-expanding endothermic transitions within the material, which can lead to a decrease in temperature. The material can then absorb thermal energy from the heat source. Upon adiabatic decompression that can assist the desorption of PTM molecules from the material, ordering and exothermic transitions can occur, and the material temperature can increase. The refrigerant can then dump the excess thermal energy into the heat sink.
Figure 2C:
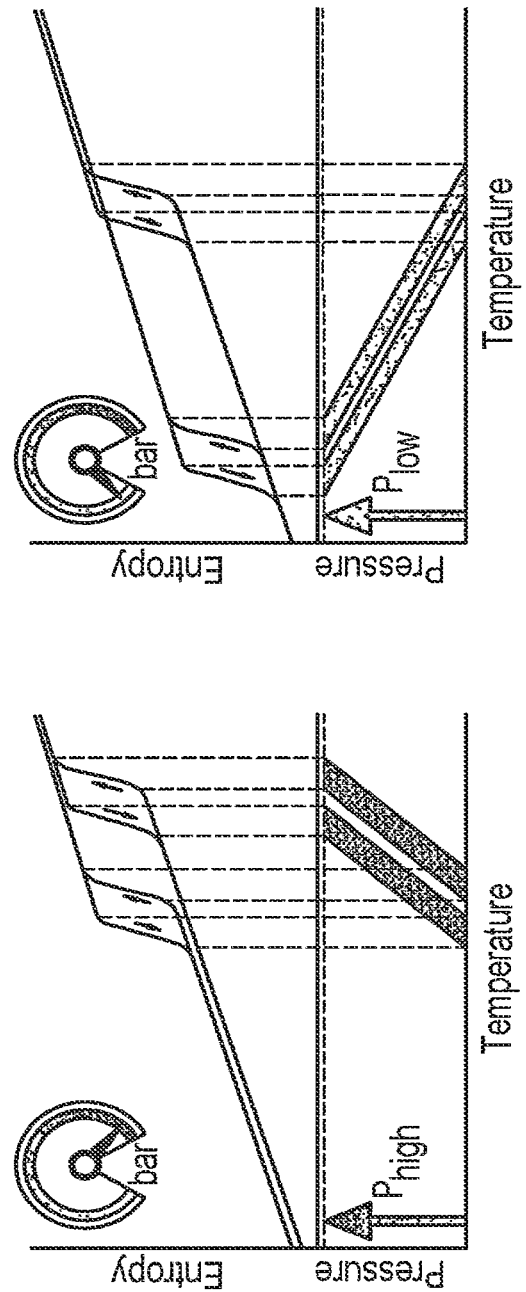
FIG. 2c shows example temperature-entropy diagrams for a material displaying (left) conventional barocaloric effects and (right) inverted barocaloric effects. These diagrams are based on isobaric calorimetry measurements performed at 300 bar He and 40 bar $CO_2$ for $(C_9)_2CuBr_4$ ($C_9$=nonylammonium). The ultrahigh pressure sensitivity accessible from inverted barocaloric effects can allow one to overcome hysteresis barrier at extremely low pressures.

Without being bound by theory, the methods and systems provided may utilize thermodynamic effects of PTM on order-disorder transitions. In some embodiments, the order disorder transition can occur in layered crystalline solids. In some embodiments, a layered crystalline solid comprises a two-dimensional metal-halide perovskite, a di-alkylammonium salt, a liquid crystal, an organic polymer, or combinations thereof. In some embodiments, a working material comprises a matrix. In some embodiments, a working material comprises a material whose state transitions are associated with large changes in free volume or gas permeability. The state transitions can be solid state transitions. The state transitions can be solid-solid, solid-liquid, order-disorder, or combinations thereof. In some embodiments, a working material can house a greater amount of a pressure transmitting medium in a disordered state compared to an ordered state. In some embodiments, the solubility of PTM molecules in the matrix is larger in the disordered state than the ordered state. The solubility of the PTM molecules in the matrix can drive a disordering, endothermic transition upon compression. In some embodiments, the transition surpasses positive compression-induced ordering effects. In some embodiments, decompression of the working material and dissolved PTM molecules can cause the PTM molecules to desorb from the disordered matrix. Desorbing the PTM molecules from the matrix can induce an exothermic, ordering transition to a contracted phase. Materials that operate via this mechanism may therefore display inverted barocaloric effects: compression induces a temperature decrease (e.g., from the endothermic/disordering transition) and decompression induces a temperature increase (e.g., from exothermic/ordering transition) (FIG. 1a, 1b, 2a, 2b). In some embodiments, large pressure sensitivity that can be accessed from inverted barocaloric effects can allow hysteresis barriers to be overcome at low pressure (FIG. 2c)

In some embodiments, a barocaloric effect can result in a working material undergoing a volume contraction upon transition to a higher entropy phase, or it can result in a volume expansion upon transition to a higher entropy phase. In some embodiments, a working material can comprise a lattice structure. The lattice structure can comprise a lattice volume. A disordering transition can be accompanied by an increase in lattice volume. In some embodiments a barocaloric effect is driven by a change in chemical potential. The change in chemical potential can arise from a pressure-induced effect, an entropic effect, or an absorption-desorption cycle. An entropic effect or an absorption-desorption cycle can be pressure-induced. In some embodiments, an entropic effect is driven by the dissolution, intercalation, or absorption of a solute in a solvent. The solute can comprise a pressure transmitting medium. The solvent can comprise a working material. The working material can be a disordered or expanded lattice. In some embodiments, a working material can house a greater amount of the pressure transmitting medium in a disordered state compared to an ordered state. In some embodiments, a working material can house a lesser amount of the pressure transmitting medium in a disordered state compared to an ordered state. The change in chemical potential can be a lowering of chemical potential upon fluid absorption. The lowering of chemical potential can originate from the entropy of mixing and may be sensitive to pressure. In some embodiments, the change in chemical potential can overcome a compression-induced ordering effect, for example in the case of a lattice with a positive $\Delta V$ upon going from the ordered to disordered phase. In some embodiments, the dissolution, intercalation, or absorption of a PTM in a working material results in a cooling effect from order-disorder transitions. The cooling effect can occur independent of the heat of absorption/desorption of the PTM in the working material.

In some embodiments, inverted barocaloric effects can occur when a fraction of PTM gets dissolved in a working material. The amount of dissolved PTM can depend on pressure. In some embodiments, a working material comprises an organic component. The solubility of the PTM in an organic solvent can provide a metric for estimating a magnitude of an inverted barocaloric effect. This estimation can be applied for a given combination of a PTM and a working material. The organic solvent used to estimate the magnitude of a barocaloric effect may be n-decane. A PTM that can dissolve in n-decane may be used to drive an inverted barocaloric effects. The solubility may depend on the temperature and pressure at which the measurement was taken. In some embodiments, a different organic solvent may be used to estimate the magnitude of the inverted barocaloric effect.

In some embodiments, a mole fraction of a working material ($\chi$WM) may be smaller than 1 due to the mixing with a pressure-transmitting medium (PTM). The fraction may be calculated according to the formula $\chi$WM=nWM/(nWM+nPTM), where n is the molar amount. When $\chi$WM<1, the PTM is dissolved in the working material. When $\chi$WM<1, the entropy of mixing can be approximated as $\Delta Smix=-ntotR\ [\chi WM\ \ln(\chi WM)+\chi PTM\ \ln(\chi PTM)]$, where ntot=nWM+nPTM and R is the gas constant (i.e., 8.314 J mol$^{-1}$ K$^{-1}$). A pressure transmitting material can be a material where $\chi$WM<1 and $\Delta Smix>0$.

Working Materials

A working material can be a material that displays conventional or inverted barocaloric effects. In some embodiments, the working material can dissolve or absorb PTM atoms or molecules. A working material can be a pressure sensitive material. A pressure sensitive material may exhibit a relationship between pressure and temperature. For example, a working material may exhibit a temperature decrease with increased pressure, a temperature increase with increased pressure, a temperature decrease with decreased pressure, or a temperature increase with decreased pressure. The relationship between pressure and temperature can be described as a change in temperature (dT) over pressure (dP), or dT/dP. A working material can exhibit a pressure sensitivity (dT/dP) of at most about −0.1, −0.2, −0.3, −0.4, −0.5, −0.6, −0.7, −0.8, −0.9, −1, −2, −3, −4, −5, −6, −7, −8, −9, −10, −29, −50, −77, −100, −126, −157, −175, −200, −225, −250, −275, −300, −325, −334, −350, −387, −400, −425, −450, −475, −500, −525, −550, −575, −600, −625, −650, −672, −700, −725, −750, −762, −800, −900, −1000, −2000, −3000, −4000, −5000, −6000, −7000, −8000, −9000, or at most about −10000 K per kbar. A working material can exhibit a pressure sensitivity (dT/dP) of at least about −0.1, −0.2, −0.3, −0.4, −0.5, −0.6, −0.7, −0.8, −0.9, −1, −2, −3, −4, −5, −6, −7, −8, −9, −10, −29, −50, −77, −100, −126, −157, −175, −200, −225, −250, −275, −300, −325, −334, −350, −387, −400, −425, −450, −475, −500, −525, −550, −575, −600, −625, −650, −672, −700, −725, −750, −762, −800, −900, −1000, −2000, −3000, −4000, −5000, −6000, −7000, −8000, −9000, or at least about −10000 K per kbar. A working material can exhibit a different pressure sensitivity depending on its environment. The pressure sensitivity can be dependent on an interaction with a pressure transmitting medium. A working material can exhibit conventional barocaloric behavior in one environment, and inverted barocaloric behavior in another environment. An environment can comprise a presence, or absence, of a pressure transmitting medium.

In some embodiments, a working material may be a working material combined with one or more materials to form a combination working material. A combination working material may comprise materials with different properties. The properties can be transition temperature, entropy of phase transition, latent heat of phase transition, pressure sensitivity, transition enthalpy, thermal conductivity, or stability. The properties of the combination working material may depend on the properties of each of the combined materials. The materials combined with the working material can comprise working materials, pressure transmitting materials, or additives.

In some embodiments, a working material can comprise organic molecules, solvents, n-alkane, liquid crystals, di-n-alkylammonium salts, organic polymers, soft organic materials, biopolymers, or combinations thereof. In some embodiments, a working material can comprise a long-chain organic molecule. The long chain organic molecule can be templated by inorganic layers. The long chain organic molecule can comprise a long alkyl chain, for example an alkyl chain of the formula $C_nH_{2n+1}$, where n>3, e.g., >4.

An example of a long chain organic molecule templated by inorganic layers can be two-dimensional (2-D) metal-halide perovskites. In some embodiments, a 2-D metal-halide perovskite has the form $(R—NH_3)_2MX_4$ ($R=C_nH_{2n+1}$; n>3 (e.g., >4); M=Mn, Fe, Cu, Cd, or Pb; X=F, Cl, Br, or I). In these compounds, sheets of corner-sharing $MX_6$ octahedra can create anionic pockets defined by the axial halides of four adjacent metal centers. These pockets can template the arrangement of bilayers of alkylammonium cations through charge-assisted hydrogen bonds. In some embodiments, the working material can include an organic-inorganic hybrid material with a general chemical formula of $(R—NH_3)_2MX_4$. This hybrid material can contain first-row transition metal halides $[MX_4]^{2-}$ (M=Mn, Fe, Co, Cu, or Zn; X=Cl, Br, or I) connected by bilayers of ammonium cations $(R—NH_3^+)$ (e.g., $R=C_nH_{2n+1}$; n>3 (e.g., >4)).

Further examples are shown in the following tables:

| Compound | $T_{tr}$ (K) | $\Delta S_{transition}$ (J kg$^{-1}$ K$^{-1}$) | $\Delta S_{transition}$ (J kg$^{-1}$ K$^{-1}$) | $Q_{tr}$ (kJ L$^{-1}$) | |
|---|---|---|---|---|---|
| [TPrA][Mn(dca)$_3$] | 330 | 42.5 | 52.7 | 17.3 | |
| (CH$_3$)$_2$C(CH$_2$OH)$_2$ | 313 | 390 | 390.0 | 122.1 | |
| (C$_9$)$_2$Mn | 287 | 219.7 | 263.6 | 73.9 | Simple |
| (C$_{10}$)$_2$Mn | 308 | 220.7 | 264.8 | 82.1 | hydrocarbon |
| (C$_{10}$)$_2$Fe | 360/311 | 215.5 | 274.4 | 84.2 | chains |
| (C$_{10}$)$_2$Cu | 309/312 | 244.4 | 293.3 | 90.6 | |
| (C$_{11}$)$_2$Mn | 316 | 270.6 | 324.7 | 103.1 | |
| (C$_{12}$)$_2$Mn | 332/336 | 285 | 342 | 118.1 | |
| (C$_{12}$)$_2$Cu | 328/334 | 252.9 | 303.5 | 95.3 | |
| (C$_3$OC$_4$)$_2$Cu | 243 | 130.7 | 183.0 | 44.5 | Fuctionalized |
| (C$_4$Ar)$_2$Cu | 338 | 62.7 | 70.8 | 23.9 | chains |
| (C$_6$OAr)$_2$Cu | 395 | 134 | 162 | 64 | |
| (C$_5$OH)$_2$Cu | 309 | 105.9 | 148.3 | 45.8 | |
| (C$_8$OH)$_2$Cu | 341 | 145.8 | 204.1 | 69.6 | |
| (C$_8$OH)$_2$Mn | 342 | 223.8 | 305.0 | 104.2 | |
| [C$_{11}$(COO)C$_2$]$_2$Cu | 355 | 252.7 | 331.0 | 117.5 | |

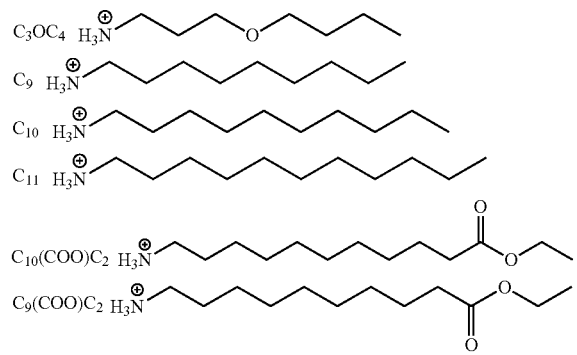

-continued

| Compound | $T_{tr}$ (K) | $\Delta S_{transition}$ (J kg$^{-1}$ K$^{-1}$) | $\Delta S_{transition}$ (J kg$^{-1}$ K$^{-1}$) | $Q_{tr}$ (kJ L$^{-1}$) |
|---|---|---|---|---|
| C$_{11}$(COO)C$_2$ H$_3$N$^+$ | | | | |
| C$_4$(C$_8$F$_{13}$) H$_3$N$^+$ | | | | |
| C$_2$O(C$_8$F$_{13}$) H$_3$N$^+$ | | | | |
| C$_4$Ph H$_3$N$^+$ | | | | |
| C$_5$OH H$_3$N$^+$ | | | | |
| C$_5$OH H$_3$N$^+$ | | | | |
| C$_5$OH H$_3$N$^+$ | | | | |
| C$_3$OC$_4$OH H$_3$N$^+$ | | | | |
| C$_3$OC$_5$OH H$_3$N$^+$ | | | | |
| C$_3$OPh H$_3$N$^+$ | | | | |

Table 1 shows a library of long-chain ammonium cations incorporated into layered perovskites. Structures of long-chain ammonium cations (left); thermal properties of layered perovskites incorporating the ammonium cation chains (right). $T_{tr}$, transition temperature; $\Delta S_{transition}$, entropy of phase transition; $Q_{tr}$, latent heat of phase transition. (R)$_2$M denotes layered perovskite (R—NH$_3$)$_2$MCl$_4$ Further examples include mixed halide 2D metal-halide perovskites. In these mixed perovskites all, or a portion of Cl anions can be replaced with Br or I anions for mixed-halide systems. These systems can have the formula [(R$^1$)$_x$(R$^2$)$_{1-x}$]$_2$MX$_y$X'$_{4-y}$, where R$^1$ and R$^2$ are long chain alkylammonium species (e.g., C$_n$H$_{2n+1}$NH$_3^+$, where n>3, e.g., >4, e.g., NA or DA) and where X and X' are different halides, e.g., selected from Cl, Br, or I, e.g., (R—NH$_3$)$_2$MCl$_{4-y}$Br$_y$ (0<y≤4), e.g., where M is a transition metal (e.g., Ti, V, Cr, Mn, Fe, Co, Ni, Cu, Zn, Nb, Mo, Rh, Pd, Cd, Re, Pt, or Hg) and R is nonyl (NA) or decyl (DA). Mixed halide compounds may also contain two or more halides (e.g., Cl and Br) and two or more different alkylammonium species. The different alkylammonium species may be in non-integer ratios relative to the metal center, for example: [(NA)$_{0.75}$(DA)$_{0.25}$]$_2$CuCl$_4$, [(NA)$_{0.5}$(DA)$_{0.5}$]$_2$CuCl$_4$, [(NA)$_{0.25}$(DA)$_{0.75}$]$_2$CuCl$_4$, [(NA)$_{0.25}$(UA)$_{0.75}$]$_2$CuCl$_4$, [(NA)$_{0.5}$(UA)$_{0.5}$]$_2$CuCl$_4$, or [(NA)$_{0.5}$(DA)$_{0.5}$]$_2$CuCl$_2$Br$_2$. In compounds of the formula [(R$^1$)$_x$(R$^2$)$_{1-x}$]$_2$MX$_y$X'$_{4-y}$, 'y' may be 0-4 (e.g., 0, 1, 2, 3, or 4) and 'x' may be between 0-1, e.g., about 0.1, 0.15, 0.2, 0.25, 0.3, 0.35, 0.4, 0.45, 0.5, 0.55, 0.6, 0.65, 0.7, 0.75, 0.8, 0.85, 0.9, or 0.95.

In some embodiments, modifications may be made to layered perovskites. These modifications can add functionalization. The functionalized layered perovskites may be formed by (i) combining two different modifications in a single chain (e.g., C$_3$OC$_4$OH) (ii) fluorinating the chain, or (iii) synthesizing layered halide double perovskites of the form (R—NH$_3$)$_4$MM'X$_8$ where M is a monovalent cation such as Na$^+$ and M' is a trivalent cation such as Fe$^{3+}$, X=Cl$^-$, Br$^-$. In some embodiments, one or more Cl, Br, or I halides may be replaced by F. A functionalized layered hybrid material may be formed from non-halide anions, such as CN$^-$, HCOO$^-$, N$_3^-$, N(CN)$_2^-$, BF$_4^-$, BH$_4^-$, PF$_6^-$, SCN$^-$, or OCN$^-$. Incorporation of larger anions can increase the pocket size for cations, for example, the alkylammonium species, thus relatively larger cations e.g., the largest cations of Table 1, or even dialkylammonium cations described herein.

In some embodiments, the working material can comprise a matrix that includes layered materials including an inorganic component and an organic component including long, optionally substituted alkyl chains, for example, the following barocaloric materials: di-n-alkylammonium salts (e.g., compounds of formula (C$_n$H$_{2n+1}$)$_2$NH$_2$X (n>3 (e.g., >4, e.g., C$_{4-36}$ alkyl chains) or compounds of formula (C$_n$H$_{2n+1}$)(C$_m$H$_{2m+1}$)NH$_2$X, where n is 1-3 or 4-36 and m is 4-36, e.g., where n=m, or where n=1-3 (e.g., 1) and m=4-36 (e.g., 6, 8, 10, or 12); where X is a monoanionic species, e.g., a halide (e.g., F, Cl, Br, or I) or a non-halide anion, such as NO$_3^-$, ClO$_3^-$, ClO$_4^-$, H$_2$PO$_4^-$, HSO$_4^-$, CN$^-$, HCOO$^-$, N$_3^-$, N(CN)$_2^-$, BF$_4^-$, BH$_4^-$, PF$_6^-$, SCN$^-$, or OCN$^-$), alkylammonium-modified layered silicates, and layered metal-alkylphosphonate salts. Alkylammonium species may have odd or even numbered main chains. Alkylammonium species may have main chain lengths of greater than 36 carbons (e.g., up to 38, 40, 45, 50, 60, 75, or 100 carbons). Alkylammonium species of the embodiment may be quaternary ammonium species (e.g., $Me_3N(C_nH_{2+1})X$ or $Me_2N(C_nH_{2n+1})_2X$, where n is >3, e.g., >4, e.g., 4-36, and where X is a monoanionic species, e.g., a halide). Dialkylammonium species of the embodiment may be asymmetric, e.g., having formula $(C_nH_{2n+1})(C_mH_{2m+1})NH_2X$ where n and m are both >3 (e.g., 4-36) but are not the same length. Further examples are in the following table:

| Type | Chemical Formula |
| --- | --- |
| 2-D perovskite or perovskite-like | $(OA)_2MnCl_4$ |
| | $(NA)_2MnCl_4$ |
| | $(NA)_2CuCl_4$ |
| | $(DA)_2CuCl_4$ |
| | $(NA)_2CuBr_4$ |
| | $(DA)_2ZnCl_4$ |
| Mixed 2D perovskites | $(NA)_2CuCl_3Br$ |
| | $(NA)_2CuCl_2Br_2$ |
| | $(NA)_2CuClBr_3$ |
| | $(DA)_2CuCl_3Br$ |
| | $(DA)_2CuCl_2Br_2$ |
| | $(DA)_2CuClBr_3$ |
| | $[(NA)_{0.75}(DA)_{0.25}]_2CuCl_4$ |
| | $[(NA)_{0.5}(DA)_{0.5}]_2CuCl_4$ |
| | $[(NA)_{0.25}(DA)_{0.75}]_2CuCl_4$ |
| | $[(NA)_{0.25}(UA)_{0.75}]_2CuCl_4$ |
| | $[(NA)_{0.5}(UA)_{0.5}]_2CuCl_4$ |
| | $[(NA)_{0.5}(DA)_{0.5}]_2CuCl_2Br_2$ |
| Di-n-alkyl ammonium salt | $(n\text{-}C_6H_{13})_2NH_2Br$ |
| | $(n\text{-}C_8H_{17})_2NH_2Cl$ |
| | $(n\text{-}C_6H_{13})_2NH_2Cl$ |
| | $(n\text{-}C_6H_{13})_2NH_2I$ |
| | $(n\text{-}C_8H_{17})_2NH_2Br$ |
| | $(n\text{-}C_{12}H_{25})_2NH_2Cl$ |
| | $(n\text{-}C_8H_{17})_2NH_2I$ |
| | $(n\text{-}C_{10}H_{21})_2NH_2Cl$ |
| | $(n\text{-}C_{10}H_{21})_2NH_2Br$ |
| | $(n\text{-}C_{10}H_{21})_2NH_2I$ |
| | $(n\text{-}C_{12}H_{25})_2NH_2Br$ |
| | $(n\text{-}C_{18}H_{37})_2NH_2Cl$ |
| | $(n\text{-}C_{18}H_{37})_2NH_2Br$ |
| | $(n\text{-}C_{12}H_{25})(CH_3)NH_2Br$ |
| | $(n\text{-}C_{12}H_{25})(CH_3)NH_2Cl$ |
| Intercalation compound (first-row transition metal) | $FeOCl \cdot C_{14}H_{29}NH_2{}^g$ |
| | $Ni(CN)_2 \cdot C_{12}H_{25}NH_2{}^h$ |
| | $Ni(CN)_2 \cdot C_{12}H_{25}NH_2{}^h$ |
| intercalated between montmorillonite (smectite) | $(C_{18}H_{37})_3NH^+$ |
| | Self-Assembled Monolayer |
| | $(C_{18}H_{37})_4N^+$ |
| | Self-Assembled Monolayer |
| Layered metallo-alkylphosphonate | $Mg(O_3PC_{22}H_{45})$ | wherein OA is octylammonium and UA is undecylammonium.

In some embodiments, a working material can comprise a soft organic material. A soft organic material may contain bilayers of long-chain organic cations linked through charge-assisted hydrogen bonds to charge-balancing anions. These soft organic materials can feature tremendous structural and chemical diversity through judicious selection of the cationic and anionic moieties of each material. A soft organic material can undergo thermally induced, solid-solid phase transitions. These transitions can occur near room temperature and can be between low-entropy, low-temperature and high-entropy, high-temperature states. The transitions may be driven by conformational disordering—effectively a partial melting transition in the solid state—of hydrocarbon bilayers. These order-disorder transitions can comprise substantial entropy changes, for example >100 J kg$^{-1}$ K$^{-1}$. They can also comprise large volume changes (7-10%). Applying and removing pressure cyclically to soft organic materials can lead to colossal di-alkylammonium halides $(C_nH_{2n+1})_2NH_2X$ (X=Cl, Br, I)—denoted here as $dC_nX$—soft organic materials that feature bilayers of cationic alkyl chains. In some embodiments, each of bilayer of cationic alkyl chains can be confined through hydrogen bonding with halides.

The soft organic material can comprise a soft organic salt. Soft organic salts may have the general formula (I):

(I)

and a counterion. $R_1$ and $R_2$ can be substituted polyfluorocarbyl (e.g., perfluoroalkyl) or hydrocarbyl (e.g., alkyl) groups. A can be N or P. In some embodiments, the counterion can be a monoanionic counterion (e.g., a halide (e.g., $F^-$, $Cl^-$, $Br^-$, or $I^-$)), an alkyl or polyfluoroalkyl sulfonate (e.g., triflate), or a carboxylate (e.g., an alkanoate, e.g., ethanoate, propanoate, etc.). The counterion can also be $NO_3^-$, $ClO_3^-$, $ClO_4^-$, $H_2PO_4^-$, $HSO_4^-$, $CN^-$, $HCOO^-$, $N_3^-$, $N(CN)_2^-$, $BF_4^-$, $BH_4^-$, $PF_6^-$, $SCN^-$, or $OCN^-$. In some embodiments, the counterion is a polyanion (e.g., a dianion or trianion). The soft organic salt may be an ammonium or a phosphonium salt.

$R_1$ and $R_2$ may be the same or different. For example, $R_1$ and $R_2$ may be alkyl groups of different lengths, or one of $R_1$ or $R_2$ may include a different functional group (e.g., a carbon-carbon double or triple bond, an alcohol, an aryl group, an ether or thioether, an ester or thioester, etc.). Alternatively, or in addition, one of $R_1$ or $R_2$ may be a polyfluorocarbyl group (e.g., a perfluoroalkyl group) and the other a hydrocarbyl group (e.g., an alkyl group). At least one of $R_1$ and $R_2$ may include an optionally substituted $C_{\geq 3}$ (e.g., $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, etc.) hydrocarbyl or polyfluorocarbyl chain. The difference in chain length (e.g., in the longest chain length counted from 'A') of $R_1$ and $R_2$ may be, e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 atoms. The atoms may comprise carbon, oxygen, or sulfur atoms, such as when one or both of $R_1$ or $R_2$ includes O or S atoms in the chain, as can be the case for polyethylene glycol or polythioethylene.

In some example embodiments, $R_1$ is Me or $F_3C—$, and $R_2$ is an optionally substituted $C_{\geq 3}$ hydrocarbyl or polyfluoroalkyl. $R_1$ and/or $R_2$ may be a polyether or polythioether. In some aspects, two or more methylene or perfluoromethylene subunits of $R_1$ and/or $R_2$ may be separated by an O or S. For example, the subunits may be separated by a polyethylene glycol chain or a polythioethylene chain.

Hydrocarbyl or polyfluorocarbyl chains may include one or more (e.g., 1, 2, 3, 4, 5, 6, 7, 8, 9, 10, 11, 12, 13, 14, 15, 16, or 17) C—C double bonds. C—C double bonds may include, for example, alkenyl groups. Hydrocarbyl or polyfluorocarbyl chains may include one or more (e.g., 1, 2, 3, 4, 5, 6, 7, 8, 9, 10, etc.) C—C triple bonds. C—C triple bonds may include, for example, alkynyl groups. Double or triple bonds may be between any two consecutive C atoms in a chain, e.g., the terminal two C atoms. Double or triple bonds may be in the main chain or in a side chain.

Some working materials may comprise the formula: $(C_nH_{2n+1})(C_mH_{2m+1})AH_2X$, wherein A=N or P, X=a counterion (which may be monoanionic or polyanionic), wherein m is 4-33 and n is 7-36, and wherein n−m≥3. Alternatively, compounds of the embodiment may have a formula: $(C_nH_{2n+1})(CH_2C_mF_{2m+1})AH_2X$ or $(C_nH_{2n+1})(C_mF_{2m+1})AH_2X$; where A=N or P, X=a counterion (which may be monoanionic or polyanionic), and where m is 1-36 and n is 1-36. Alternatively, compounds of the embodiment may have a formula: $(C_nH_{2n+1})(C_mH_{2m}CH=CH_2)AH_2X$, where A=N or P, X=a counterion (which may be monoanionic or polyanionic), and where m is 1-34 and n is 1-36.

In some embodiments, a working material can comprise $(C_6H_{13})NH_2(CH_3)Br$, $(C_8H_{17})NH_2(CH_3)Br$, $(C_{10}H_{21})NH_2(CH_3)Br$, $(C_{12}H_{25})NH_2(CH_3)Br$, $(C_6H_{13})(CH_3)NH_2Cl$, $(C_8H_{17})(CH_3)NH_2Cl$, $(C_{12}H_{25})(CH_3)NH_2Cl$, $(C_6H_{13})NH_2(CH_2C_9F_{11}H_2)Br$, $(C_{10}H_{21})NH_2(CH_2C_9F_{19})$ Cl, $(C_{10}H_{21})NH_2(CH_2C_9F_{19})Br$, $(C_{10}H_{21})NH_2(CH_2C_9F_{19})I$, $(C_{10}H_{21})NH_2(C_{10}H_{19})Br$, $(C_2H_5)NH_2(C_6H_{13})Br$, $(C_3H_7)NH_2(C_6H_{13})Br$, $(C_4H_9)NH_2(C_6H_{13})Br$, $(C_5H_{11})NH_2(C_6H_{13})Br$, or $(C_{12}H_{25})(CH_3)NH_2Cl$. A working material can also include these compounds with a different counterion listed.

Soft organic salts of the embodiment may form layered structures. The layered structures may be such that the organic cation is spatially confined by H-bonds or coulombic effects by the charge-balancing counterions. The layered structures may form a matrix or be incorporated within a matrix.

The matrix may be incorporated into any suitable form, for example, a foam (e.g., an open-celled foam), a powder (e.g., a fluidized powder), pellets, a surface coating (e.g., on one of the other forms described herein), beads (e.g., beads of the barocaloric material, or multilayered beads having the barocaloric material as a component, e.g., as a coating), a frit (e.g., sintered pellets, beads, particles, powder, etc., having high porosity, or, e.g., a frit of another sintered material, such as ceramic or metal, having a coating of the barocaloric material), crystals, a porous gel, a packed column, etc.

Barocaloric materials including the matrices and organic salts of the embodiment may be shaped using one or more additives, for example, binders, thermally conductive additives (e.g., graphite flakes), etc. Barocaloric materials may be provided in a physical form that affords high surface area while allowing for fluid flow. Barocaloric materials, including the matrices and organic salts of the embodiment, may also be provided in a form that confers high thermal conductivity.

Asymmetric soft organic ammonium salts of the embodiment may be synthesized. Briefly, the synthesis process can comprise the following steps: a primary amine undergoes a condensation reaction with a base-deprotected hydrocarbyl or polyfluorocarbyl ester to produce an amide, which is then reduced to form a secondary amine. Subsequent reaction with an acid (e.g., HBr) provides the salt. The great variety of primary amines, esters, and acids available allows for many possible soft organic salts to be prepared by this method.

In some embodiments, a working material comprises an organic polymer. For example, an organic polymer can comprise polyethylene (PE), poly(ethylene glycol) (PEG), poly(caprolactone) (PCL), poly(vinyl alcohol) (PVA), poly (acrylic acid) (PAA), poly(methyl methacrylate) (PMMA), poly(vinyl acetate) (PVAc), poly(ethylene oxide) (PEO), poly(propylene glycol) (PPG), poly(styrene) (PS), poly(vinyl methyl ether) (PVME), poly(vinylidene fluoride) (PVDF), poly(hydroxybutyrate) (PHB), poly(ethylene adipate) (PEA), poly(butadiene) (PB), poly(isobutylene) (PIB), poly(4-methyl-1-pentene) (PMP), poly(cyclohexene dimethylene terephthalate) (PCT), poly(styrene-co-acrylonitrile) grafting with palmitic acid copolymers, poly(polyethylene glycol octadecyl ether), polystyrene-graft-PEG copolymers, maleic anhydride-modified PEG grafted onto a polyacrylonitrile chain, poly(3-hydroxybutyrate-co-3-hydroxyvalerate) (PHBV)/PEG copolymer, or combinations thereof. In some embodiments, an organic polymer can comprise a rubber. For example, a rubber can comprise natural rubber (NR), styrene-butadiene rubber (SBR), butadiene rubber (BR), nitrile rubber (NBR), ethylene-propylene-diene monomer rubber (EPDM), chloroprene rubber (CR or Neoprene), silicone rubber (Q, MQ, VMQ, PVMQ), butyl rubber (IIR), halogenated butyl rubbers (XIIR, CIIR, BIIR), polyurethane rubber (AU, EU), acrylic rubber (ACM, AEM), fluorocarbon rubber (FKM, Viton), fluorosilicone rubber (FVMQ), polyisoprene rubber (IR), epichlorohydrin rubber (ECO), perfluoro elastomer (FFKM), hydrogenated nitrile rubber (HNBR), thermoplastic elastomers (TPE).

In some embodiments, a working material (e.g., an organic polymer) may be blended with other materials or undergo chemical modifications to change (e.g., enhance) a phase-change property. The property changed can be specific to a particular application. A chemical modification can include co-polymerization with two or more polymers, grafting, adding functional groups, changing functional groups, or combinations thereof. Co-polymerization with two or more polymers can provide a co-polymeric phase-change material.

In some embodiments a working material comprises an organic solvent. In some embodiments an organic solvent undergoes a solid-liquid phase transition. An organic solvent can comprise acetic acid, acetic anhydride, acetone, acetonitrile, benzene, benzonitrile, 1-butanol, 2-butanone, butyl acetate, tert-butyl methyl ether, carbon disulfide, carbon tetrachloride, chlorobenzene, 1-chlorobutane, chloroform, cyclohexane, cyclopentane, 1,2-dichlorobenzene, 1,2-dichloroethane, dichloromethane, 2-ethoxyethyl ether, N,N-dimethylacetamide, N,N-dimethylformamide, 1,4-dioxane, ether, ethyl acetate, ethyl alcohol, ethylene glycol dimethyl ether, heptane, hexane, 2-methoxyethanol, 2-methoxyethyl acetate, methyl alcohol, 2-methylbutane, 3-methyl-1-butanol, 4-methyl-2-pentanone, 2-methyl-1-propanol, 2-methyl-2-propanol, 1-methyl-2-pyrrolidinone, methyl sulfoxide, nitromethane, 1-octanol, pentane, 3-pentanone, 1-propanol, 2-propanol, propylene carbonate, pyridine, tetrachloroethylene, tetrahydrofuran, toluene, 1,1,2-trichlorotrifluoroethane, 2,2,4-trimethylpentane, m-xylene, o-xylene, p-xylene, or combinations thereof.

In some embodiments, a working material comprises an ionic liquid. In some embodiments an ionic liquid undergoes a solid-liquid phase transition. An ionic liquid can comprise butyl-3-methylimidazolium hexafluorophosphate ([BMIM][PF$_6$]), 1-butyl-3-methylimidazolium chloride ([BMIM][Cl]), 1-ethyl-3-methylimidazolium tetrafluoroborate ([EMIM][BF$_4$]), 1-ethyl-3-methylimidazolium ethyl sulfate ([EMIM][EtSO$_4$]), 1-butyl-3-methylimidazolium bis(trifluoromethylsulfonyl)imide ([BMIM][Tf$_2$N]), 1-hexyl-3-methylimidazolium hexafluorophosphate ([HMIM][PF$_6$]), 1-allyl-3-methylimidazolium chloride ([AMIM][Cl]), trihexyl(tetradecyl) phosphonium bis(trifluoromethylsulfonyl) imide ([P$_{66614}$][Tf$_2$N]), N,N-Diethyl-N-methyl-N-(2-methoxyethyl) ammonium tetrafluoroborate ([DEME][BF4]), 1-butylpyridinium tetrafluoroborate ([BPyr][BF$_4$]), 1-octyl-3-methylimidazolium bromide ([OMIM][Br]), 1-dodecyl-3-methylimidazolium chloride ([DMIM][Cl]), 1-decyl-3-methylimidazolium bis(trifluoromethylsulfonyl) imide ([DMIM][Tf$_2$N]), N-butyl-N-methylpyrrolidinium bis(trifluoromethylsulfonyl)imide ([BMPyr][Tf$_2$N]), 1-butyl-3-methylimidazolium dicyanamide ([BMIM][DCA]), 1-butyl-1-methylpyrrolidinium bis(trifluoromethylsulfonyl)imide ([BMPyrrol][Tf$_2$N]), N-ethyl-N-methylmorpholinium ethylsulfate ([EMMorph][EtSO$_4$]), N-butyl-N-methylmorpholinium dicyanamide ([BMMorph][DCA]), 1-butyl-3-methylimidazolium acetate ([BMIM][OAc]), 1-butyl-3-methylimidazolium thiocyanate ([BMIM][SCN]), or combinations thereof.

In some embodiments, a working material comprises a deep eutectic solvent. A deep eutectic solvent can comprise choline chloride-urea, choline chloride-glycerol, choline chloride-malonic acid, choline chloride-ethylene glycol, choline chloride-thiourea, choline chloride-zinc chloride, betaine-acetamide, L-proline-urea, malic acid-choline chloride, glycerol-lactic acid, ethylene glycol-lactic acid, phenylacetic acid-choline chloride, glycerol-malic acid, or combinations thereof.

In some embodiments, a working material comprises a biopolymer. A biopolymer can be a material derived from a biological source. A biopolymer can comprise a fatty acid (e.g., palmitic acid, stearic acid, myristic acid, lauric acid), a vegetable oil (e.g., sunflower oil, olive oil, canola oil, soybean oil), a wax (e.g., beeswax, carnauba wax, soy wax, rice bran wax), an esterified fatty acid (e.g., methyl palmitate, ethyl stearate), a triglyceride (e.g., tripalmitin, tristearin, trimyristin), an alkane derived from a plant oils (e.g., hexadecane, heptadecane), a starch-based material (e.g., hydroxyethyl starch, carboxymethyl starch, starch acetate, starch palmitate), a lignin-based material (e.g., lignin phenol formaldehyde, lignosulfonate salts, acetylated lignin, lignin-based carbon fibers), a glycerol derivative (e.g., glycerol monostearate, glycerol distearate, glycerol tristearate, glycerol monooleate), cholesterol, a cholesterol derivative (e.g., cholesteryl benzoate, cholesteryl oleate, cholesteryl chloride, cholesteryl nonanoate), a bio-based poly(ethylene glycol) derivative (e.g., PEG-ylated plant oils, PEG stearate, PEG oleate, PEG-lignin derivatives), a bio-based polyols (e.g., castor oil-based polyols, soy-based polyols, palm oil-based polyols, canola oil-based polyols), triacylglycerol, a phospholipid, a sphingolipid, a glycolipid, a sterol ester, a free fatty acid, a diacylglycerol, a monoacylglycerol, a ceramide, a lipoprotein, a wax ester, a cardiolipin, a lipoamino acid, a prenol lipid, a sulfolipid, a polyketide, a lipopolysaccharide, or combinations thereof.

In some embodiments, a working material comprises a sugar alcohol. A sugar alcohol can comprise erythritol, xylitol, mannitol, sorbitol, lactitol, maltitol, isomalt, glycerol, arabitol, ribitol, galactitol, threitol, iditol, volemitol, dulcitol, fucitol, inositol, altritol, allitol, sedoheptulitol, or combinations thereof. In some embodiments, a working material comprises psicose or tagatose.

In some embodiments, a working material comprises an organic plastic crystal. An organic plastic crystal can comprise pentaerythritol, neopentyl glycol, neopentyl alcohol, neopentylamine, neopentyl glycol diacetate, neopentyl glycol dicaprate, neopentyl glycol distearate, neopentyl glycol dibenzoate, neopentyl bromide, neopentyl chloride, neopentyl iodide, neopentyl fluoride, neopentyl glycol monobromide, neopentyl glycol monochloride, neopentyl glycol monoiodide, neopentyl glycol monofluoride, neopentyl glycol diamine, neopentyl glycol dicarboxylic acid, neopentyl glycol mononitrate, neopentyl glycol carbonate, neopentyl glycol sulfate, cyclohexane, camphor, succinonitrile, cyclopentane, benzene, naphthalene, anthracene, coronene, phenanthrene, cholesteryl esters, adamantane, 1-adamantanol, 2-adamantanol, 1-adamantylamine, 1-adamantanecarboxylic acid, 2-adamantanone, 1,3-adamantanediol, adamantane-1-carbaldehyde, 1-bromo-adamantane, 1-chloro-adamantane, 1-iodo-adamantane, 1-fluoro-adamantane, 2-bromo-adamantane, 2-chloro-adamantane, 2-iodo-adamantane, 2-fluoro-adamantane, 1,3-dibromo-adamantane, 1,3-dichloro-adamantane, 1,3-diiodo-adamantane, 1,3-difluoro-adamantane, adamantane-1,3-dicarboxylic acid, 1-adamantyl chloride, 1-adamantyl bromide, 1-adamantyl iodide, 1-adamantyl fluoride, 2-adamantyl chloride, 2-adamantyl bromide, 2-adamantyl iodide, 2-adamantyl fluoride, or combinations thereof.

In some embodiments, a working material comprises a solid electrolyte. A solid electrolyte can demonstrate a phase transition involving a diffusion of ions. A solid electrolyte can comprise LiCB$_{11}$H$_{12}$, NaCB$_{11}$H$_{12}$, KCB$_{11}$H$_{12}$, LiCB$_9$H$_{10}$, Li$_{10}$GeP$_2$S$_{12}$, Li$_7$La$_3$Zr$_2$O$_{12}$ (LLZO), Li$_3$Y(PS$_4$)$_2$, Li$_3$YCl(PS$_4$)$_2$, Li$_3$PS$_4$, Li$_2$S—P$_2$S$_5$, Li$_6$PS$_5$Br, Li$_4$GeS$_4$, Li$_4$SiS$_4$, Na$_3$Zr$_2$Si$_2$PO$_{12}$, Na$_3$Zr$_2$Sb$_2$PO$_{12}$, β-Al$_2$O$_3$, Li$_7$P$_3$S$_{11}$, LiI, Li$_3$N, Li$_3$PO$_4$, LiTaSiO$_5$, AgI, CuI, Na$_3$PS$_4$.

In some embodiments, a working material comprises a liquid electrolyte. A liquid electrolyte can undergo reversible solid-liquid phase transition. A liquid electrolyte can comprise an electrolyte dissolved in a solvent. A solvent can comprise ethylene carbonate/dimethyl carbonate (EC/DMC), propylene carbonate (PC), 1,3-dioxolane/dimethoxyethane (DOL/DME), acetonitrile (ACN), or combinations thereof. A liquid electrolyte can comprise LiPF$_6$ in EC/DMC, LiClO$_4$ in PC, LiTFSI in DOL/DME, NaPF$_6$ in EC/DMC, NaTFSI in diglyme, LiBF$_4$ in PC, NaBF$_4$ in EC/DMC, LiAsF$_6$ in EC/DMC, LiCF$_3$SO$_3$ in DME, TEABF$_4$ in ACN, TEAPF$_6$ in ACN, NaFSI in diglyme, EMITFSI in PC, LiBETI in EC/DEC, LiBOB in DOL/DME, NaBOB in EC/DMC, LiFSI in EC/DMC, LiDFOB in DOL/DME, or combinations thereof.

In some embodiments, a working material comprises a guanidinium-based salt. A guanidinium-based salt can comprise guanidinium chloride (GdmCl), guanidinium sulfate, guanidinium thiocyanate, guanidinium nitrate, guanidinium hydroxide, guanidinium carbonate, guanidinium bromide, guanidinium iodide, guanidinium acetate, guanidinium trifluoroacetate, guanidinium perchlorate, guanidinium hexafluorophosphate (GdmPF6), guanidinium tetrafluoroborate (GdmBF4), guanidinium triflate (GdmOTf), or combinations thereof.

In some embodiments, a working material can comprise a thermal battery. A working material may be a pressure-sensitive material. A pressure sensitivity of the working material may be inverted. A pressure sensitivity of the working material may be large (for example, dT/dP<<−10 K/kbar). A working material may be a thermal battery. In some embodiments, mixing a pressure transmitting medium and a working material can produce a mixture that is capable of functioning as a thermal battery. A thermal battery may store or release thermal energy through reversible phase transitions that may be triggered by a PTM. A thermal battery may store thermal energy. A thermal battery may release thermal energy. A thermal battery may store or release thermal energy through a reversible reaction. A thermal battery may store or release thermal energy through a reversible reaction in response to a shift in pressure. A thermal battery may store or release thermal energy through a reversible reaction in response to a small shift in pressure (for example, ΔP<100 bar). A thermal battery may store or release thermal energy on demand through a reversible reaction in response to a small shift in pressure (for example, ΔP<100 bar).

In some embodiments, a thermal battery can store or release thermal energy through a reversible reaction in response to a shift in temperature. In an embodiment where an external environment of the working material is hotter than the working material, the working material may store thermal energy. In an embodiment where an external environment of the working material is hotter than the working material, the working material may store thermal energy through an endothermic transition. In an embodiment where an external environment of the working material is colder than the working material, the working material may release thermal energy. In an embodiment where an external environment of the working material is colder than the working material, the working material may release thermal energy through an exothermic transition.

In some embodiments, an operating temperature of a thermal battery may be set by the transition temperature of the thermal battery. The operating temperature of the thermal battery, wherein the thermal battery is a working material, may be set by the transition temperature of the working material. The transition temperature may be tuned by changing the amount of pressure applied to the working material. The transition temperature may be tuned by applying a small change in pressure (for example, ΔP<100 bar) to the working material. The change in pressure may be tuned by a change in PTM pressure. The transition temperature of the working material may be continuously tuned. The transition temperature of the working material may be continuously tuned to approximate an external temperature of the thermal battery.

In some embodiments, a thermal battery may store or release thermal energy in response to a change in pressure or a change in temperature. In some embodiments, a thermal battery may store or release thermal energy in response to a change in pressure and a shift in temperature. In some embodiments, a thermal battery may store or release thermal energy in response to a change in pressure and a change in temperature at the same time. In some embodiments, a thermal battery may store or release thermal energy in response to a change in pressure and a change in temperature at temporally distinct intervals.

Additives and Encapsulation

In some embodiments, an additive may be added to a material (i.e., a working material or a pressure transmitting material). An additive can comprise a material to increase or decrease a thermal conductivity of a working material, to increase or decrease stability of a working material, to increase or decrease a porosity of a working material, to encapsulate a working material. An additive can comprise a material to increase or decrease a thermal conductivity of a pressure transmitting medium, to increase or decrease stability of a pressure transmitting medium, or to encapsulate a pressure transmitting medium with a working material. An additive can comprise a thermal transfer fluid.

In some embodiments, an additive can improve a thermal conductivity of a material. Non-limiting examples of an additive that can improve a thermal conductivity of a material can comprise aluminum nitride (AlN), copper, carbon nanotubes, multi-walled carbon nanotubes (MWCNT), graphite nanoplatelets (GNP), aerogels based on GNP, foam based on GNP, graphite, exfoliated graphite (EG), graphene and its derivatives (such as MWCNT with exposed functional groups (—COOH, —NH$_2$, —OH)), graphene oxides (GO), hybrid graphene aerogels (HGAs) that contain both GO and GNP, sulphonated graphene (SG), graphite foams, carbon nanofibers (CNF), metallic nanoparticles, porous metals, graphene/ceramic composites, metal nanoparticles (such as silver nanoparticles), metallic particles/beads, or combinations thereof.

In some embodiments, a working material may be encapsulated by an additive. Non-limiting examples of additives that may encapsulate a working material can comprise aluminum nitride (AlN), copper, carbon nanotubes, multi-walled carbon nanotubes (MWCNT), graphite nanoplatelets (GNPs), aerogels based on GNP, foam based on GNP, graphite, exfoliated graphite (EG), graphene and its derivatives (such as MWCNT with exposed functional groups (—COOH, —NH$_2$, —OH)), graphene oxides (GO), hybrid graphene aerogels (HGAs) that contain both GO and GNP, sulphonated graphene (SG), graphite foams, carbon nanofibers (CNF), metallic nanoparticles, porous metals, graphene/ceramic composites, metal nanoparticles (such as silver nanoparticles), metallic particles/beads, or combinations thereof.

Pressure Transmitting Medium

In some embodiments, a system or method can comprise a pressure transmitting medium (PTM). A PTM can transmit pressure to a material (e.g., a working material, a barocaloric material, a pressure sensitive material). A PTM can be a solid or a fluid. In some embodiments, a PTM may induce a change in a property of a working material. A PTM can directly interact with a working material. In some embodiments, a PTM can permeate into, interact with, or dissolve in a working material. A PTM can induce a change in a working material property by permeating into, interacting with, or dissolving in a working material. A PTM may permeate into a free volume in the working material. The free volume can comprise an organic layer. In some embodiments, a PTM can be an inert gas. In some embodiments, the inert gas can also interact with the working material at the microscopic level. The interaction can be a non-covalent interaction. In some embodiments, the interaction can be a Van der Waal's-type interaction, e.g., via dispersion forces. In some embodiments, the extent of permeation (e.g., amount of gas molecules in the free volume/interacting with the composition) and degree and nature of interaction (e.g., strength of interaction, e.g., determined by a molecule or atom's size, shape, polarizability, etc.) can determine the effect of the PTM on thermal transitions of the composition. A PTM can display non-hydrostaticity.

In some embodiments, a PTM can comprise a gas. In some embodiments, a PTM can comprise an inert gas. In some embodiments, a PTM can comprise nitrogen, argon, krypton, xenon, neon, methane, ethane, propane, cyclopropane, chloroform, dichloromethane, butane, sulfur hexafluoride, or carbon dioxide. In some embodiments, a PTM can comprise ethylene, nitrous oxide, an anesthetic gas (e.g., halothane, isoflurane, desflurane, sevoflurane), acetylene, a hydrofluorocarbon (e.g., R-134a), a hydrofluoroolefin (e.g., HFO-1234zea), nonhalogenated ether (e.g., diethyl ether), or combinations thereof. In some embodiments, a PTM can comprise a liquid. In some embodiments, a PTM can comprise an oil, a liquid hydrocarbon, an alcohol, a perfluorocarbon, an ionic liquid, an aqueous solution, an aqueous salt solution, or combinations thereof. In some embodiments, a PTM can comprise fluorocarbon oil, silicone oil, pentane, hexane, methanol, ethanol, alkylsilane (e.g., Daphne 7474), perfluorocarbon (e.g., Fluorinert), water, hydraulic oil, mercury (Hg), mineral oil, glycerin, ethylene glycol, transformer oil, kerosene (a mixture of hydrocarbons), silicone grease, liquid ammonia, liquid nitrogen, sodium-potassium alloy, gallium, indium, liquid crystals, polyalphaolefin, liquid paraffin (e.g., a mixture of alkanes), grease, petroleum jelly (e.g., Vaseline), phosphate ester, polyol ester, propylene glycol, brake fluid, automatic transmission fluid, vegetable oils (e.g., canola oil, olive oil), synthetic oils, corn syrup or combinations thereof.

In some embodiments, a pressure transmitting medium can comprise a solid. For example, a PTM can comprise sapphire (aluminum oxide, $Al_2O_3$), quartz (silicon dioxide, $SiO_2$), diamond anvil (carbon, C), neoprene (polychloroprene), polyurethane, polytetrafluoroethylene (PTFE), epoxy resin, polydimethylsiloxane (PDMS), polymethyl methacrylate (PMMA), paraffin wax (a mixture of alkanes), latex, silicone rubber, or combinations thereof.

In some embodiments, a pressure transmitting medium can comprise an organic solvent. An organic solvent can comprise, for example, acetic acid, acetic anhydride, acetone, acetonitrile, benzene, benzonitrile, 1-butanol 2-butanone, butyl acetate, tert-butyl methyl ether, carbon disulfide, carbon tetrachloride, chlorobenzene, 1-chlorobutane, chloroform, cyclohexane, cyclopentane, 1,2-dichlorobenzene, 1,2-dichloroethane, dichloromethane, 2-ethoxyethyl ether, N,N-dimethylacetamide, N,N-dimethylformamide, 1,4-dioxane, ether, ethyl acetate, ethyl alcohol, ethylene glycol dimethyl ether, heptane, hexane, 2-methoxyethanol, 2-methoxyethyl acetate, methyl alcohol, 2-methylbutane, 3-methyl-1-butanol, 4-methyl-2-pentanone, 2-methyl-1-propanol, 2-methyl-2-propanol, 1-methyl-2-pyrrolidinone, methyl sulfoxide, nitromethane, 1-octanol, pentane, 3-pentanone, 1-propano, 2-propanol, propylene carbonate, pyridine, tetrachloroethylene, tetrahydrofuran, toluene, 1,1,2-trichlorotrifluoroethane, 2,2,4-trimethylpentane, m-xylene, o-xylene, p-xylene, or combinations thereof.

In some embodiments, a pressure transmitting medium can comprise an ionic liquid. An ionic liquid can comprise 1-butyl-3-methylimidazolium hexafluorophosphate ([BMIM][PF$_6$]), 1-butyl-3-methylimidazolium chloride ([BMIM][Cl]), 1-ethyl-3-methylimidazolium tetrafluoroborate ([EMIM][BF$_4$]), 1-ethyl-3-methylimidazolium ethyl sulfate ([EMIM][EtSO$_4$]), 1-butyl-3-methylimidazolium bis(trifluoromethylsulfonyl)imide ([BMIM][Tf$_2$N]), 1-hexyl-3-methylimidazolium hexafluorophosphate ([HMIM][PF$_6$]), 1-allyl-3-methylimidazolium chloride ([AMIM][Cl]), trihexyl(tetradecyl) phosphonium bis(trifluoromethylsulfonyl) imide ([P$_{66614}$][Tf$_2$N]), N,N-diethyl-N-methyl-N-(2-methoxyethyl) ammonium tetrafluoroborate ([DEME] [BF$_4$]), 1-butylpyridinium tetrafluoroborate ([BPyr][BF$_4$]), 1-octyl-3-methylimidazolium bromide ([OMIM][Br]), 1-dodecyl-3-methylimidazolium chloride ([DMIM][Cl]), 1-decyl-3-methylimidazolium bis(trifluoromethylsulfonyl) imide ([DMIM][Tf$_2$N]), N-butyl-N-methylpyrrolidinium bis(trifluoromethylsulfonyl)imide ([BMPyr][Tf2N]), 1-butyl-3-methylimidazolium dicyanamide ([BMIM] [DCA]), 1-butyl-1-methylpyrrolidinium bis(trifluoromethylsulfonyl)imide ([BMPyrrol][Tf$_2$N]), N-ethyl-N-methylmorpholinium ethylsulfate ([EMMorph][EtSO$_4$]), N-butyl-N-methylmorpholinium dicyanamide ([BMMorph][DCA]), 1-butyl-3-methylimidazolium acetate ([BMIM][OAc]), 1-butyl-3-methylimidazolium thiocyanate ([BMIM][SCN]), or combinations thereof.

In some embodiments, a pressure transmitting medium can comprise a deep eutectic solvent. A deep eutectic solvent can comprise choline chloride-urea, choline chloride-glycerol, choline chloride-malonic acid, choline chloride-ethylene glycol, choline chloride-thiourea, choline chloride-zinc chloride, betaine-acetamide, L-proline-urea, malic acid-choline chloride, glycerol-lactic acid, ethylene glycol-lactic acid, phenylacetic acid-choline chloride, glycerol-malic acid or combinations thereof.

In some embodiments, a pressure transmitting medium can comprise a liquid electrolyte. A liquid electrolyte can comprise LiPF$_6$ in ethylene carbonate/dimethyl carbonate (EC/DMC), LiClO$_4$ in propylene carbonate (PC), LiTFSI in 1,3-dioxolane/dimethoxyethane (DOL/DME), NaPF$_6$ in EC/DMC, NaTFSI in diglyme, LiBF$_4$ in PC, NaBF$_4$ in EC/DMC, LiAsF$_6$ in EC/DMC, LiCF$_3$SO$_3$ in DME, TEABF$_4$ in acetonitrile (ACN), TEAPF$_6$ in ACN, NaFSI in diglyme, EMITFSI in PC, LiBETI in EC/DEC, LiBOB in DOL/DME, NaBOB in EC/DMC, LiFSI in EC/DMC, LiDFOB in DOL/DME, or combinations thereof.

In some embodiments, a pressure transmitting medium can comprise a fluid utilized in a vapor compression refrigeration cycle. A fluid utilized in a vapor compression refrigeration cycle can comprise a hydrochlorofluorocarbon (HCFC) and hydrochlorocarbon (HCC), a hydrofluorocarbon (HFC), a hydrofluoroolefin (HFO), a hydrochlorofluoroolefin (HCFO), a hydrocarbon, an ether, trifluoroiodomethane, ammonia, water, carbon dioxide, sulfur dioxide, 1,1,1,2,2,4,5,5,5-nonafluoro-4-(trifluoromethyl)-3-pentanone (Novec 649), or combinations thereof. In some embodiments, an HCFC and HCC can comprise dichlorofluoromethane, chlorodifluoromethane, chloromethane, 2,2-dichloro-1,1,1-trifluoroethane, 1-chloro-1,2,2,2-tetrafluoroethane, 1,1-dichloro-1-fluoroethane, 1-chloro-1,1-difluoroethane, 1,2-dichloroethane, or combinations thereof. In some embodiments, an HFC can comprise trifluoromethane, difluoromethane, fluoromethane, pentafluoroethane, 1,1,1,2-tetrafluoroethane, 1,1,1-trifluoroethane, 1,1-difluoroethane, fluoroethane, 1,1,1,2,3,3,3-heptafluoropropane, 1,1,1,2,3,3-hexafluoropropane, 1,1,1,3,3,3-hexafluoropropane, 1,1,2,2,3-pentafluoropropane, 1,1,1,3,3-pentafluoropropane, 1,1,1,3,3-pentafluorobutane, octafluorocyclobutane, or combinations thereof. In some embodiments, an HFO can comprise trifluoroethene, 2,3,3,3-tetrafluoroprop-1-ene, trans-1,3,3,3-tetrafluoropropene, cis-1,3,3,3-tetrafluoropropene, 3,3,3-trifluoropropene, (Z)-1,1,1,4,4,4-hexafluoro-2-butene, or combinations thereof. In some embodiments, a hydrochlorofluoroolefin can comprise (Z)-1-chloro-2,3,3,3-tetrafluoropropene or trans-1-chloro-3,3,3-trifluoro-1-propene. In some embodiments, a hydrocarbon can comprise ethane, propane, n-butane, 2-methylpropane, n-pentane, ethene, propene, or combinations thereof. In some embodiments, an ether can comprise methyl trifluoromethyl ether, dimethyl ether, methyl pentafluoroethylether, 2,2,2-trifluoroethyldifluoromethyl-ether, 1,1,1,2,2,3,3-heptafluoro-3-methoxypropane, or combinations thereof.

In some embodiments, a pressure transmitting medium can comprise water or an aqueous solution. In some embodiments, an aqueous solution can comprise an ion that can be used to trigger phase transition of the pressure-sensitive material. In some embodiments, an ion can comprise a monovalent ion, a divalent ion, a trivalent ion, or combinations thereof. In some embodiments, a monovalent ion can comprise H$^+$, OH$^-$, Li$^+$, Na$^+$, K$^+$, Rb$^+$, Cs$^+$, F$^-$, Cl$^-$, Br$^-$, I$^-$, NO$_3^-$, CH$_3$COO$^-$, C$_6$H$_5$COO$^-$, NH$_4^+$, CN$^-$, SCN$^-$, or combinations thereof. In some embodiments, a divalent ion can comprise Be$^{2+}$, Mg$^{2+}$, Ca$^{2+}$, Sr$^{2+}$, Ba$^{2+}$, Zn$^{2+}$, Cd$^{2+}$, Hg$^{2+}$, Cu$^{2+}$, Pb$^{2+}$, Fe$^{2+}$, Co$^{2+}$, Ni$^{2+}$, Mn$^{2+}$, Sn$^{2+}$, SO$_4^{2-}$, CO$_3^{2-}$, C$_2$O$_4^{2-}$, SeO$_4^{2-}$, S$_2$O$_3^{2-}$, SO$_3^{2-}$, or combinations thereof. In some embodiments, trivalent ions can comprise Fe$^{3+}$, Al$^{3+}$, La$^{3+}$, Ce$^{3+}$, Pr$^{3+}$, Nd$^{3+}$, Sm$^{3+}$, Eu$^{3+}$, Gd$^{3+}$, Tb$^{3+}$, Bi$^{3+}$, PO$_4^{3-}$, Fe(CN)$_6^{3-}$, AsO$_4^{3-}$, or combinations thereof.

In some embodiments, a pressure transmitting medium can comprise an anesthetic agent. An anesthetic agent can comprise nitrous oxide, xenon, diethyl ether, chloroform, halothane, enflurane, isoflurane, sevoflurane, desflurane, methoxyflurane, trichloroethylene, cyclopropane, lidocaine, bupivacaine, ropivacaine, procaine, tetracaine, mepivacaine, prilocaine, articaine, benzocaine, levobupivacaine, or combinations thereof. In some embodiments, a pressure transmitting medium can comprise an anesthetic agent. An anesthetic agent can comprise nitrous oxide, xenon, diethyl ether, chloroform, halothane, enflurane, isoflurane, sevoflurane, desflurane, methoxyflurane, trichloroethylene, cyclopropane, or combinations thereof.

In some embodiments, a pressure transmitting medium can further comprise a component that can improve a thermal conductivity of the pressure transmitting medium, wherein the component can comprise an additive. Non-limiting examples of an additive that can improve a thermal conductivity of the pressure transmitting medium can comprise aluminum nitride (AlN), copper, carbon nanotubes, multi-walled carbon nanotubes (MWCNT), graphite nanoplatelets (GNP), aerogels based on GNP, foam based on GNP, graphite, exfoliated graphite (EG), graphene and its derivatives (such as MWCNT with exposed functional groups (—COOH, —NH$_2$, —OH)), graphene oxides (GO), hybrid graphene aerogels (HGA) that contain both GO and GNP, sulphonated graphene (SG), graphite foams, carbon nanofibers (CNF), metallic nanoparticles, porous metals, graphene/ceramic composites, metal nanoparticles (such as silver nanoparticles), metallic particles/beads, or combinations thereof.

Methods

The methods provided herein may be used to transfer energy (e.g., thermal energy). The provided methods may be used or applications in cooling, heating, or energy storage (e.g., thermal energy storage).

In some embodiments, the methods comprise changing a pressure of a composition. The composition may comprise a pressure transmitting medium (PTM) and a working material. Changing a pressure of the composition may comprise increasing or decreasing the pressure. Increasing the pressure can form a compressed composition. Increasing the pressure may cause the composition to undergo a phase change, to enter a disordered state, to undergo an endothermic phase change, or combinations thereof. Increasing the pressure may cause the PTM to mix with the working material, to permeate the working material, to dissolve in the working material, to intercalate in the working material, to be absorbed by the working material, or combinations thereof. Mixing the pressure transmitting medium and the working material may produce a mixture that is capable of functioning as a thermal battery. A compressed composition may be in a disordered state. A compressed composition may have energy added to the composition. The energy may be thermal energy. The energy may be provided by a heat source. The energy may be added to the composition directly, or by a thermally conductive medium in thermal communication with the composition, for example a heat transfer fluid or a PTM. The compressed composition may comprise a thermal battery. The compressed composition may be decompressed. Decreasing the pressure can form a decompressed composition. Decreasing the pressure may cause the composition to undergo a phase change, to enter an ordered state, to undergo an exothermic phase change, or combinations thereof. Decreasing the pressure may cause the PTM to separate from the working material, to evacuate the working material, to precipitate out of the working material, to deintercalate from the working material, to desorb from the working material, or combinations thereof. A decompressed composition may be in an ordered state. The decompressed composition may release energy as part of an exothermic phase change. The released energy may be transferred out of the composition. The energy may be transferred to a heat sink. The energy may be transferred out directly, or by a thermally conductive medium in thermal communication with the composition. A thermally conductive medium can be a thermal transfer fluid, a heat transfer fluid or a PTM. The thermally conductive medium can be circulated between the composition and a heat sink or a heat source. After transferring the energy, the composition can be compressed to form a compressed composition. The composition can be compressed or decompressed multiple times. The composition can be cycled between pressures while energy is added or removed to transfer heat from a heat source to a heat sink.

A heat transfer fluid can comprise a thermal transfer fluid. A thermal transfer fluid can comprise ethylene glycol, propylene glycol, eutectic mixtures of biphenyl and diphenyl oxide (e.g., Dowtherm A, Therminol), silicone oil, mineral oil (e.g., Paratherm), polyalphaolefins (PAO), pentaerythritol tetraalkanoates, hydrogenated terphenyls, diphenyl ether, biphenyl, perfluoropolyether (e.g., Galden), perfluoroalkanes (e.g., Fluorinert), potassium formate (e.g., Dynalene), mono- and dibenzyltoluene (e.g., Marlotherm), NaK (sodium-potassium alloy), eutectic salts, molten salts (e.g., Hitec), refrigerants (such as R-134a, R-410a, R-22), or combinations thereof. In some embodiments, a thermal transfer fluid can further comprise an additive, wherein the additive can comprise nanoparticles (e.g., $Al_2O_3$, CuO, SiC, $TiO_2$), carbon nanotubes, graphene, graphite, metallic particles, boron nitride, diamond powder, carbon black, fullerene, hydrotreated mineral oils, organosilanes, polymeric stabilizers, surfactants, antioxidants, anti-foaming agents, corrosion inhibitors, or combinations thereof.

A heat source can comprise, for example, a room, an AC system, a heat transfer medium, a heat pump, an exterior or interior environment, or combinations thereof.

The composition may be compressed by at least about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 50, 60 70, 80, 90, 100, 110, 120, 130, 140, 150, 160, 170, 180, 190, 200, 225, 250, 275, 300, 325, 350, 375, 400, 450, 500, 550, 600, 650, 700, 750, or at least about 800 bar. The composition may be compressed by at most about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 50, 60 70, 80, 90, 100, 110, 120, 130, 140, 150, 160, 170, 180, 190, 200, 225, 250, 275, 300, 325, 350, 375, 400, 450, 500, 550, 600, 650, 700, 750, or at most about 800 bar. The composition may undergo a change in pressure of at least about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 50, 60 70, 80, 90, 100, 110, 120, 130, 140, 150, 160, 170, 180, 190, 200, 225, 250, 275, 300, 325, 350, 375, 400, 450, 500, 550, 600, 650, 700, 750, or at least about 800 bar. The composition may undergo a change in pressure of at most about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 50, 60 70, 80, 90, 100, 110, 120, 130, 140, 150, 160, 170, 180, 190, 200, 225, 250, 275, 300, 325, 350, 375, 400, 450, 500, 550, 600, 650, 700, 750, or at most about 800 bar.

A composition may be compressed. Energy may be transferred to the composition from a heat source. The composition may be decompressed and undergo an exothermic phase change. Energy may be transferred from the composition to a heat sink while the composition is decompressed. The composition can be recompressed and the cycle repeated. Energy in the composition may be removed, e.g., via a heat sink, e.g., a high surface area, high conductivity medium in thermal contact with the composition which may be itself cooled by, e.g., a fan. Removal of the heat can be performed while the composition is decompressed. Recompression can cause the working material to enter a disordered state. Recompression can cool the composition as an endothermic transition occurs.

The inverted barocaloric effects can be applied to improve the efficiency or power density of vapor-compression cooling. A fluidic PTM can comprise a gaseous refrigerant that may be used for vapor-compression cooling. A working material can be interfaced with a PTM that comprises a gas refrigerant. A working material that exhibits inverted barocaloric effects can be coupled to a working material that exhibits conventional barocaloric effects to create a coupled system. The coupling can be used to pre-cool or pre-heat a heat exchange system. The coupled system can operate at pressures below 100, 90, 80, 70, 60, 50, 40, 30, 20, 10, 9, 8, 7, 6, 5, 4, 3, 2, or 1 bar. The coupled system can operate across a wider temperature range than either system alone.

In some embodiments, the methods and systems provided can be applied to solid-state cooling, tunable thermal energy storage, and thermo-mechanical energy conversion.

Conventional barocaloric materials can be used directly as solid refrigerants in a conventional barocaloric cycle. An inverted barocaloric effect may be used to enhance the performance of a vapor compression cycle by acting as a precooling stage. In a vapor compression cycle, the gaseous refrigerant may be first adiabatically compressed. Adiabatic compression can heat the gaseous refrigerant. The gaseous refrigerant may then be passed through a condenser. In the condenser the gaseous refrigerant may be placed in thermal contact with a heat sink (e.g., the external environment). Thermal contact with the heat sink can cool the gaseous refrigerant to near the heat sink's temperature (e.g., the external temperature). The gaseous refrigerant can then be passed through an expansion valve. The expansion valve can cool the gaseous refrigerant further. The gaseous refrigerant can be placed in thermal contact with a heat source. Thermal contact with a heat source can return the gaseous refrigerant to its initial temperature, which can create a cooling effect. The temperature of the gaseous refrigerant after it passes through the expansion valve may be a function of its temperature at that point in the cycle (as well as its pressure). When the heat sink temperature is relatively high, for example on a hot day, the gas may not cool down sufficiently during the condensing step. This can result in reduced efficiency and reduced cooling power. If a barocaloric material which undergoes the inverted barocaloric effect in the presence of the gaseous refrigerant is placed inside the condenser it may cool down upon introduction of the pressurized gas. This can lower the "heat sink" temperature thermally contacted by the gas. The gaseous refrigerant in the condenser can be cooled to the cooler temperature of the barocaloric material, which may be lower than that of the heat sink. Heat can then be transferred from the barocaloric material to the external heat sink. This precooling stage created by the barocaloric effect can increase the efficiency of the vapor compression cycle by permitting lower pressures to be used to reach the same cooling heat source temperature and can result in more efficient operation at high heat sink temperatures.

In some embodiments, the systems described may be applied to $CO_2$-based refrigeration. $CO_2$ has several advantages relative to some other gaseous refrigerant (e.g., hydrofluorocarbons) including: reduced global warming potential (GWP=1), inherent safety and lack of flammability, high abundance, and a large latent heat of vaporization. The critical point of $CO_2$ occurs at 31° C. which is close to some AC heat sink temperatures. This means that the subcritical thermodynamic cycle used by most refrigerants—where the refrigerant is condensed to the liquid phase after compression—may not be practical for $CO_2$. Instead, $CO_2$ refrigeration may operate as a transcritical cycle. A transcritical operation cycle can result in a different system design, higher operating pressures, increased cost, decreased efficiency, and decreased power density. Creating a hybrid barocaloric/vapor-compression system with $CO_2$ can be advantageous. If the real heat sink temperature is above 31° C., the cooling due to the inverted barocaloric effect can be used to condense $CO_2$ prior to the expansion valve, allowing the $CO_2$ portion of the system to operate via a subcritical cycle.

In some embodiments, a working material with inverted barocaloric effects can be utilized in a vapor-compression cycle. A vapor-compression cycle can comprise a compression of a refrigerant. The refrigerant may be a gas. The compression may be adiabatic. The refrigerant may then be heated up. The refrigerant may then be passed through a condenser. The condenser may be in thermal contact with a heat sink (e.g., an external environment). Energy may be transferred from the refrigerant to the heat sink. The refrigerant may then be passed through an expansion valve. This may cool it further. The refrigerant may then be placed in contact with a heat source. This may return the refrigerant to its initial temperature. This can create a cooling effect. The temperature of the gas after it passes through the expansion valve may be a function of its temperature and pressure at that point in the cycle.

In some embodiments, the refrigerant comprises a pressure transmitting material. A working material may be is placed inside a condenser. The working material may cool down upon introduction of the refrigerant. This can effectively lower the heat sink temperature seen by the working fluid. The fluid in the condenser may be cooled to the cooler temperature of the working material rather than the heat sink temperature. Heat can then be dumped from the working material to the external heat sink in a separate step. This precooling stage created by the thermal response in the working material can increase the efficiency of the vapor-compression cycle. The increased efficiency can be driven by lower pressures used to produce the cooling effect, or by more efficient operation at high heat sink temperatures.

Systems and Additional Components

Provided are systems for the transfer of energy. In some embodiments, a system may comprise a first chamber. The chamber may comprise a working material disposed in the first chamber. The first chamber may comprise a pressure transmitting material disposed in the chamber. The system may comprise a pressure source. The pressure source may control a pressure of the first chamber. The pressure source may communicate a pressure to the working material using the pressure transmitting medium. In some embodiments, the system may comprise a first reservoir. In some embodiments, the first reservoir may be in fluid communication with the first chamber. In some embodiments, the system comprises a second reservoir. The second reservoir may be in fluid communication with the first reservoir, the first chamber, or both. In some embodiments, the system may comprise a pump. In some embodiments, the pressure transmitting fluid may circulate between the first chamber, and the first reservoir or the second reservoir, or both. In some embodiments, the pump circulates the pressure transmitting medium.

In some embodiments, the system may comprise a thermal chamber surrounding the first chamber. In some embodiments the thermal chamber is in thermal communication with the first chamber. In some embodiments, the thermal chamber is in fluid communication with the first reservoir, the second reservoir, or both. In some embodiments the thermal chamber comprises a thermal transfer fluid. In some embodiments the thermal transfer fluid circulates between the thermal chamber and the first reservoir, the second reservoir, or both. In some embodiments, the pump circulates the thermal transfer fluid.

In some embodiments, the system can comprise tubing or other fluidic channels. In some embodiments the tubing or other fluidic channels create flow paths between other system components.

The systems provided herein may include components to provide compressive force to the composition, e.g., pumps, pistons, actuators, presses, levers, etc. Systems may also include components to transfer or remove heat energy, e.g., pumps, heat sinks, thermoelectrics, fans, chiller pumps, etc. A provided system may include a pump for controlling a pressure transmitting medium (e.g., a mixture of gases), such as pumps, gas reservoirs (e.g., tanks, cylinders, etc.), compressors, pressure sensors, actuators, valves, etc. The PTM may be a liquid. For example, the PTM may be an oil, e.g., a fluorocarbon oil, silicone oil, etc. A provided system may also include a power source. The power source may power a component of the system, including a source of compressive force, a heat transfer component, a pump, a fluid circulation device, or combinations thereof.

In some embodiments described herein, a pump can be a dynamic pump, a positive displacement pump, or a combination thereof. In some embodiments, a dynamic pump can comprise a centrifugal pump, a vertical centrifugal pump, a horizontal centrifugal pump, a submersible pump, or combinations thereof. In some embodiments, a positive displacement pump can comprise a diaphragm pump, a gear pump, a peristaltic pump, a lobe pump, a piston pump, or combinations thereof.

In some embodiments described herein, a compressor can be a dynamic compressor, a positive displacement compressor, or a combination thereof. In some embodiments, a dynamic compressor can comprise a centrifugal compressor, an axial compressor, or a combination thereof. In some embodiments, a positive displacement compressor can comprise a reciprocating compressor, a rotary compressor, or a combination thereof. In some embodiments, a rotary compressor can comprise a rotary lobe compressor, a rotary screw compressor, a rotary liquid ring compressor, a rotary scroll compressor, a rotary vane compressor, or combinations thereof. In some embodiments, a reciprocating compressor can comprise a diaphragm compressor, a double-acting reciprocating compressor, a single-acting reciprocating compressor, or combinations thereof.

In some embodiments described herein, a piston can comprise a flat-top piston, a dish piston, a dome piston, a trunk piston, a crosshead piston, a slipper piston, a deflector piston, a racing piston, a hydraulic cylinder piston, a steam engine piston, or combinations thereof. In some embodiments described herein, an actuator can comprise a soft actuator, a hydraulic actuator, a pneumatic actuator, an electric actuator, an electromechanical actuator, an electrohydraulic actuator, a linear actuator, a rotary actuator, a thermal actuator, a magnetic actuator, a mechanical actuator, a 3D printed soft actuator, a piezoelectric actuator, a plasma actuator, a trim actuator, or combinations thereof. In some embodiments described herein, a press can comprise a hydraulic press, a mechanical press, a pneumatic press, a knuckle-joint press, a screw press, an expeller press, a servo-press, or combinations thereof. In some embodiments described herein, a lever can comprise a Class I lever, a Class II lever, a Class III lever, or combinations thereof.

A system may include a chamber to hold the composition, reservoirs in thermal contact with a heat sink and a heat source, tubing or other fluidic channels to create flow paths between the reservoirs and thermal contact with the chamber, and a pressure source. Additional reservoirs and sub paths may be present.

Figure 31A:
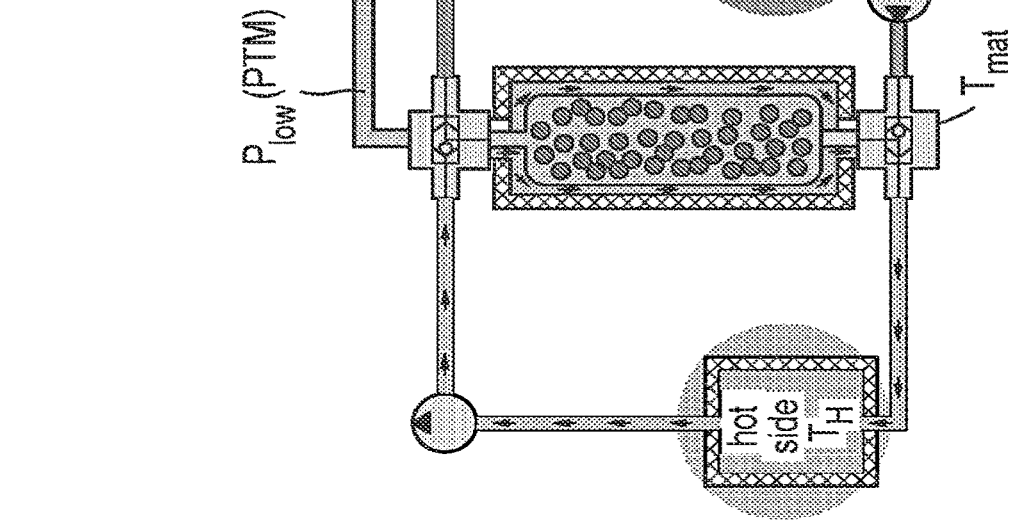
FIGS. 31a-31b show example schematics of a barocaloric cooling device using inverted barocaloric effects. In this example, the device comprises a barocaloric material inside a central tube which is then filled with a gas PTM and connected to a pressure source (e.g., a syringe pump, a compressor, or a $CO_2$ gas bottle). This high-pressure chamber is surrounded by a pipe filled with a heat transfer fluid which is circulated between two reservoirs (acting as heat source and sink) via two peristaltic pumps.
Figure 31B:
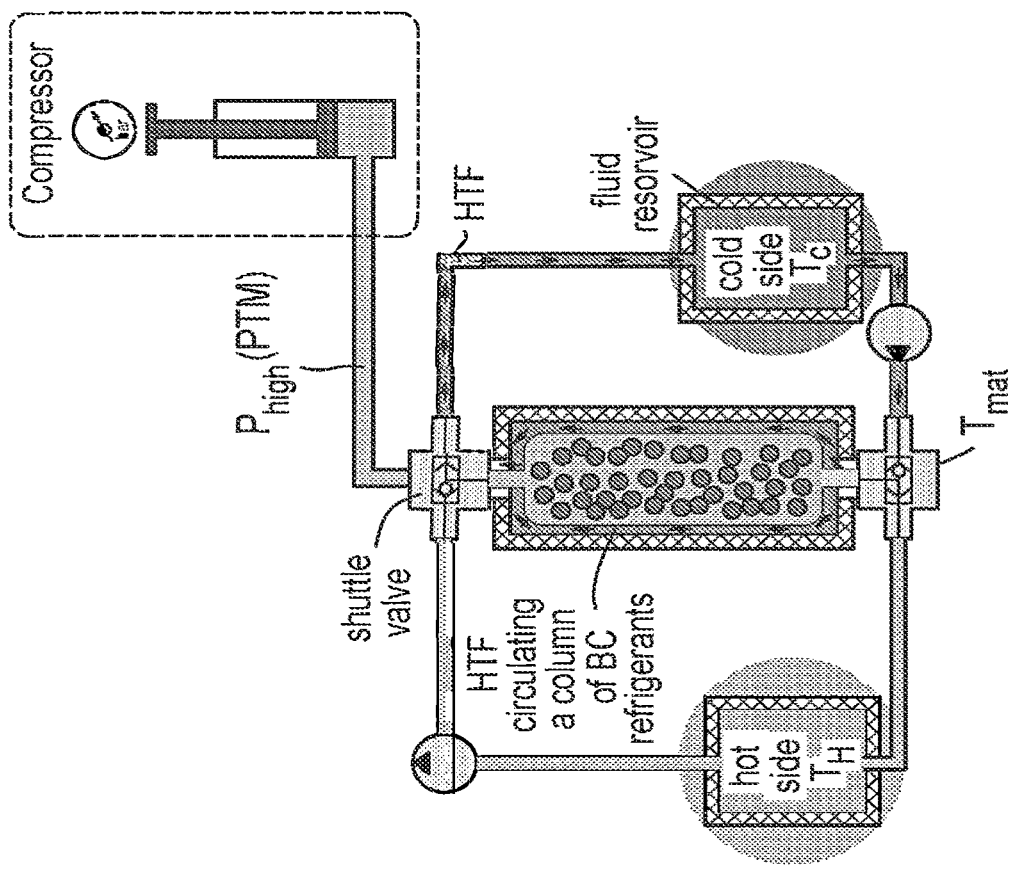
Figure 32B:
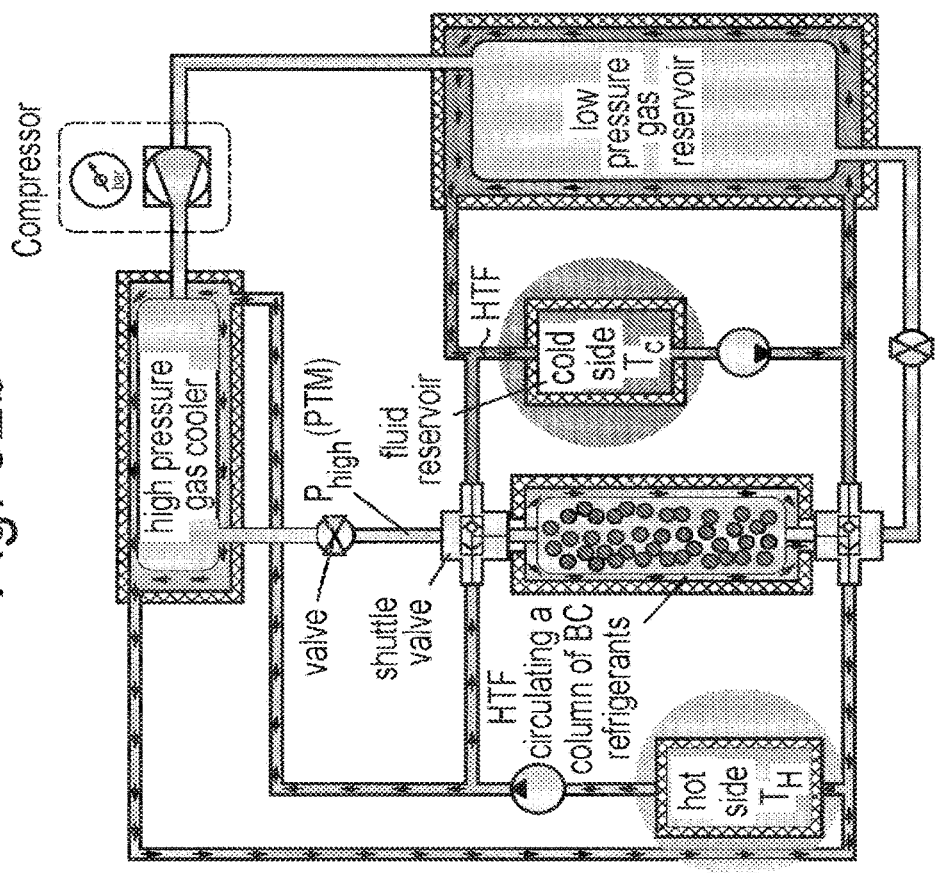
FIGS. 32a-32b show example schematics for a barocaloric cooling device using inverted barocaloric effects, coupled to thermal compression cycle of the PTM. In this example, the device includes a barocaloric material inside a central tube which is then filled with a gas PTM and interfaced with a high-pressure gas reservoir and a low-pressure gas reservoir. These two chambers are in turn placed in thermal contact with the heat-source and heat-sink respectively via a heat transfer fluid. The pressurized gas can then be cooled prior to introduction in the barocaloric material and additional cooling to be extracted from the depressurized gas.
Figure 32A:
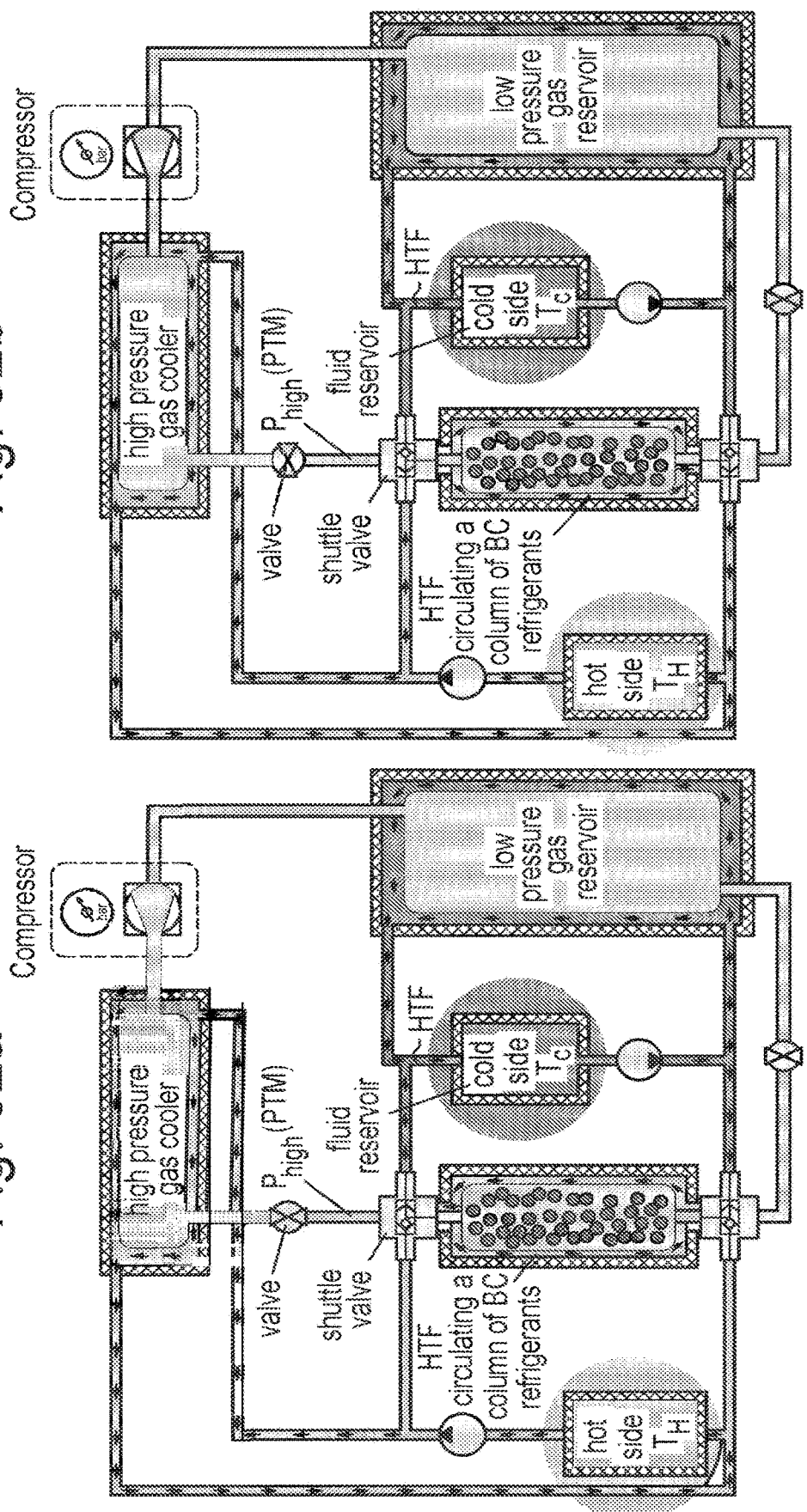

In one embodiment, a system for cooling is shown in FIGS. 31a-31b. The system includes a barocaloric material inside a central tube. The central tube may be filled with gas PTM (e.g., $CO_2$) and connected to a pressure source (e.g., a syringe pump, a compressor, or a gas bottle) to form a high-pressure chamber. This high-pressure chamber is in turn surrounded by a pipe filled with a heat transfer fluid (e.g., ethylene glycol). This arrangement may be referred to as a tube in shell design. The heat transfer fluid can be circulated between two reservoirs. The reservoirs can act as heat source or a heat sink. Circulation can be accomplished via one, or two, or more peristaltic pumps. The high-pressure chamber can be pressurized. When the high-pressure chamber is pressurized, the barocaloric material can cool down and adsorbs heat from the heat source reservoir. The high-pressure chamber can be depressurized. When depressurized, the direction of heat transfer fluid flow can switch. The barocaloric material can heat up when depressurized. The heat can be transferred into the heat sink reservoir. The transfer can be assisted by circulation of the heat transfer fluid. Over several cycles a temperature difference can be established between the two reservoirs. This can result in a net heat transport from the heat source to the heat sink. Additional high pressure and low pressure chambers to store gas may be included. These high pressure and low pressure chambers may be cooled and heated by the heat sink and source respectively (FIGS. 32a-32b).

EXAMPLES

Example 1

Figure 3:
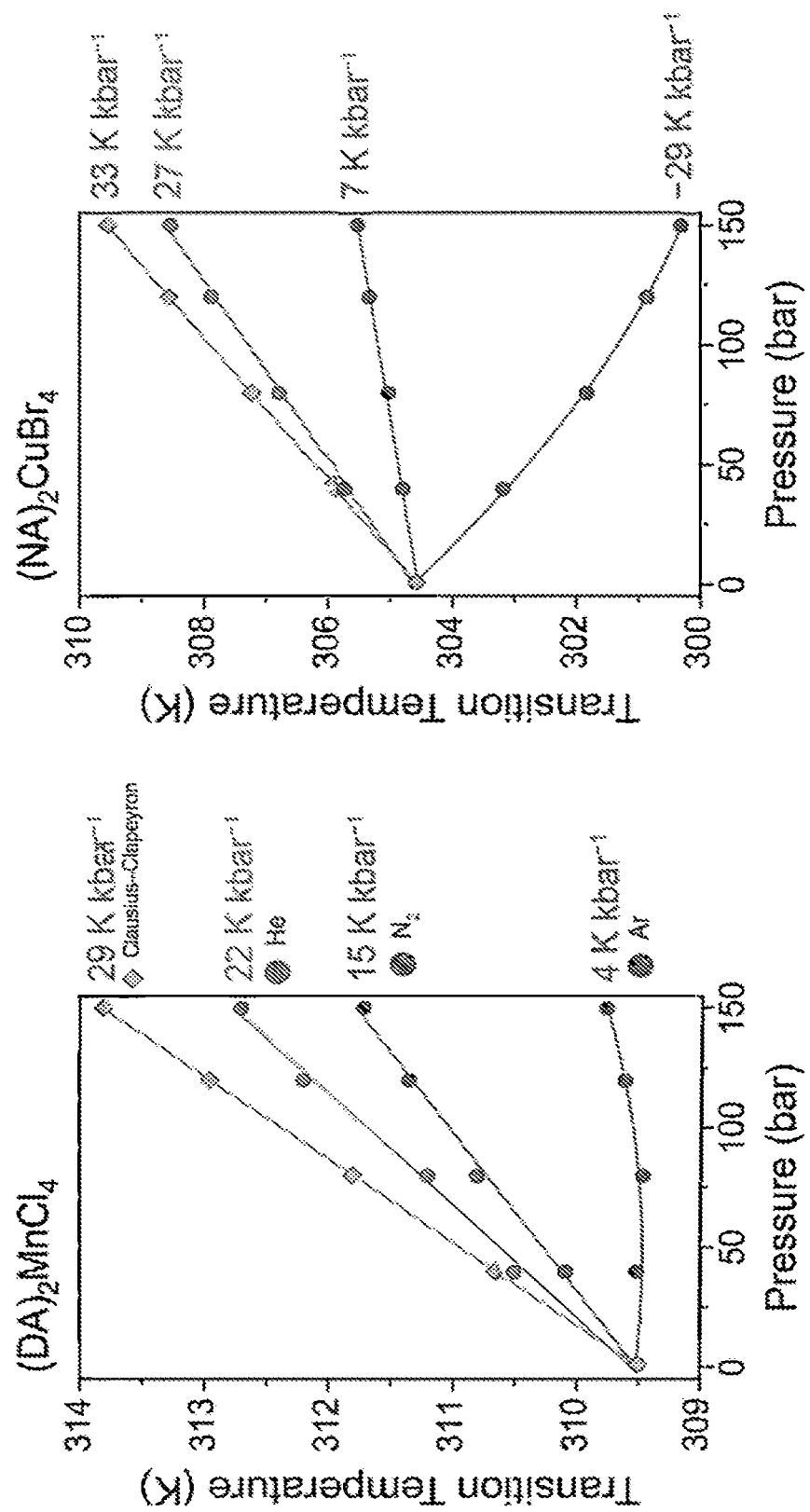
FIG. 3 shows example pressure sensitivity (d T/d P) of $(DA)_2MnCl_4$ and $(NA)_2CuBr_4$ for various gas PTM (He, $N_2$, Ar).
Figure 4:
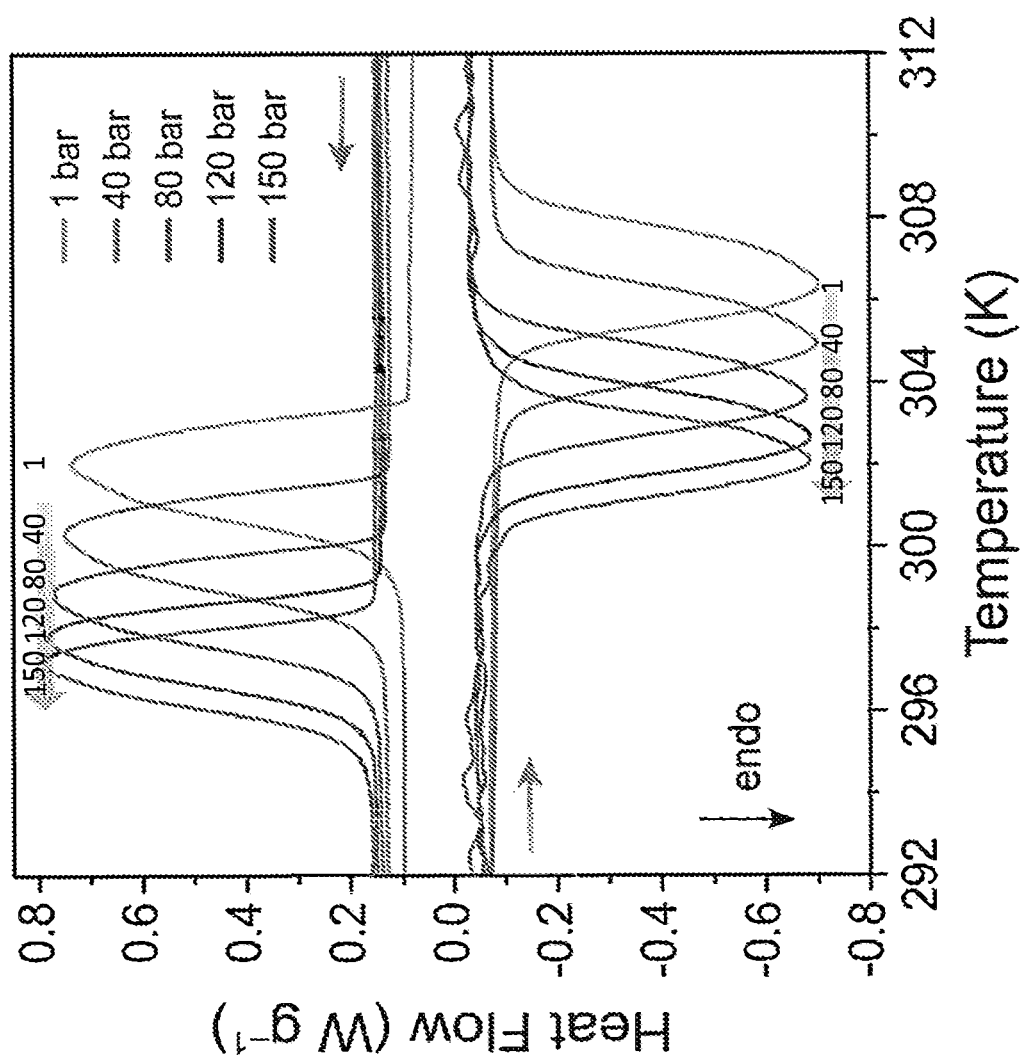
FIG. 4 shows an example achievement of an inverted barocaloric effect in $(NA)_2CuBr_4$ which can be observed under Ar PTM. Isobaric high-pressure calorimetry experiments reveal that the transition temperatures can decrease as the Ar pressure increases.
Figure 5A:
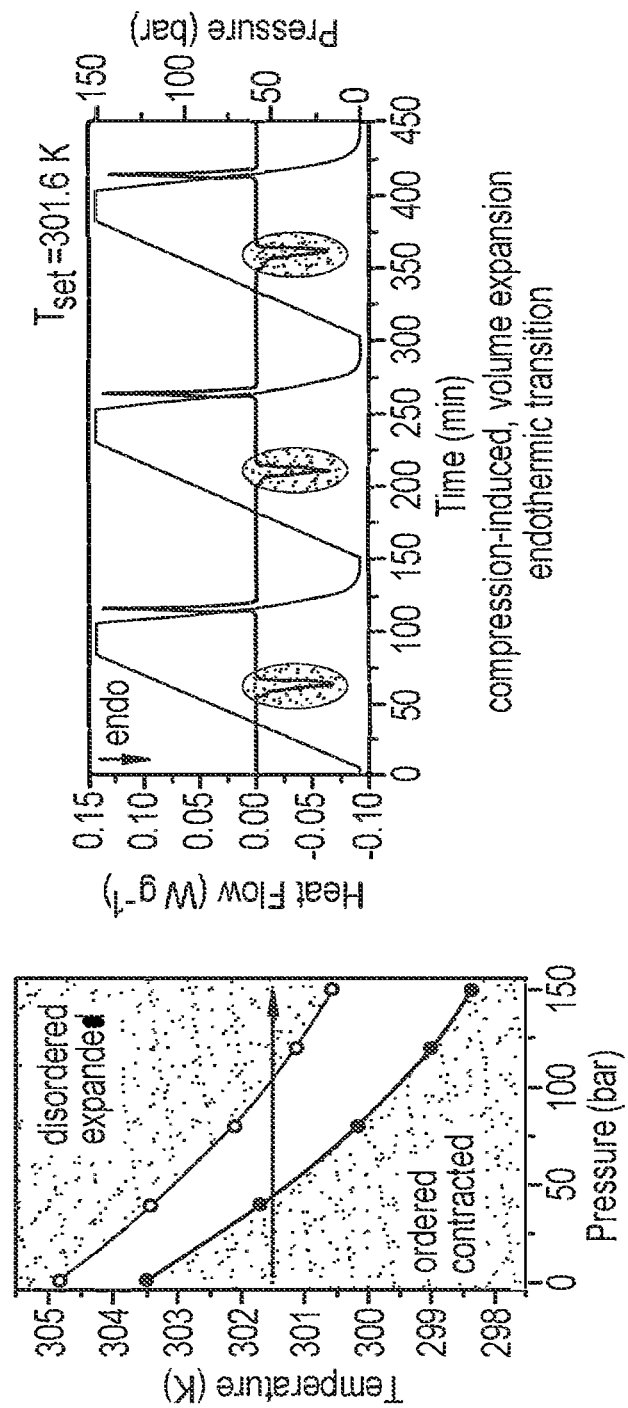
FIGS. 5a-5b show an example of a direct evaluation of inverted barocaloric effects in $(NA)_2CuBr_4$ under Ar PTM using isothermal high-pressure calorimetry experiments. In an inverted barocaloric material, compression and decompression can induce endothermic (FIG. 5a) and exothermic (FIG. 5b) transitions, respectively.
Figure 5B:
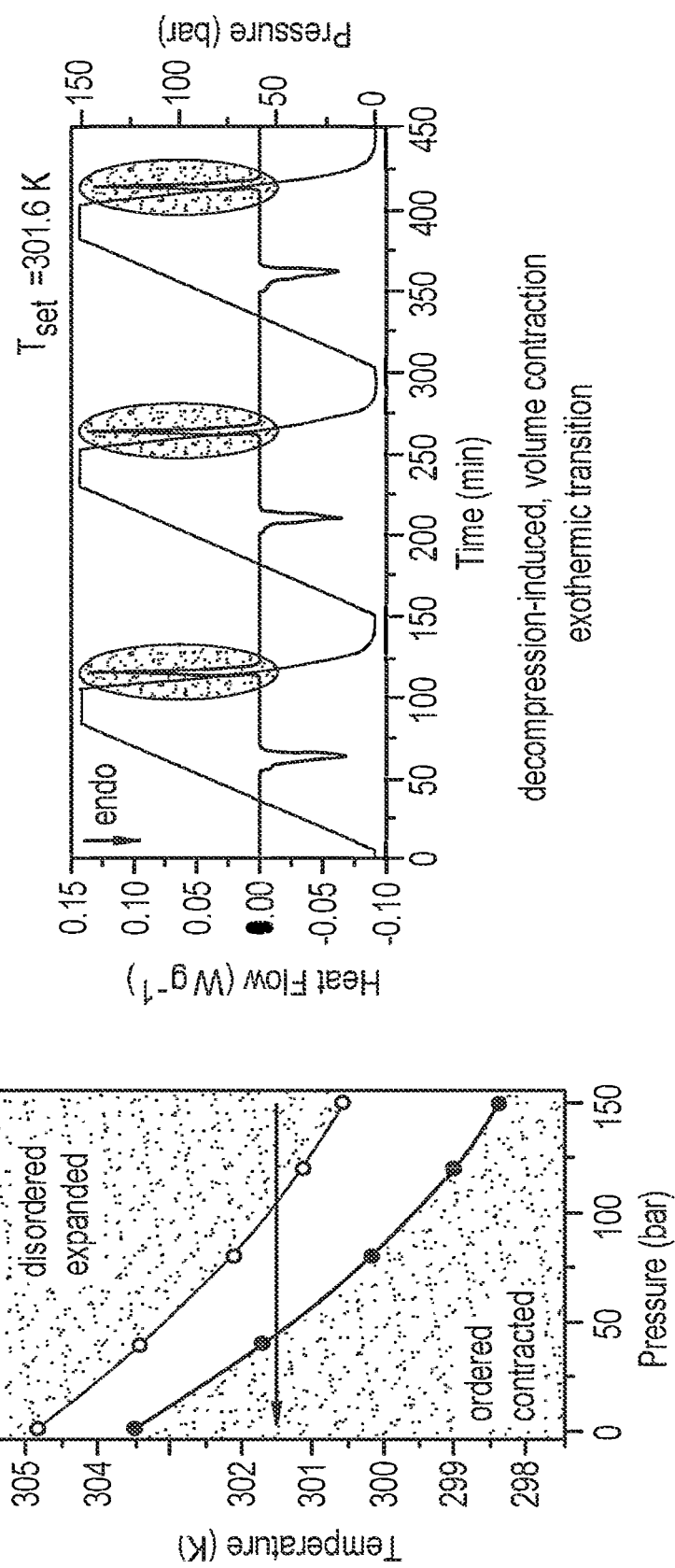

In experiments on 2-D perovskites $(DA)_2MnCl_4$ and $(NA)_2CuBr_4$, it was observed that the magnitude of barocaloric effects was strongly dependent on the identity of the PTM (FIG. 3). Specifically, when He and $N_2$ were used as the PTM, the dT/dP values for $(NA)_2CuBr_4$ are 27 K $kbar^{-1}$ and 7 K $kbar^{-1}$, respectively. These experiments suggested that, at least for $(NA)_2CuBr_4$, the pressure dependence of the chain-melting transition was reduced under more polarizable gas environments. The influence of Ar gas was strong enough to reverse the pressure dependence of chain-melting transition (dT/dP=−29 K $kbar^{-1}$) (FIG. 4). The inverted barocaloric effects were also directly confirmed through isothermal variable-pressure calorimetry experiments (FIGS. 5a-5b). Compression results in endothermic, disordering transitions, and decompression led to exothermic transitions. Because the pressure sensitivity was sufficiently large enough to overcome the hysteresis, the transitions could be induced in a reversible fashion. A substantial decrease in pressure sensitivity was also observed for $(DA)_2MnCl_4$, but the magnitude of the PTM effect was not sufficient to fully invert the conventional barocaloric effects. These results suggested that there was an additional thermodynamic driving force that may have competed against the chain-melting transition.

Figure 6A:
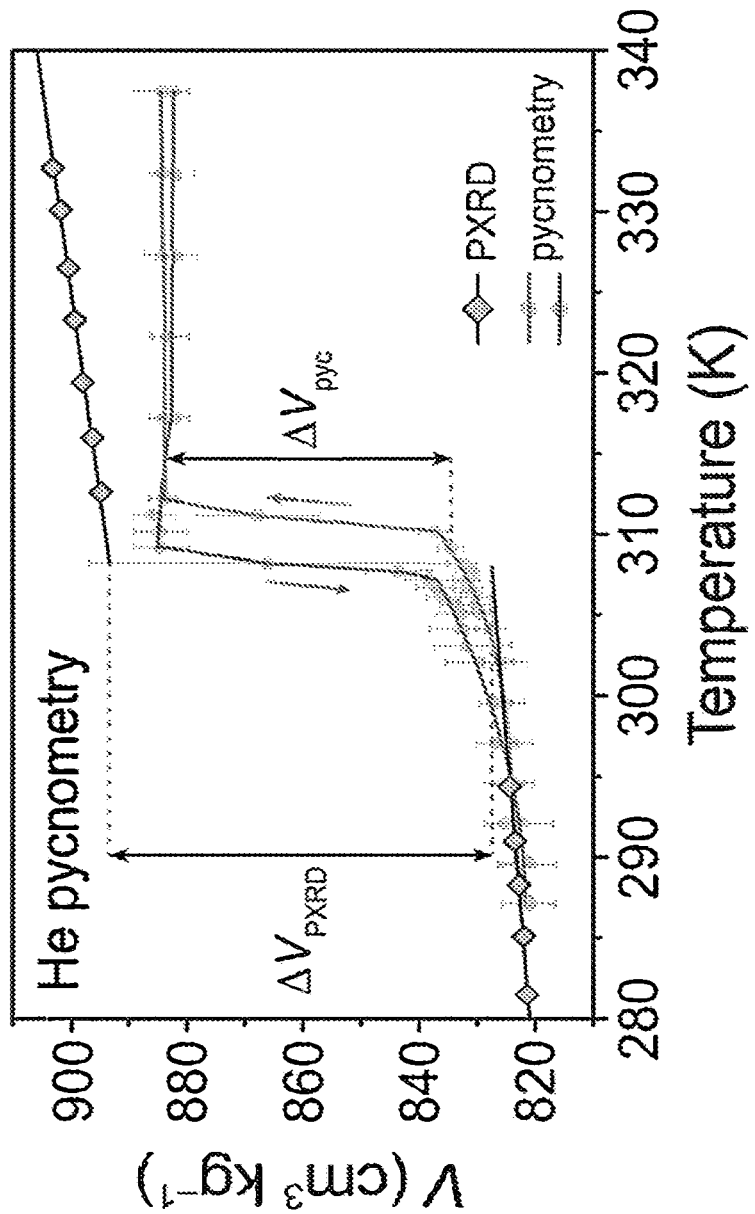
Figure 6C:
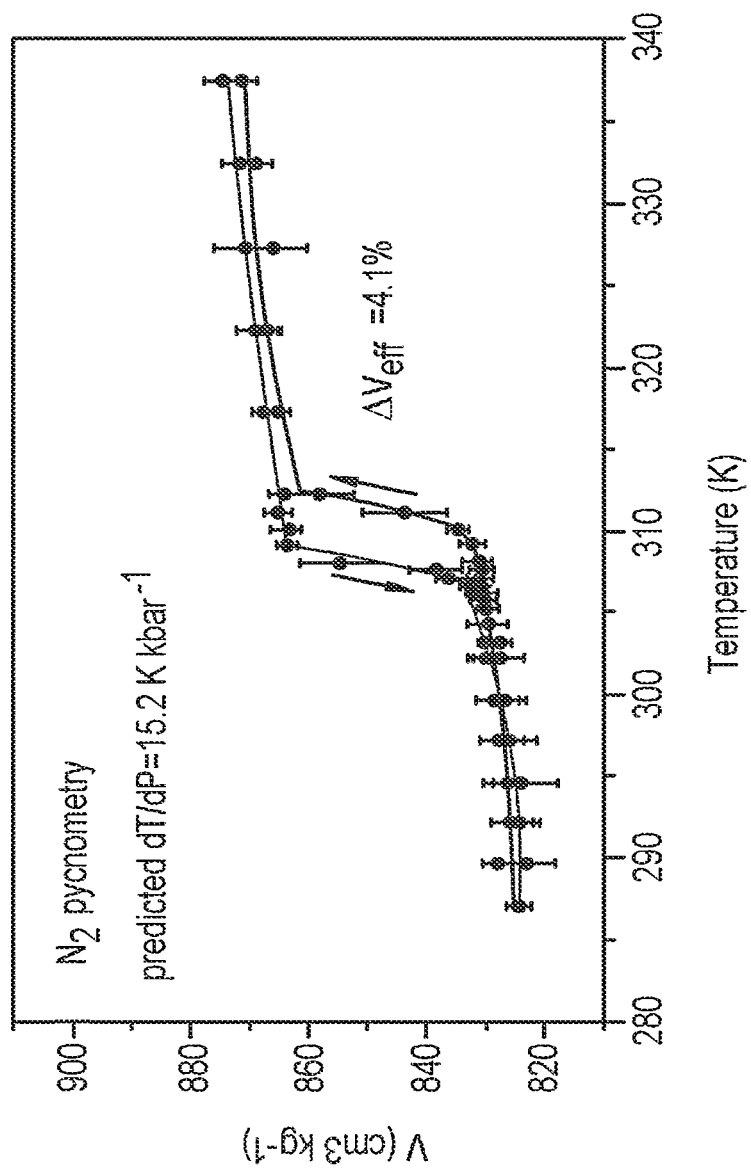

Without being bound by a particular theory, the observed effects may be due to the PTM absorbing into the disordered organic bilayer and changing the effective volume change during the chain-melting transition. There may be a link between the free volume accessible within the disordered organic bilayer and the magnitude of the PTM effects. This hypothesis was supported by gas pycnometry experiments, which allowed direct evaluation of the effective volume change, under a gas medium, during the phase transition (FIGS. 6a-6c). In this experiment, the effective volume change, directly measured from the gas pycnometer, was consistent with the volume change calculated from the high-pressure calorimetry experiment as shown in the following table:

| | PXRD | | He pycnometry | | |
|---|---|---|---|---|---|
| | $\Delta V$ (cm³/kg) | dT/dP (K/kbar) | $\Delta V$ (cm³/kg) | dT/dP (K/kbar) calculated | dT/dP (K/kbar) experimental |
| $(DA)_2MnCl_4$ | 66 (8.0%) | 29 | 49 (5.9%) | 21 | 22.1 |
| $(NA)_2CuBr_4$ | 25 (4.0%) | 33 | 20 (3.2%) | 26 | 26.9 |

Figure 7:
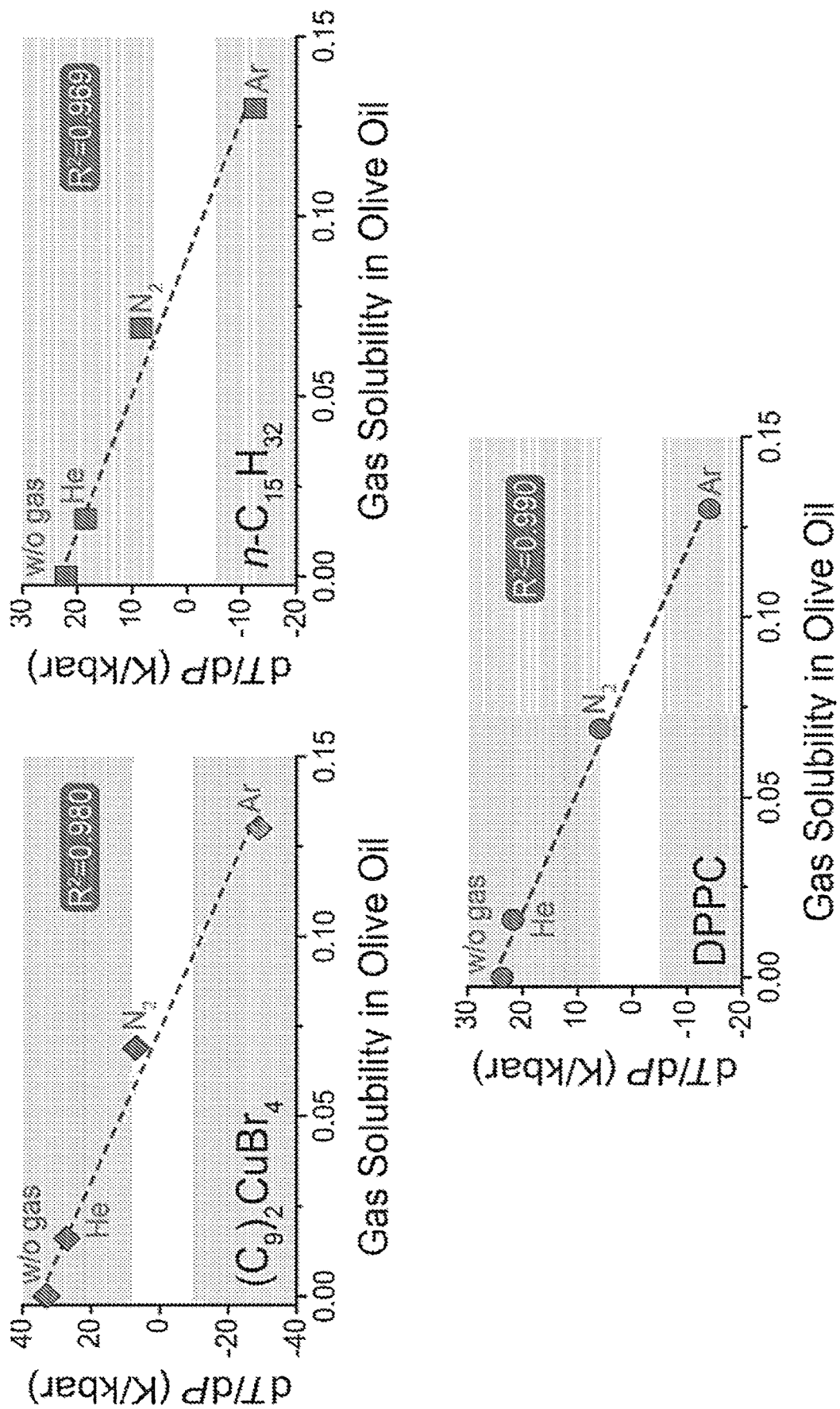
FIG. 7 shows example correlations between pressure sensitivity of hydrocarbon phase transitions (d T/d P) and gas solubility in olive oil for $(NA)_2CuBr_4$ (solid-solid transition), n-$C_{15}H_{32}$ (melting transition), and phospholipid bilayer DPPC (dipalmitoylphosphatidylcholine) (mesophasic order-disorder transition). The gas solubility values correspond to Ostwald solubility coefficients, which denote solubility (mL gas/mL solvent) measured for 1 atm partial pressure at 298 K. These values were taken from the IUPAC Solubility Data Series.

Across a wide range of layered materials, including 2-D perovskites, n-pentadecane, and lipid bilayers, all of which undergo reversible thermally induced order-disorder transitions, the dependence of pressure sensitivity on the PTM was correlated to the solubility of the gas PTM in olive oil (FIG. 7). Highly absorbing gases, such as Ar, were observed to lower the pressure sensitivity. This effect was strong enough to give rise to inverted barocaloric effects.

Example 2

Figure 8:
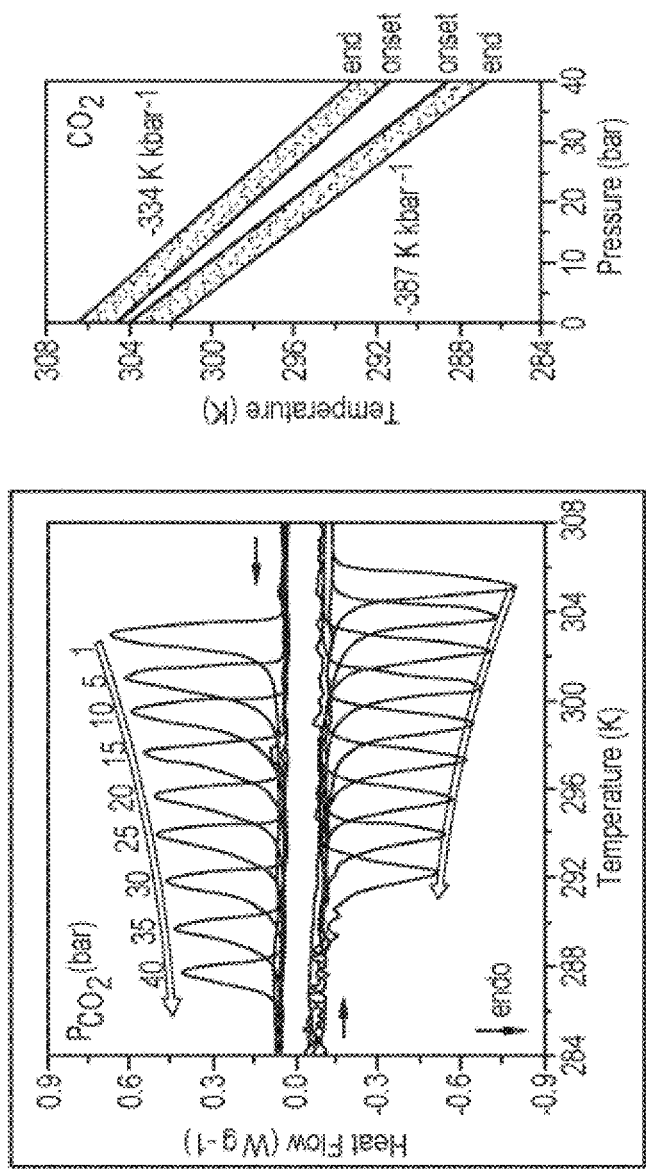
FIG. 8 shows an example of an isobaric high-pressure calorimetry experiment for $(NA)_2CuBr_4$ under $CO_2$. The left half of the figure shows example heat flow traces, and the right half of the figure shows an example of a pressure-temperature phase diagram. Both of these experiments indicate an inversion of barocaloric effects by a $CO_2$ PTM.
Figure 9:
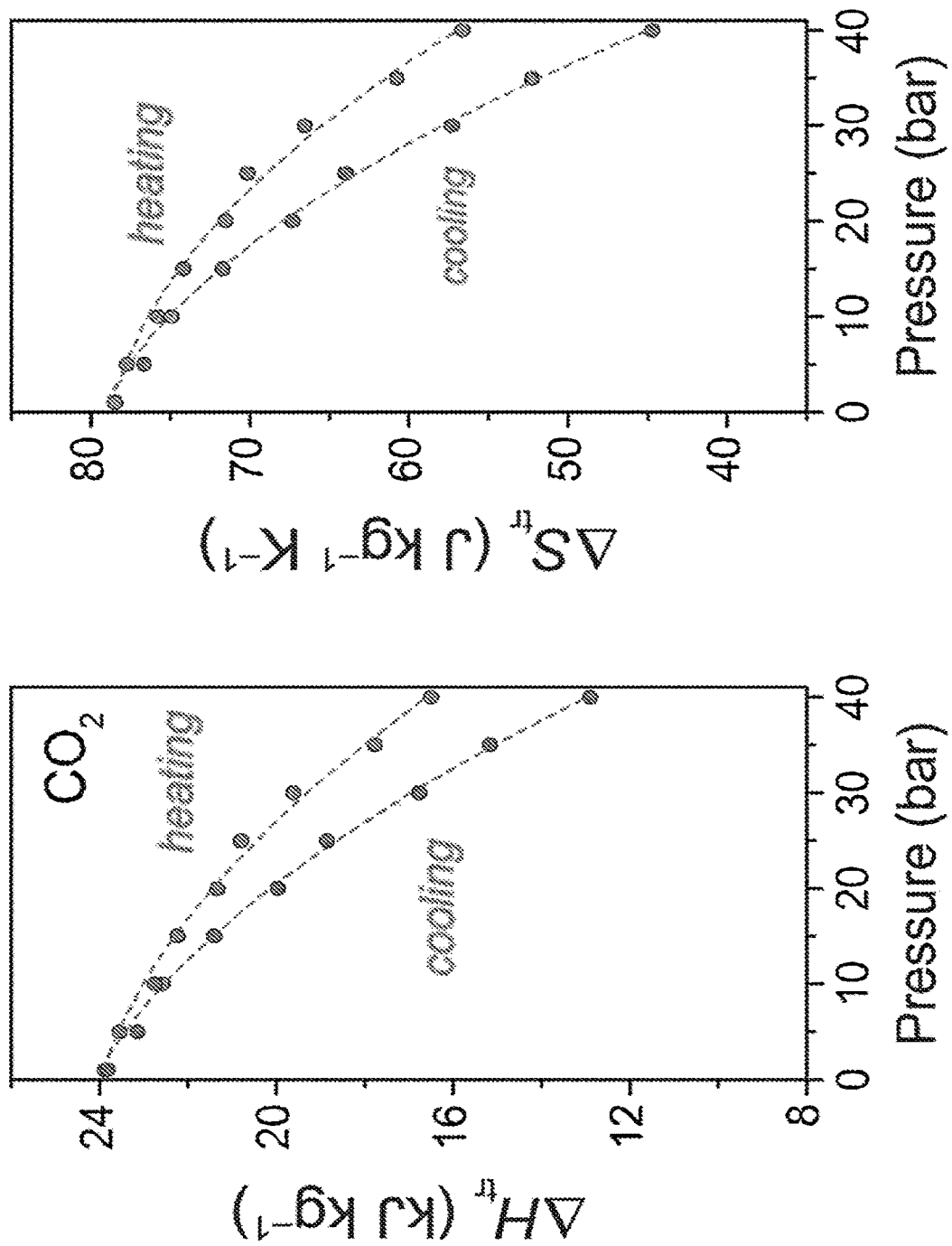
FIG. 9 shows an example of the dependence of enthalpy changes (left) and entropy changes (right) of transition for $(NA)_2CuBr_4$ to $CO_2$ pressure.
Figure 10:
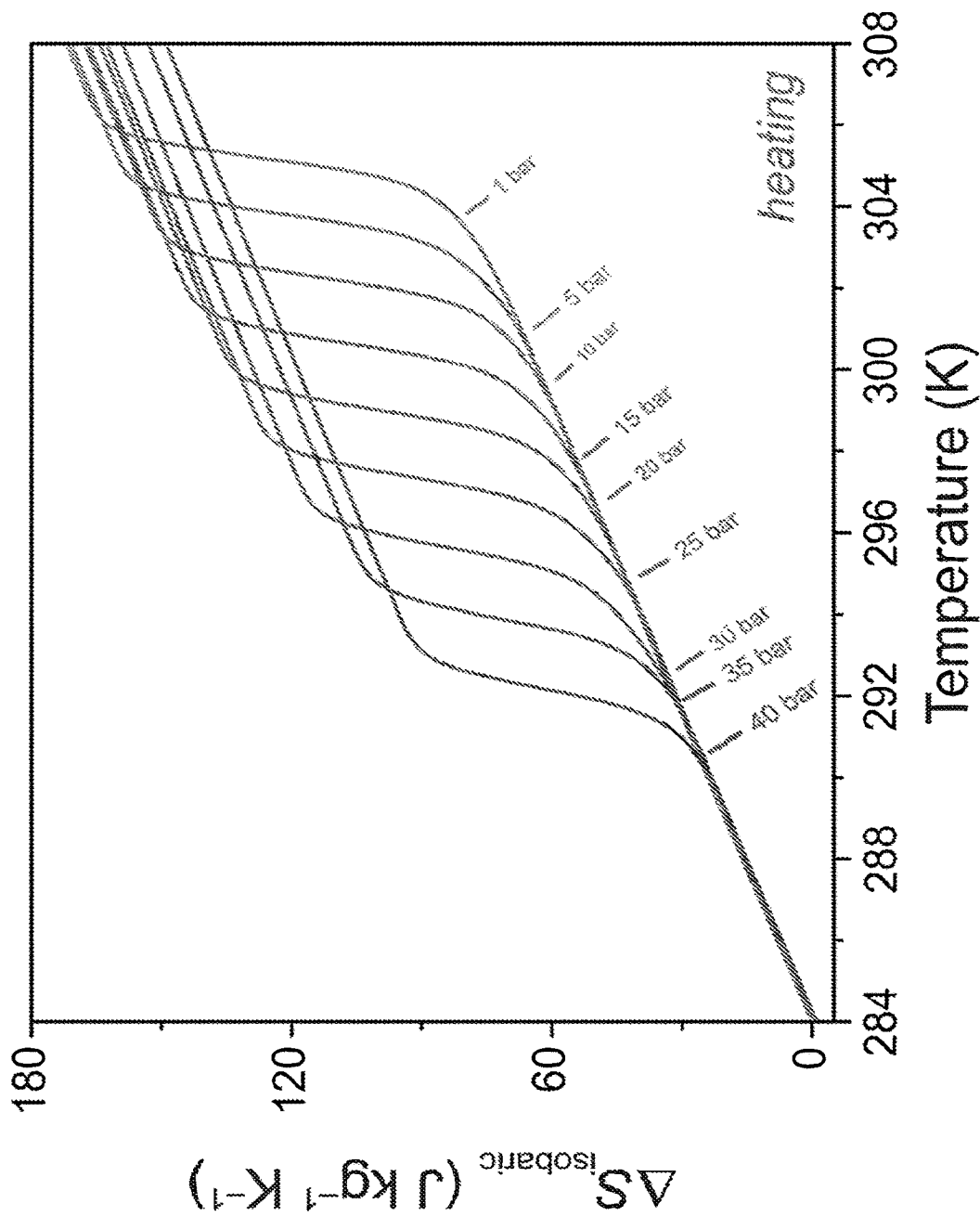
FIG. 10 shows an example of isobaric entropy changes ($\Delta S_{isobaric}$) associated with the phase transition of $(NA)_2CuBr_4$ under $CO_2$ as a function of temperature in the pressure range of 1 bar to 40 bar during heating.
Figure 11:
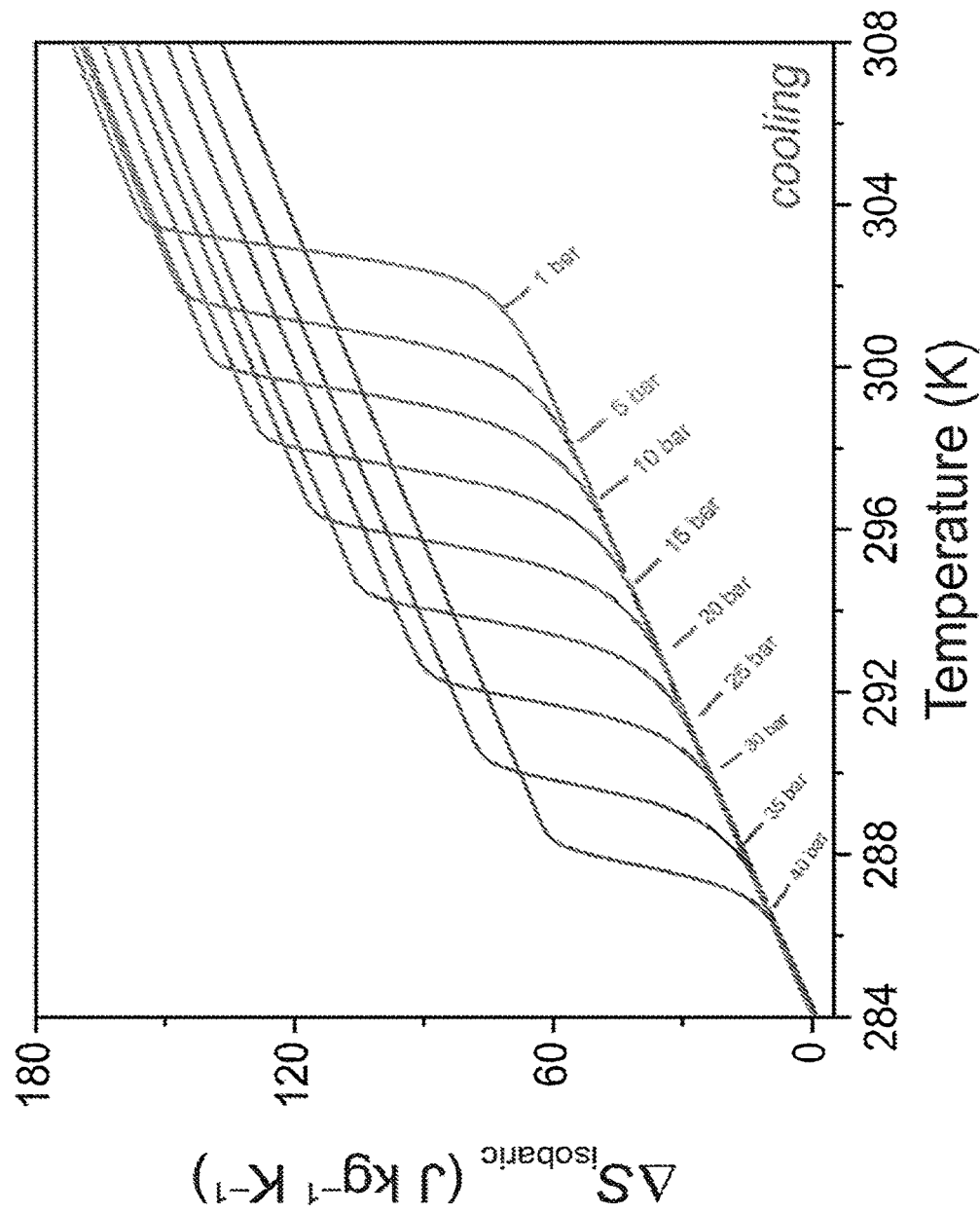
FIG. 11 shows an example of isobaric entropy changes ($\Delta S_{isobaric}$) associated with the phase transition of $(NA)_2CuBr_4$ under $CO_2$ as a function of temperature in the pressure range of 1 bar to 40 bar during cooling.
Figure 12:
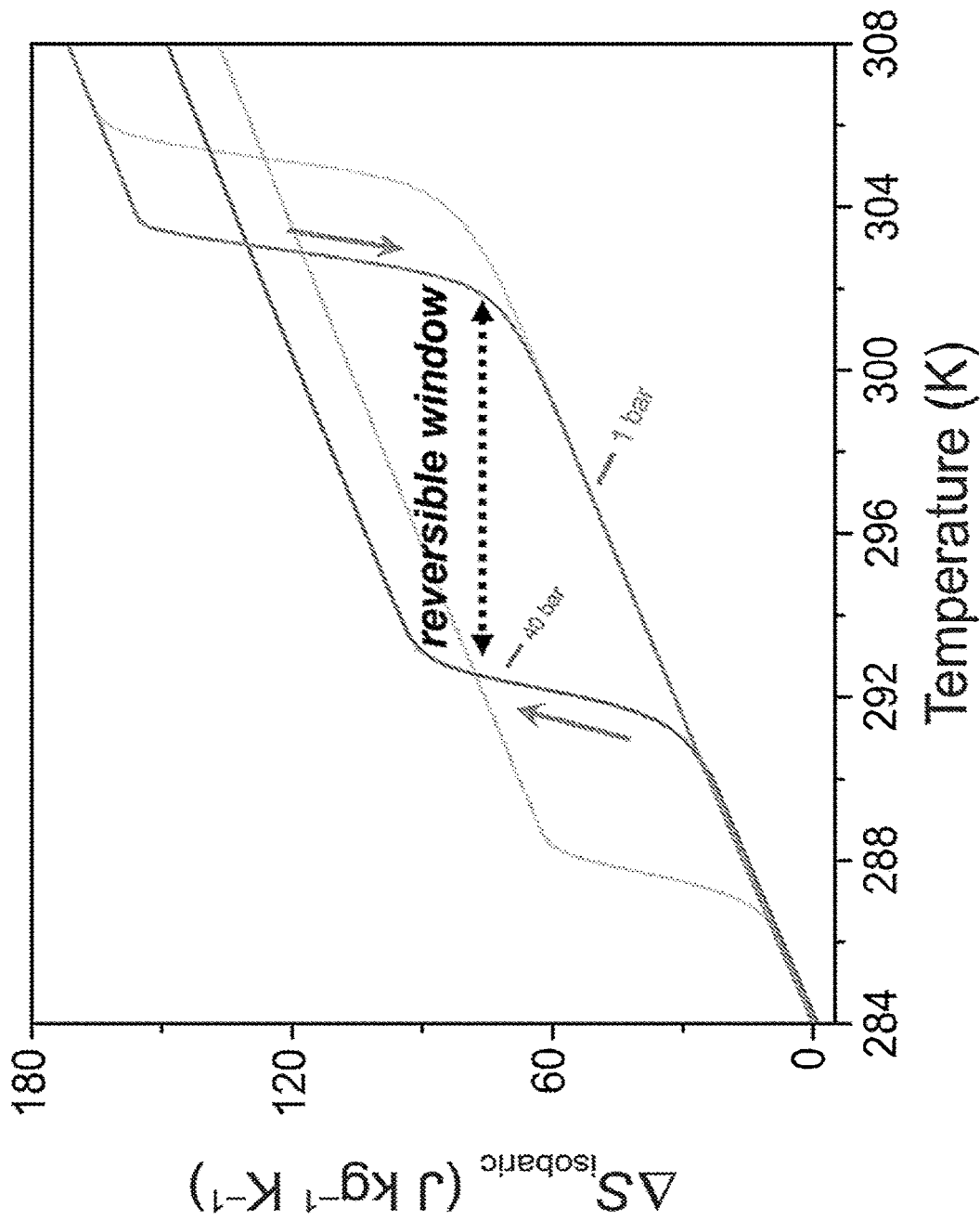
FIG. 12. shows an example of isobaric entropy changes ($\Delta S_{isobaric}$) associated with the phase transition of $(NA)_2CuBr_4$ during heating and cooling, at 1 bar and 40 bar $CO_2$. The area between $\Delta S_{isobaric}$ (T, 40 bar) heating and $\Delta S_{isobaric}$ (T, 1 bar) cooling curves denote the temperature range over which both reversible isothermal entropy changes and reversible adiabatic temperature ($\Delta T_{ad,rev}$) changes can be accessible. $\Delta T_{ad,rev}$ over 10 K can be induced at 40 bar pressure swing.
Figure 13:
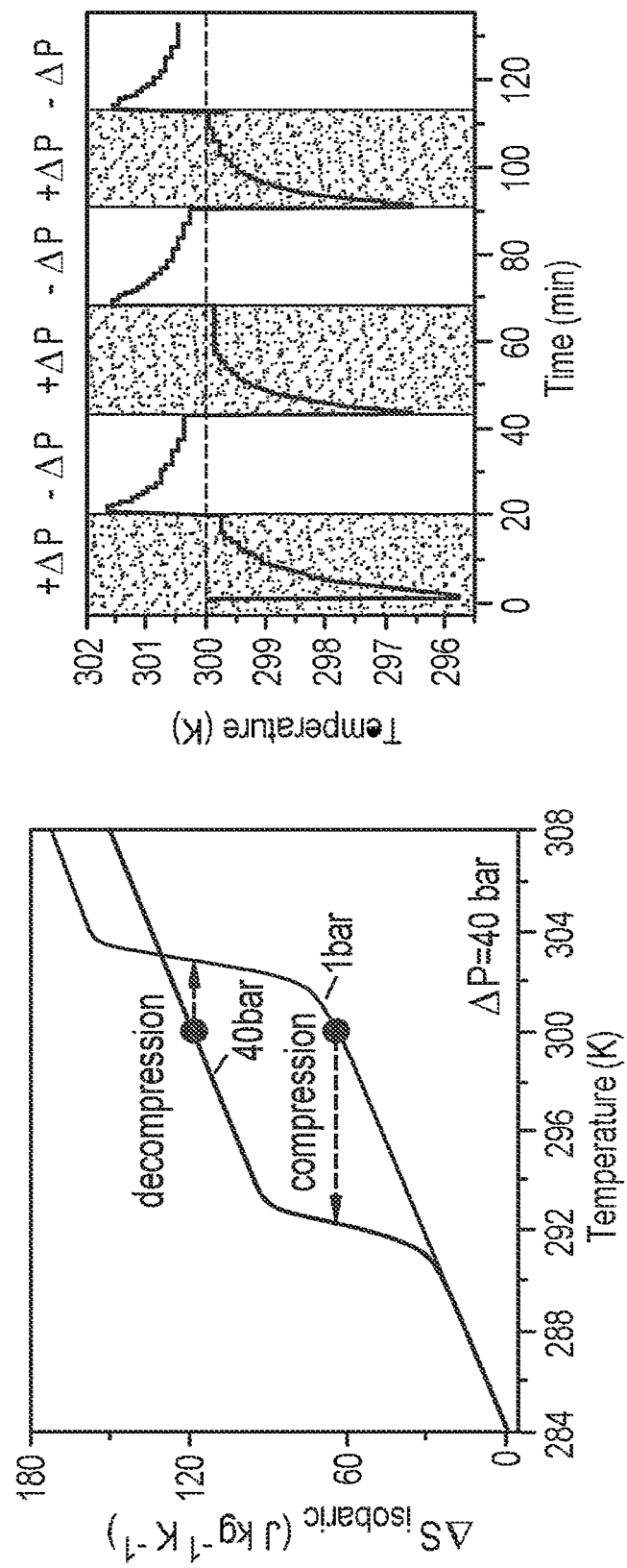
FIG. 13 shows an example of a direct measurement of adiabatic temperature changes in $(NA)_2CuBr_4$. Temperature changes in a bulk powder sample (>20 g) of $(NA)_2CuBr_4$, enclosed in a pressure vessel, in response to application and removal of $CO_2$ pressures were directly measured through a thermocouple that was in contact with the powder sample within the chamber (right). Under $CO_2$ PTM, the pressure swing of 40 bar induces temperature changes of 4 K (compression) and 2 K (decompression) in the bulk powder sample, and the magnitudes of the temperature changes are consistent with the $\Delta T_{ad,rev}$ predicted from entropy curves (left). This example experiment confirms the inverted barocaloric effects by $CO_2$ PTM.

It was demonstrated that the inverted barocaloric effects can be enhanced by a gas PTM with higher solubility in n-decane. For example, when $CO_2$ gas was used as the PTM, $(NA)_2CuBr_4$ displayed the pressure sensitivity (dT/dP) of $-334$ K kbar-1 (heating) and $-387$ K kbar$^{-1}$ (cooling) (FIG. 8). Although the magnitude of enthalpy and entropy changes decreased at higher pressures, the solid-solid phase transitions were driven by ordering/disordering of alkyl chains (FIG. 9). Without being bound by a particular theory, the decrease in the magnitude of enthalpy and entropy changes may be due to the heat of absorption of the gas. Evaluation of isobaric entropy curves obtained from the high-pressure calorimetry experiments suggested that the pressure response of $(NA)_2CuBr_4 \cdot xCO_2$ (where x indicates a variable stoichiometry) was strong enough to reversibly induce full phase transitions at 12 bar and that reversible adiabatic temperature changes of 10 K can be induced at 40 bar operating pressures (FIGS. 10-12). The adiabatic temperature changes that originated from the inverted barocaloric effects were directly measured for the bulk powder sample of $(NA)_2CuBr_4$ enclosed in a pressure vessel. As shown in FIG. 13, exposing the powder sample to the compressed $CO_2$ gas lowered the temperature, and the material temperature increased upon the removal of the applied pressure. Note that the magnitude of the inverted barocaloric effects (for 40 bar $CO_2$) was equivalent to the magnitude of those accessible at 500 bar helium pressure.

Figure 14:
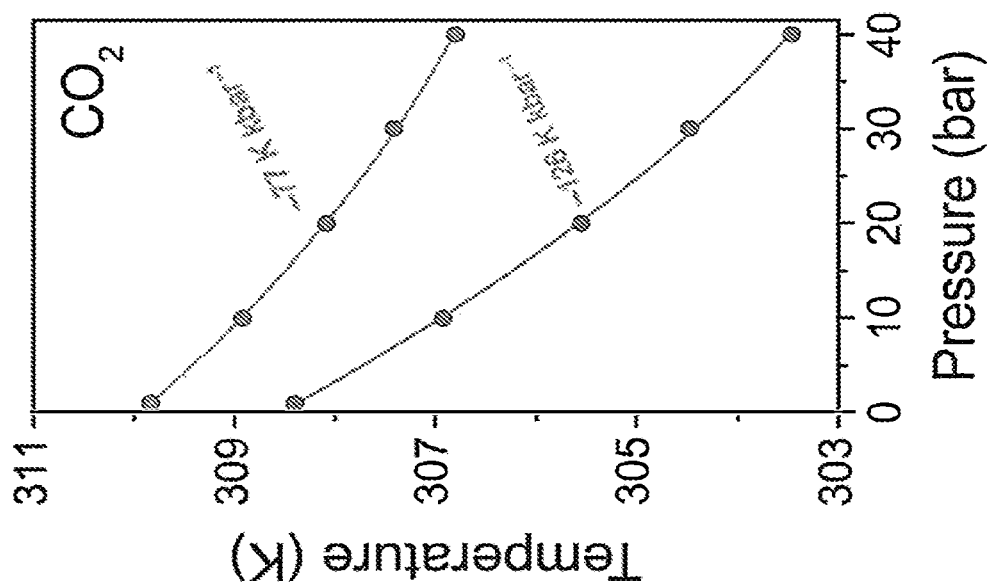
FIG. 14 shows an example pressure-temperature phase diagram for $(DA)_2MnCl_4$ obtained through isobaric calorimetry experiments ($CO_2$ PTM).
Figure 15:
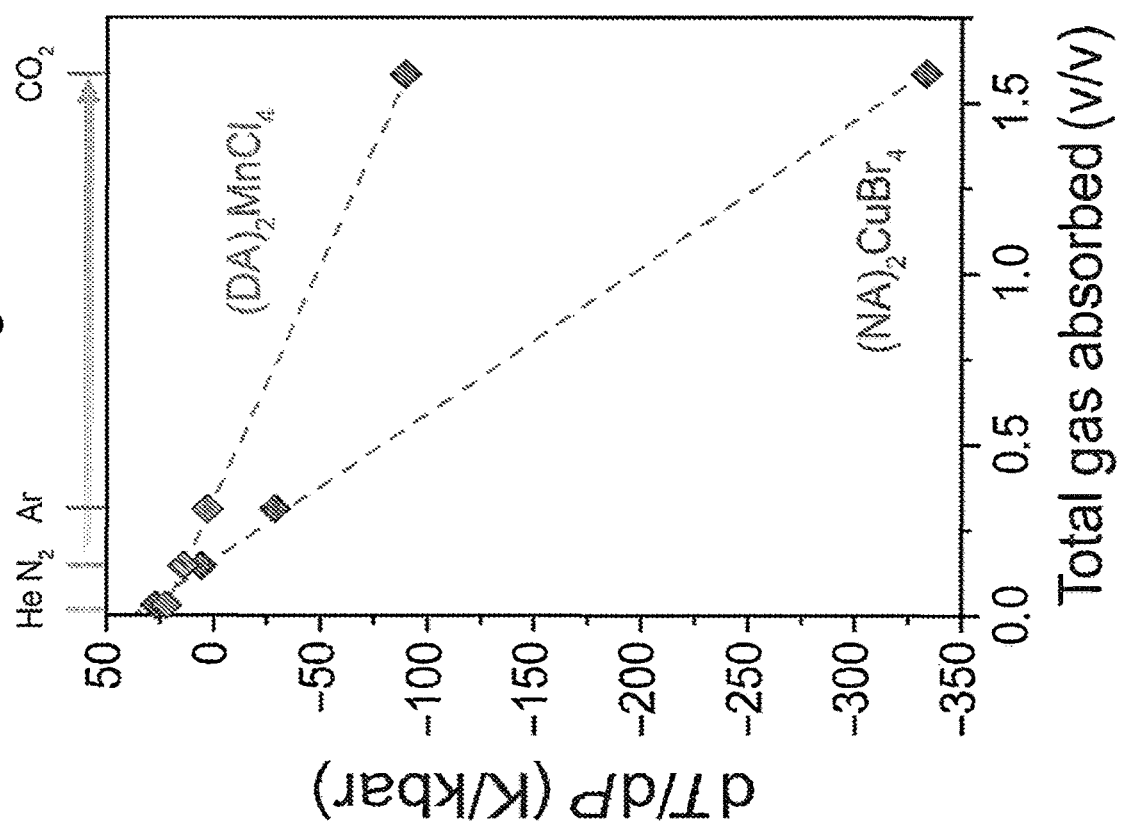
FIG. 15 shows an example relationship between gas solubility and magnitude of inverted barocaloric effects for $(DA)_2MnCl_4$ and $(NA)_2CuBr_4$. The total gas is estimated as volume of gas dissolved in n-decane at 298 K and 1 bar.

The impact of a $CO_2$ PTM was smaller for $(DA)_2MnCl_4$; however, this effect was still strong enough to induce an inverted barocaloric effect, with a pressure sensitivity of $-77$ K kbar$^{-1}$ (heating) and $-126$ K kbar$^{-1}$ (cooling) (FIG. 14). Without being bound by a particular theory, the trends observed for $(DA)_2MnCl_4$ and $(NA)_2CuBr_4$, shown in FIG. 15, suggested that that the inverted barocaloric effects arose from the gas solubility effects and that materials with larger free volumes become more sensitive.

Example 3

Figure 16B:
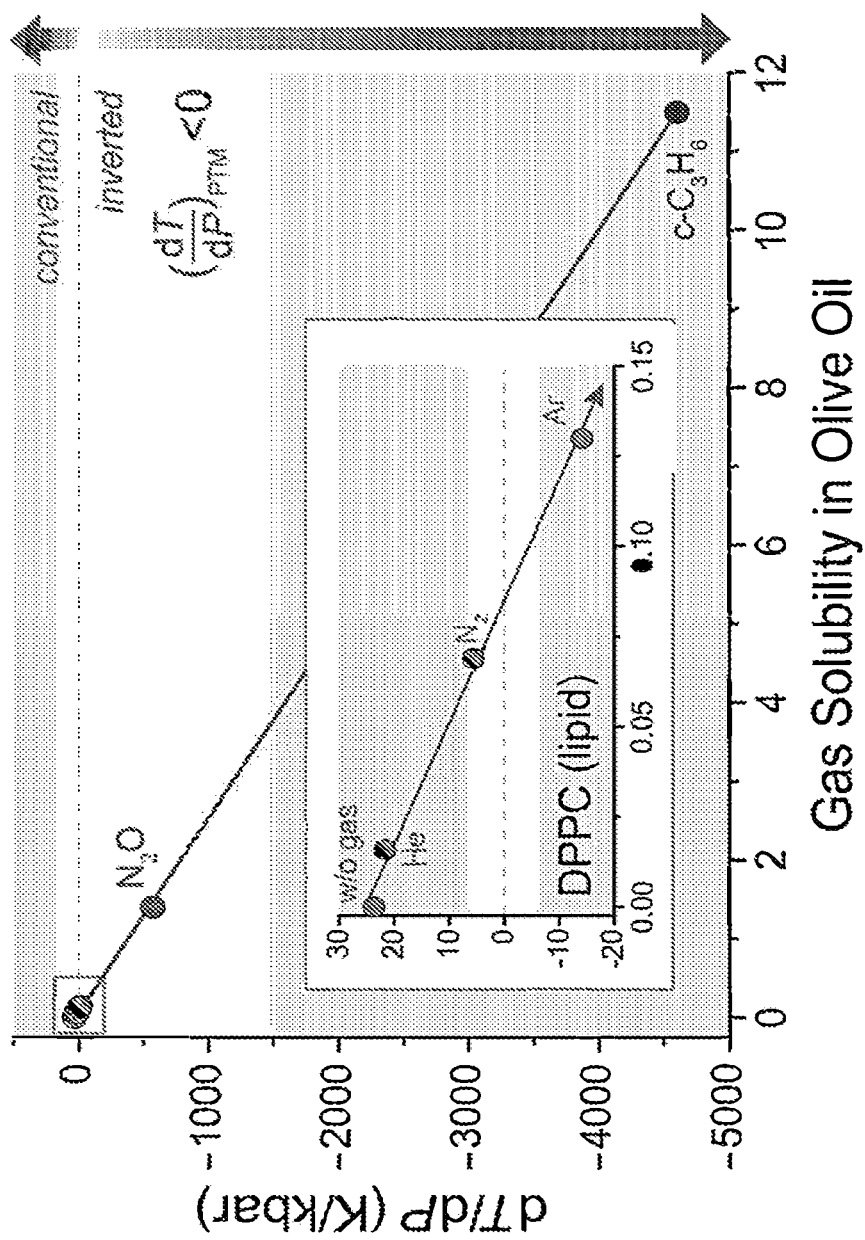
FIG. 16b shows an example correlation between dT/dP and gas solubility in a phospholipid bilayer (DPPC). The mesophasic transitions in lipid bilayers can become pressure-sensitive under gaseous pressure media with high oil solubility, such as nitrous oxide ($N_2O$) and cyclopropane (c-$C_3H_6$). The gas solubility values correspond to Ostwald solubility coefficients, which denote solubility (mL gas/mL solvent) measured for 1 atm partial pressure at 298 K. These values were taken from the IUPAC Solubility Data Series. This correlation plot shows that hydrocarbon order-disorder transitions, including those in 2-D perovskites, can become pressure-sensitive under pressure transmitting medium whose solubility is on par with those of anesthetic agents.
Figure 17:
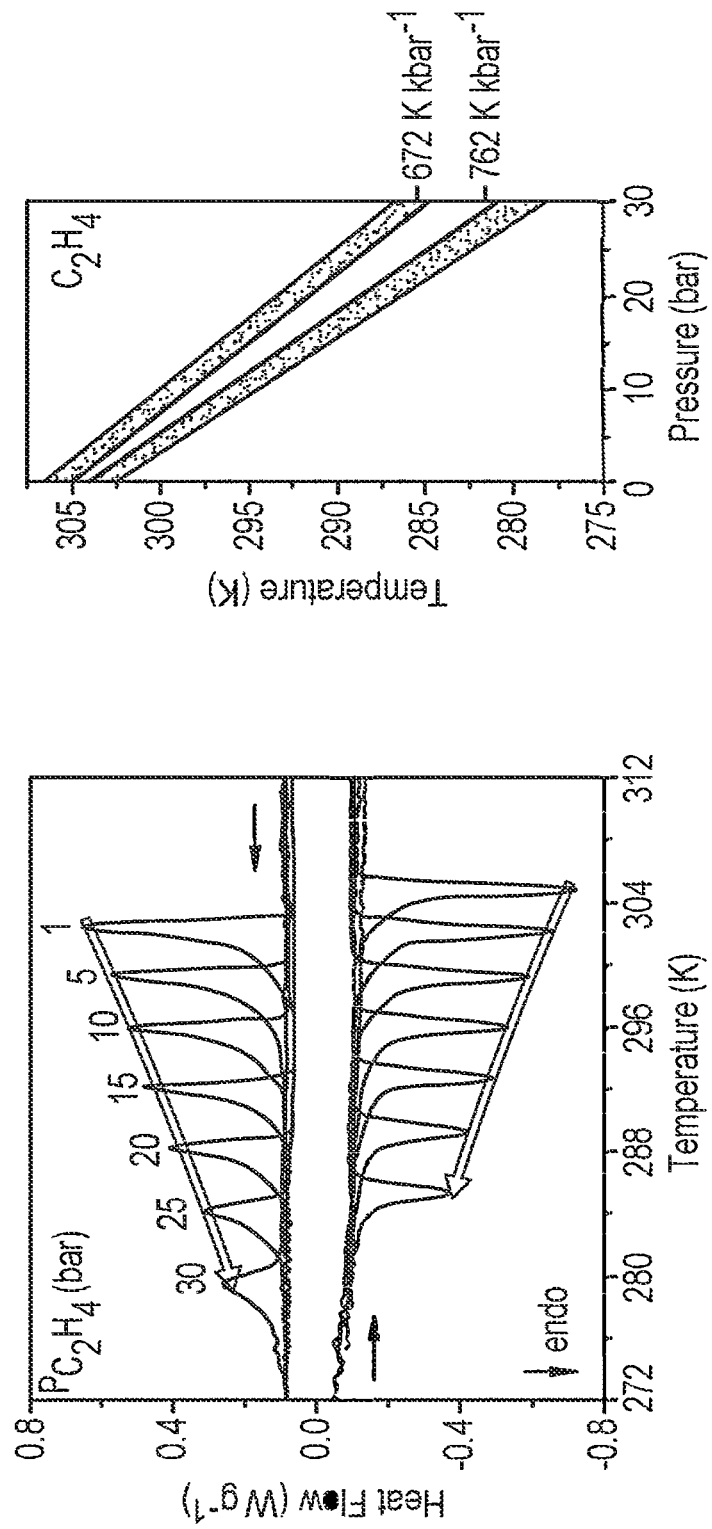
FIG. 17 shows example results of an isobaric high-pressure calorimetry experiment for $(NA)_2CuBr_4$ under $C_2H_4$. Heat flow traces (left) and pressure-temperature phase diagram (right) indicates large inversion of barocaloric effects by $C_2H_4$ PTM.
Figure 18:
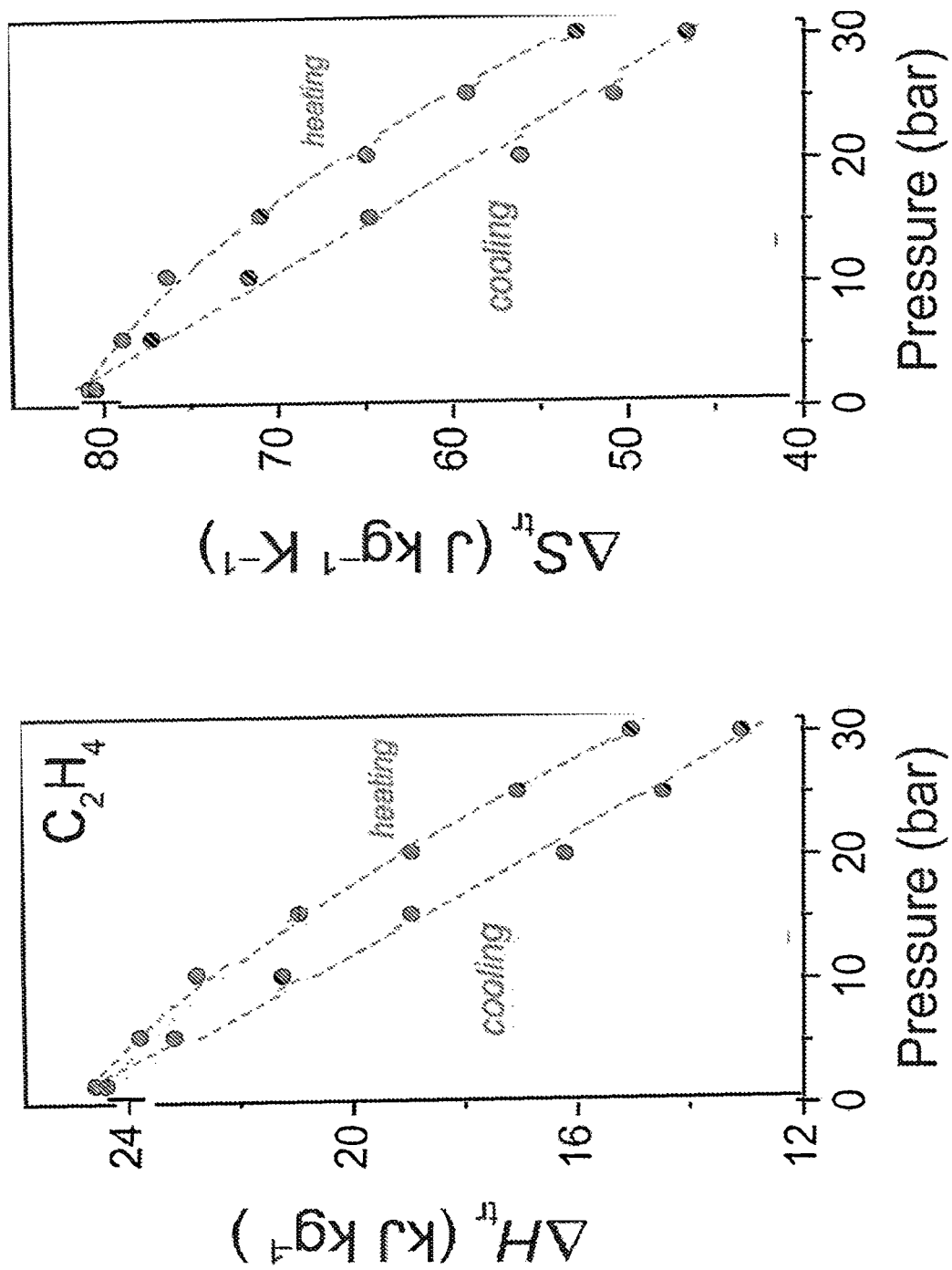
FIG. 18 shows an example of the dependence of enthalpy changes (left) and entropy changes (right) of transition for $(NA)_2CuBr_4$ to $C_2H_4$ pressure.
Figure 19:
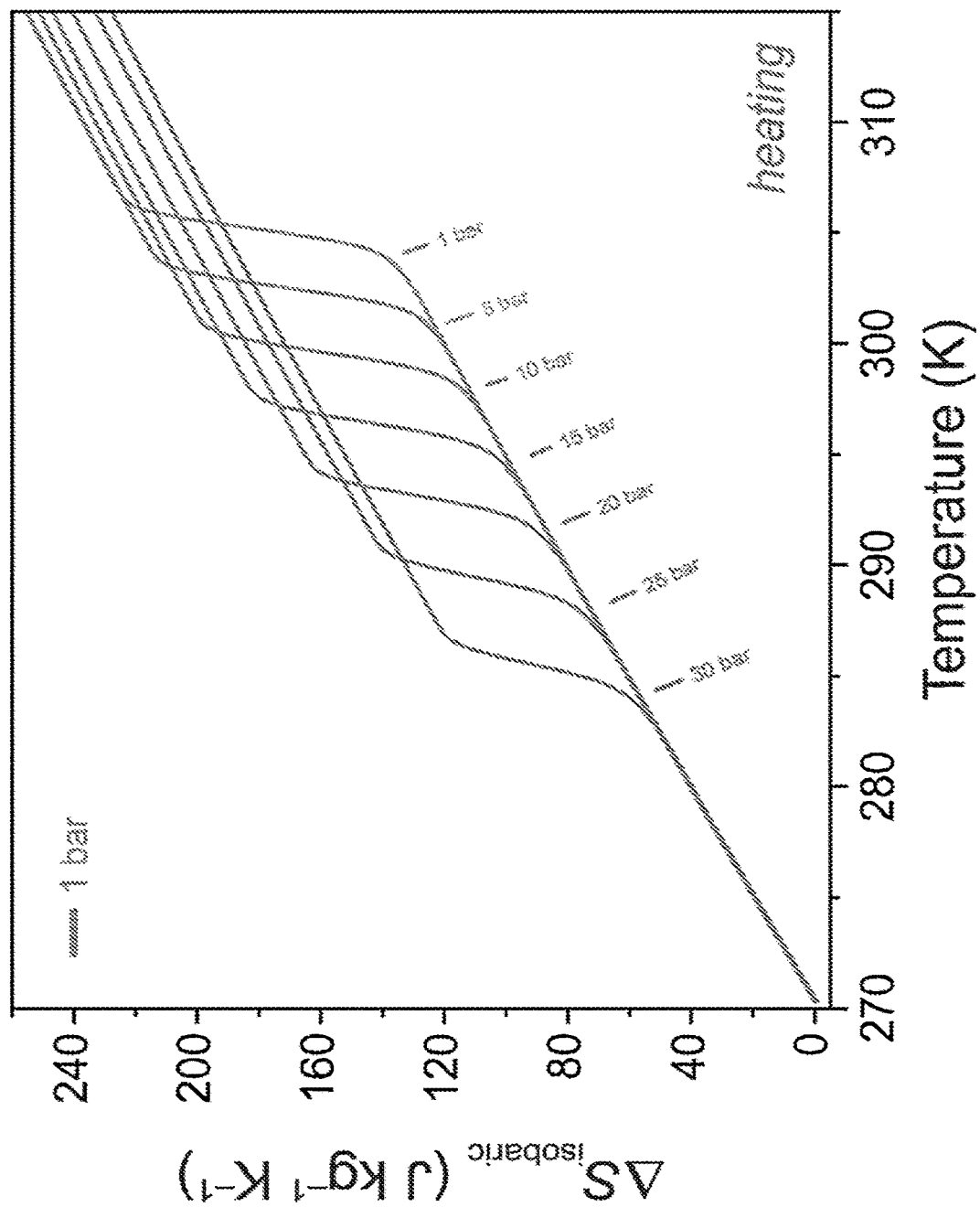
FIG. 19 shows an example of the isobaric entropy changes ($\Delta S_{isobaric}$) associated with the phase transition of $(NA)_2CuBr_4$ under $C_2H_4$ as a function of temperature in the pressure range of 1 bar to 30 bar during heating.
Figure 20:
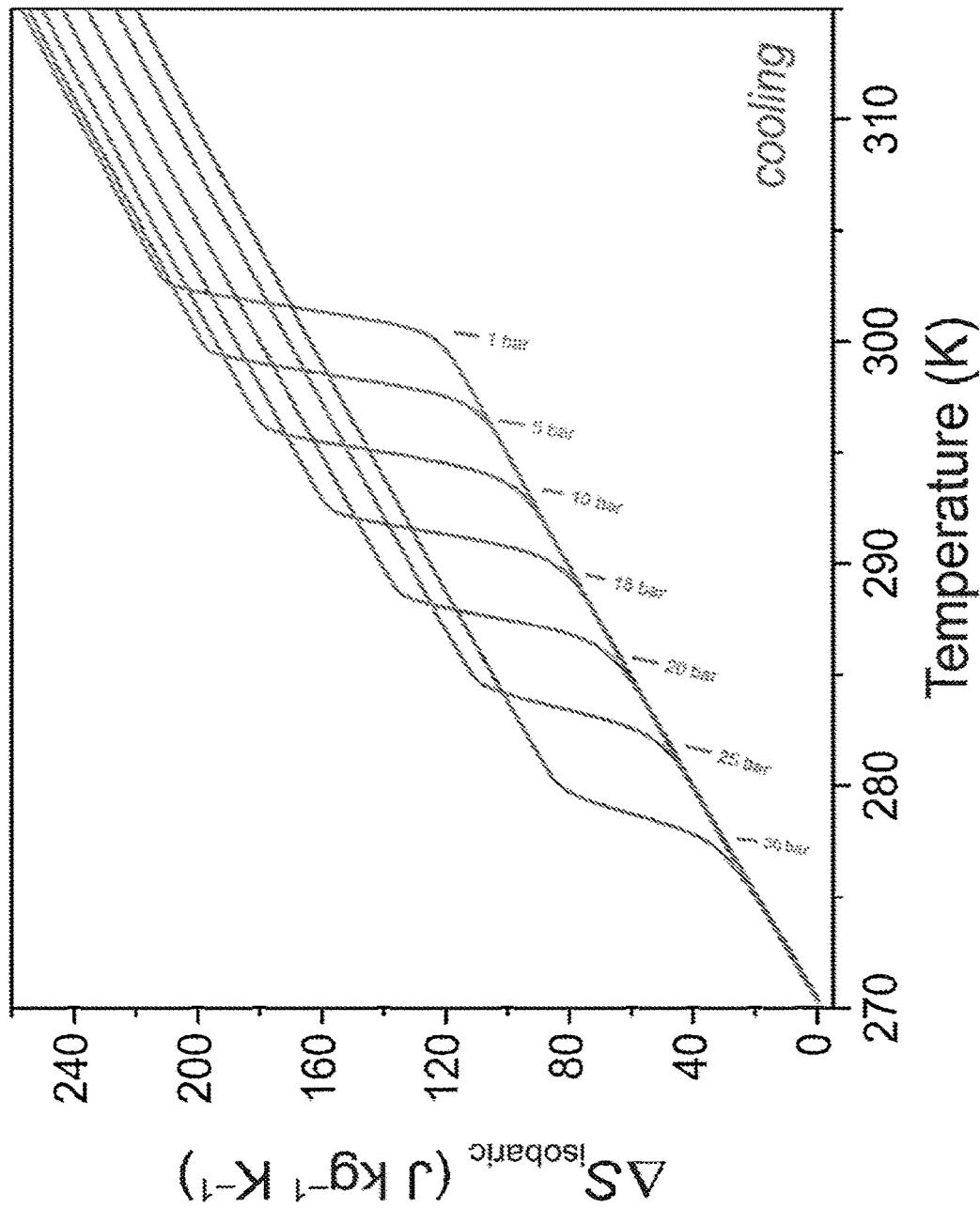
FIG. 20 shows an example of the isobaric entropy changes ($\Delta S_{isobaric}$) associated with the phase transition of $(NA)_2CuBr_4$ under $C_2H_4$ as a function of temperature in the pressure range of 1 bar to 30 bar during cooling.
Figure 21:
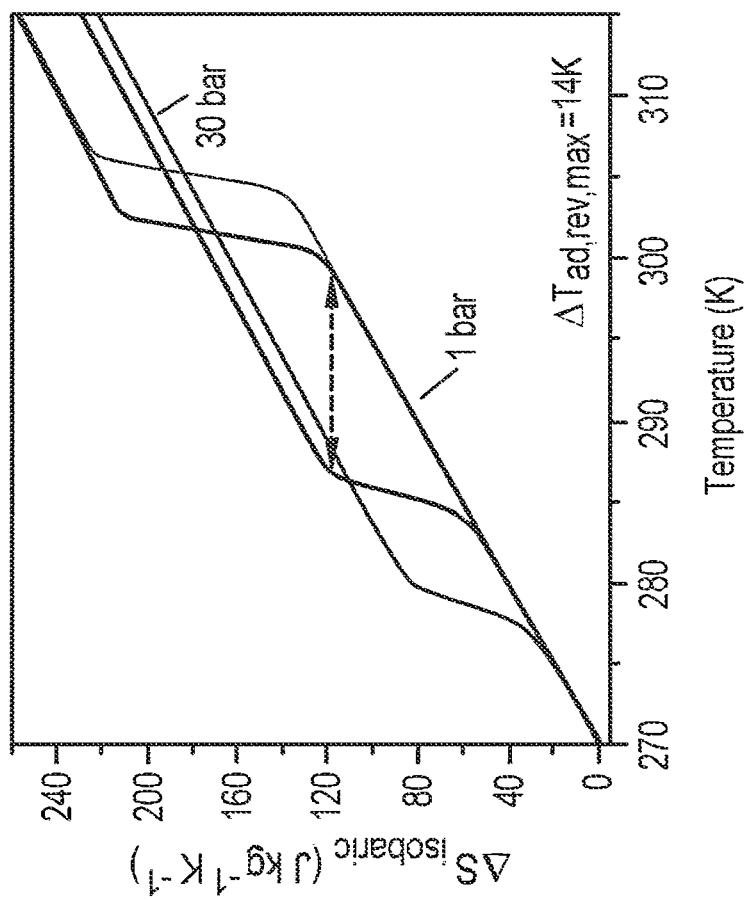
FIG. 21 shows an example of the isobaric entropy changes ($\Delta S_{isobaric}$) associated with the phase transition of $(NA)_2CuBr_4$ during heating and cooling, at 1 bar and 30 bar $C_2H_4$. The area between $\Delta S_{isobaric}$ (T, 30 bar) heating and $\Delta S_{isobaric}$ (T, 1 bar) cooling curves denote the temperature range over which both reversible isothermal entropy changes and reversible adiabatic temperature ($\Delta T_{ad,rev}$) changes are accessible. $\Delta T_{ad,rev}$ over 14 K can be induced at 30 bar pressure swing.

To further explore upper limits for inverted barocaloric effects, the pressure dependence of barocaloric chain-melting transitions in ethylene ($C_2H_4$) was evaluated. Ethylene can have a large solubility in lipid membranes and liquid alkanes (FIG. 16a). The correlation between pressure sensitivity and gas solubility suggests that pressure sensitivity on the order of $-5000$ K kbar$^{-1}$ can be achieved for a certain pressure-transmitting medium, such as cyclopropane (c-$C_3H_6$) (FIG. 16b). Isobaric high-pressure calorimetry experiments revealed that the use of ethylene as PTM can drive inverted barocaloric effects in 2-D perovskites. $(NA)_2CuBr_4$ displayed a pressure sensitivity of $-672$ K kbar$^{-1}$ (heating) and $-762$ K kbar$^{-1}$ (cooling) (FIG. 17), and this transition was accompanied by a reduction in enthalpy and entropy changes (FIG. 18). As shown in FIGS. 19-21, evaluation of isobaric entropy curves illustrated that the driving pressure of 7 bar was sufficient to overcome the hysteresis loop and reversibly induce adiabatic temperature changes. At the driving pressure of 30 bar, adiabatic temperature changes ($\Delta T_{ad}$) of 20 K can be induced, with a maximum reversible temperature change of 14 K in this example. Note that $\Delta T_{ad}$ of 20 K is approaching the maximum $\Delta T_{ad}$ available for $(NA)_2CuBr_4$. To induce $\Delta T_{ad}$ of 20 K using conventional barocaloric effects (i.e., compression using a PTM that does not interact with the matrix) would have required a pressure change of nearly 800 bar.

Figure 22A:
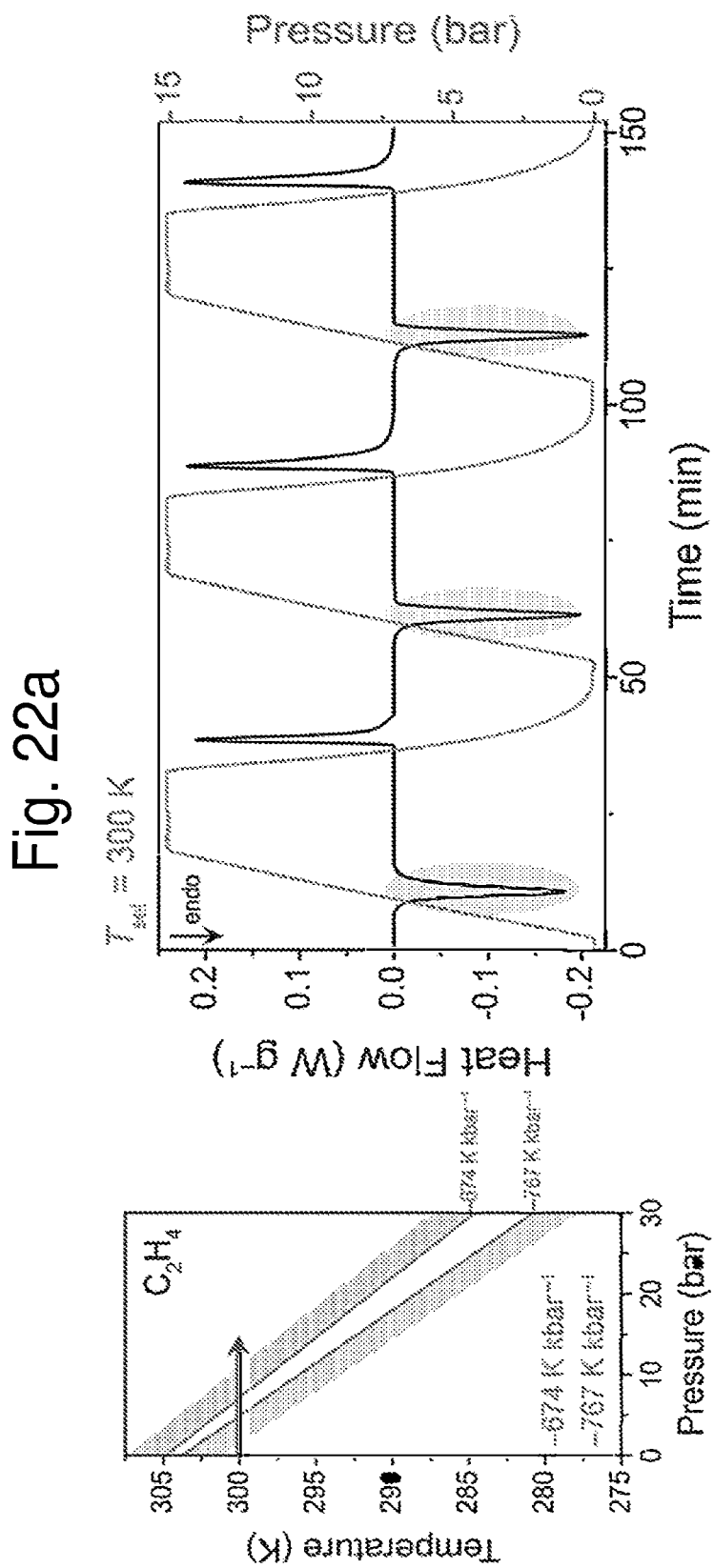
FIGS. 22a-22b show an example of a direct evaluation of inverted barocaloric effects in $(NA)_2CuBr_4$ under $C_2H_4$ PTM using isothermal high-pressure calorimetry experiments.
Figure 22B:
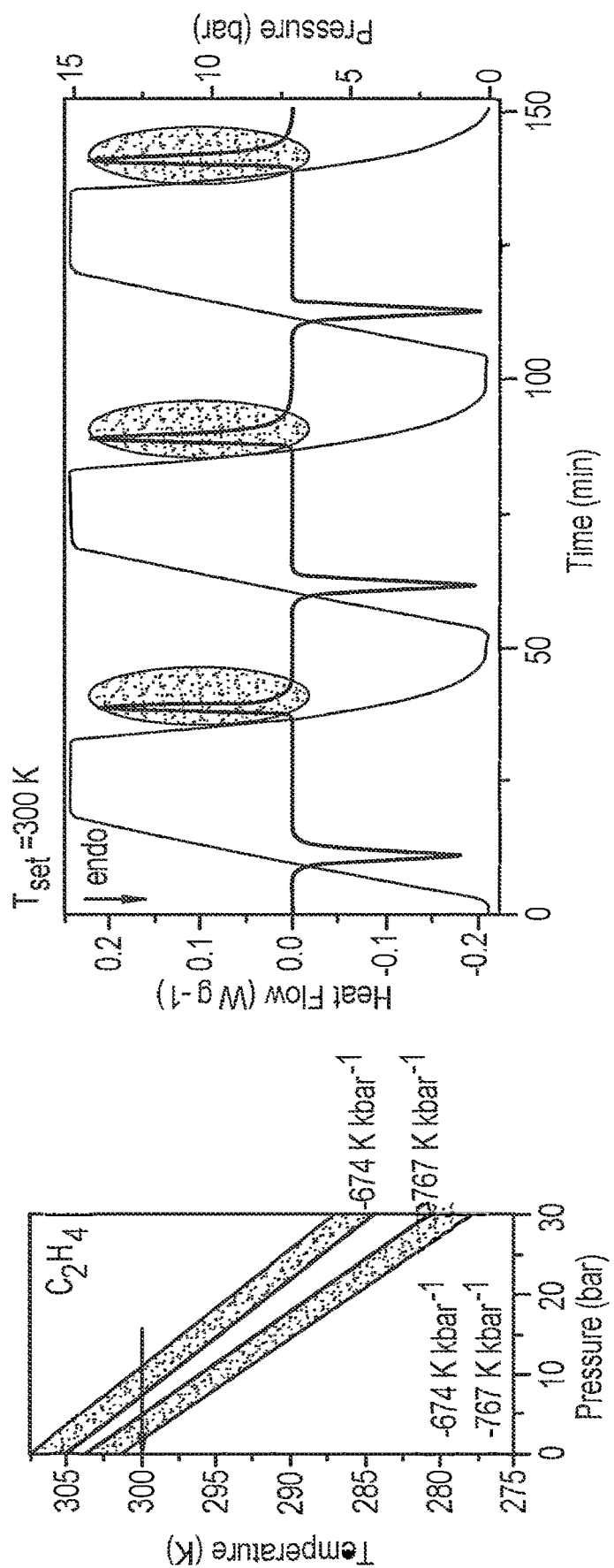
Figure 23:
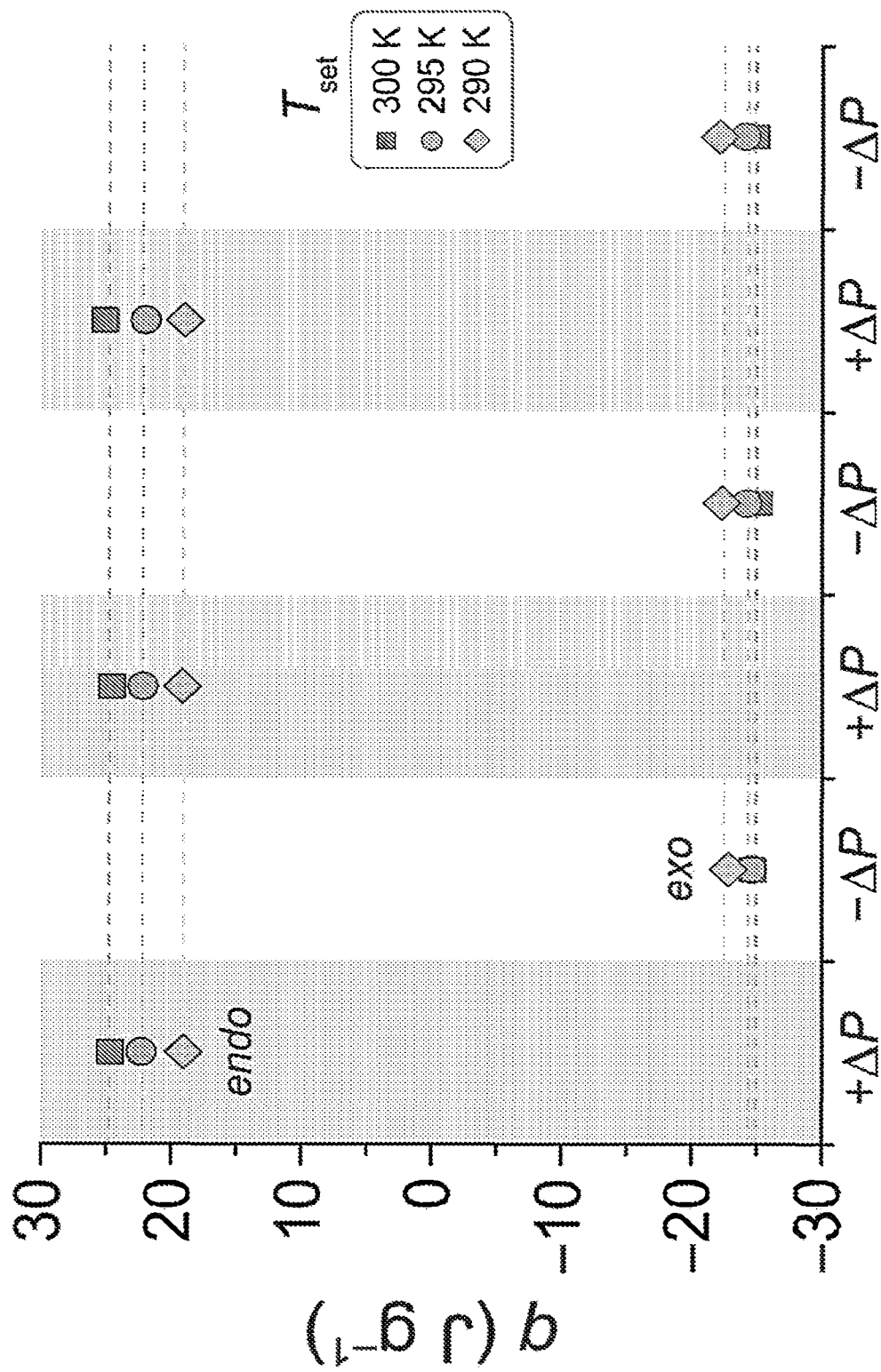
FIG. 23 shows example transition enthalpies directly measured from isothermal pressure swing experiments for $(NA)_2CuBr_4$ under $C_2H_4$ PTM.
Figure 24:
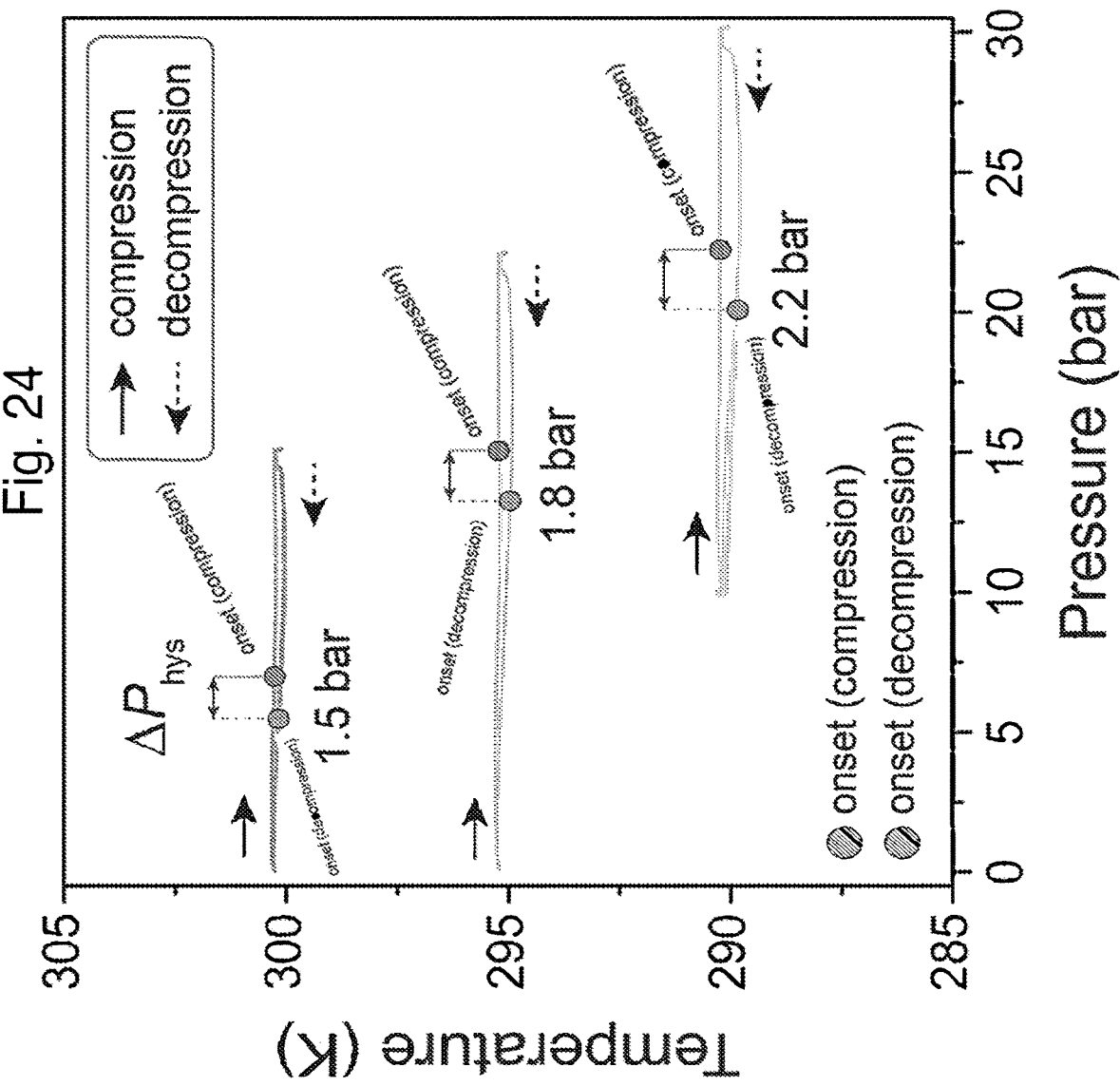
FIG. 24 shows an example of a direct evaluation of inverted barocaloric effects in $(NA)_2CuBr_4$ under $C_2H_4$ PTM using isothermal high-pressure calorimetry experiments. The pressure and temperature of the sample during the pressure cycling experiment are plotted, and the onset pressures and temperatures for compression-induced endotherms and decompression-induced exotherms are marked with red and blue circles, respectively. Pressure hysteresis ($\Delta P_{hys}$) is calculated as the difference between the onset pressures and is indicated by an arrow.
Figure 25:
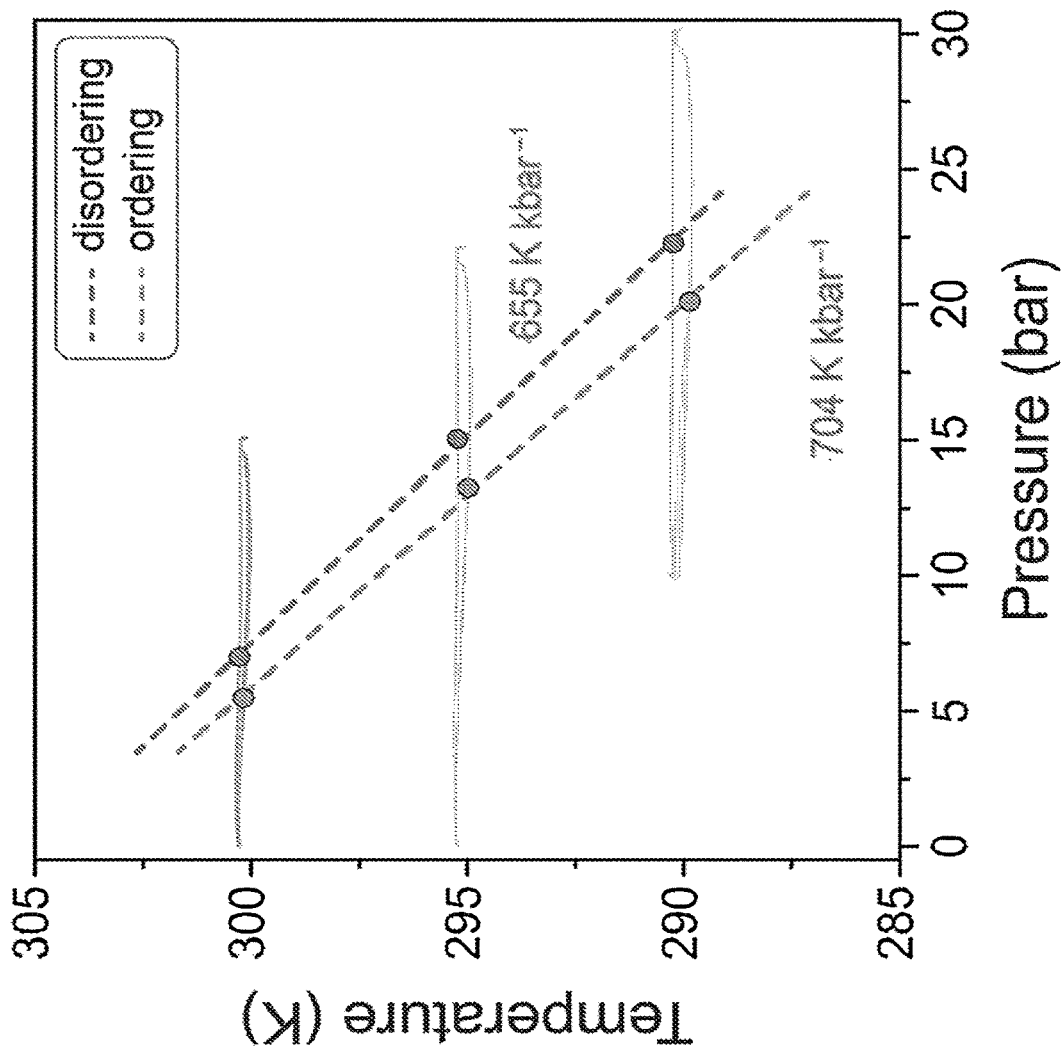
FIG. 25 shows an example of a pressure-temperature phase diagram for $(NA)_2CuBr_4$ under $C_2H_4$. The phase diagram was mapped by measuring the temperature dependence of onset pressures (dT/dP) via isothermal high-pressure calorimetry experiments. The upper and lower dashed lines correspond to phase boundaries for compression-induced disordering and decompression-induced ordering transitions, respectively. In this example, the dT/dP values obtained from isothermal experiments agree with those measured from isobaric experiments.

Inverted barocaloric effects in $(NA)_2CuBr_4$ by $C_2H_4$ pressures were directly evaluated by quasi-isothermal calorimetry experiments. Across a wide temperature window (290-300 K), phase transitions were driven reversibly—in full—with small shifts in pressure (<20 bar) (FIGS. 22 and 23), and the pressure hysteresis associated with the inverted barocaloric effects were extremely small (1.5-2.2 bar) (FIG. 24). The phase boundaries were mapped on a (P, T) diagram for inverted barocaloric transitions (FIG. 25) by measuring the temperature dependence of transition pressures through pressure cycling experiments at three different temperatures (290, 295, and 300 K). These phase boundaries showed excellent agreement with those obtained from isobaric experiments.

Figure 26:
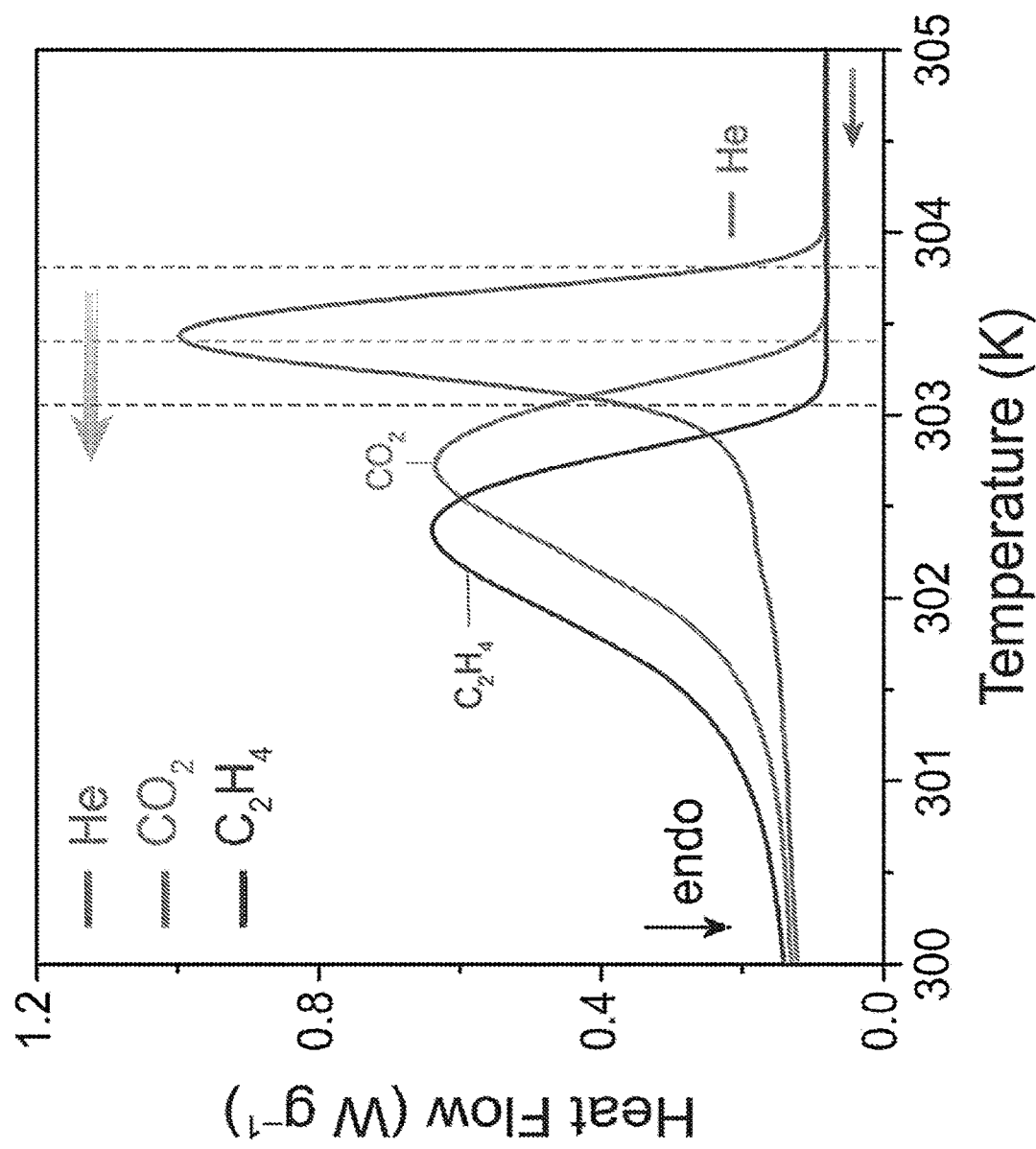
FIG. 26 shows an example of the impact of gas solubility on phase transition temperatures for $(NA)_2CuBr_4$ at ambient pressure (1 bar). The cooling transitions are shown.
Figure 27A:
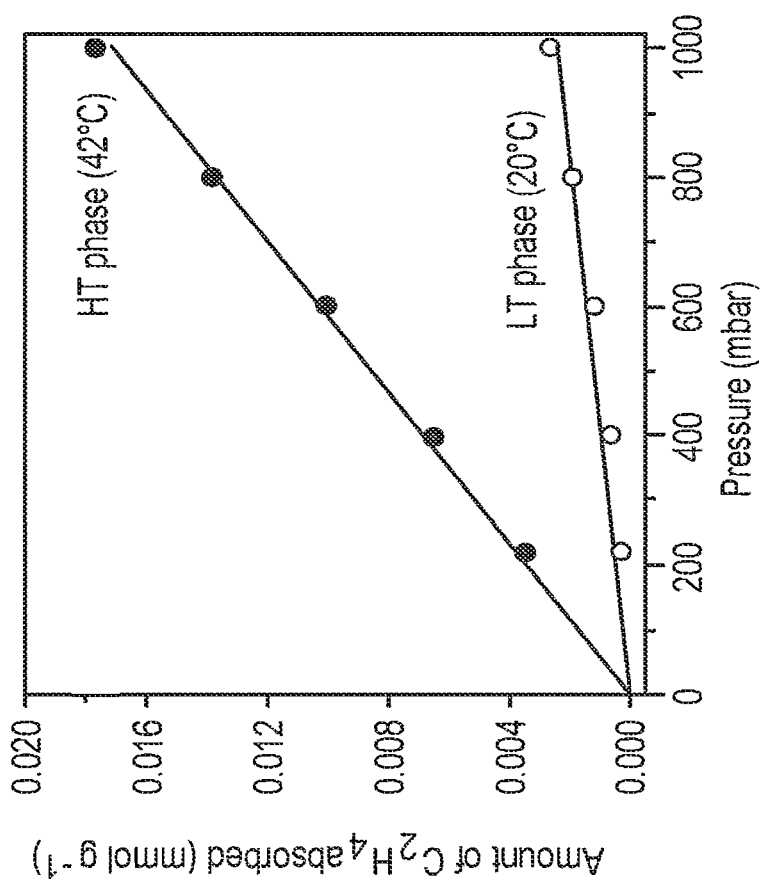
FIG. 27a shows an example of the amount of $C_2H_4$ absorbed in terms of mmol $C_2H_4$ per gram of barocaloric material (left) $(C_8)_2Br$ [$(C_8)_2$=dioctylammonium], (center) $(C_9)_2CuBr_4$ [$C_9$=nonylammonium] and (right) $(C_{10})_2MnCl_4$ [$C_{10}$=decylammonium] as a function of pressure above transition (upper trace; high-temperature disordered phase) and below transition (lower trace; low-temperature ordered phase).
Figure 27B:
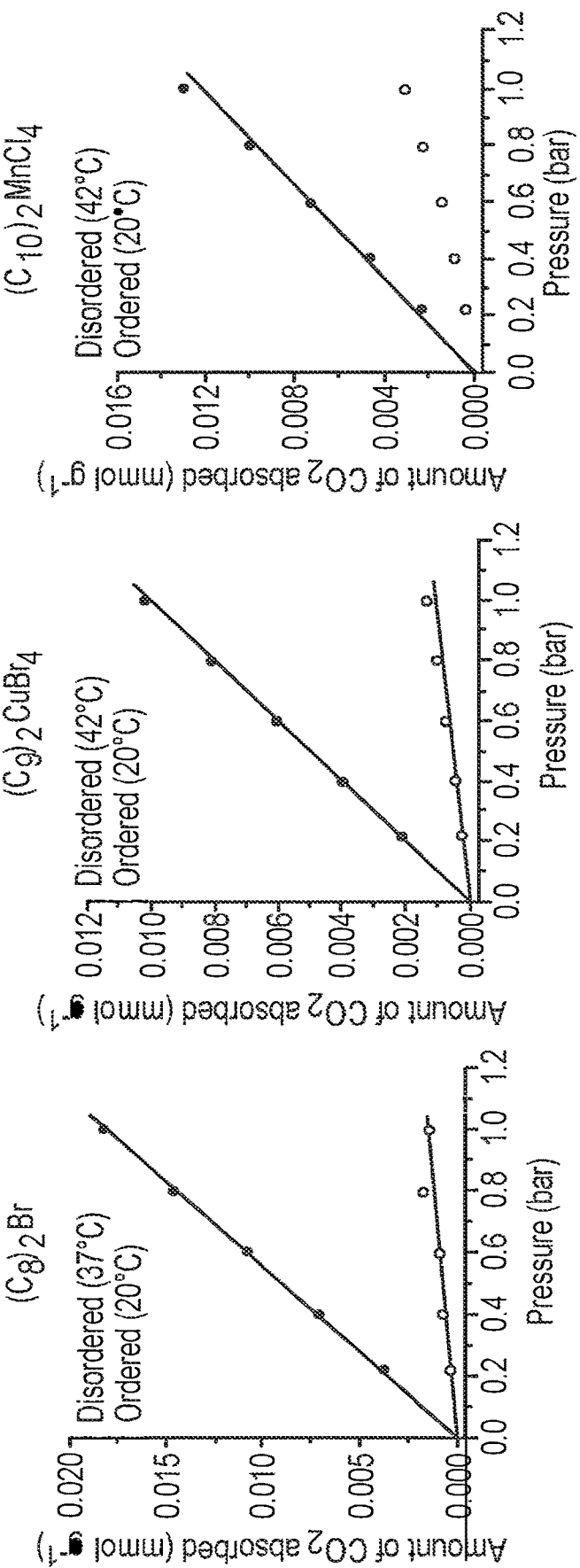
FIG. 27b shows an example of the amount of $CO_2$ absorbed in terms of mmol $CO_2$ per gram of barocaloric material (left) $(C_8)_2Br$ [$(C_8)_2$=dioctylammonium], (center) $(C_9)_2CuBr_4$ [$C_9$=nonylammonium] and (right) $(C_{10})_2MnCl_4$ [$C_{10}$=decylammonium] as a function of pressure above transition (upper trace; high-temperature disordered phase) and below transition (lower trace; low-temperature ordered phase).

The solubility effect was strong enough that it led to a noticeable shift in transition temperatures at 1 bar for $(NA)_2CuBr_4$ (FIG. 26). Gas absorption measurements directly confirmed that the solubility of pressure-transmitting gas molecules was larger for disordered chains than ordered chains for layered barocaloric solids (FIGS. 27a-27b).

Figure 28B:
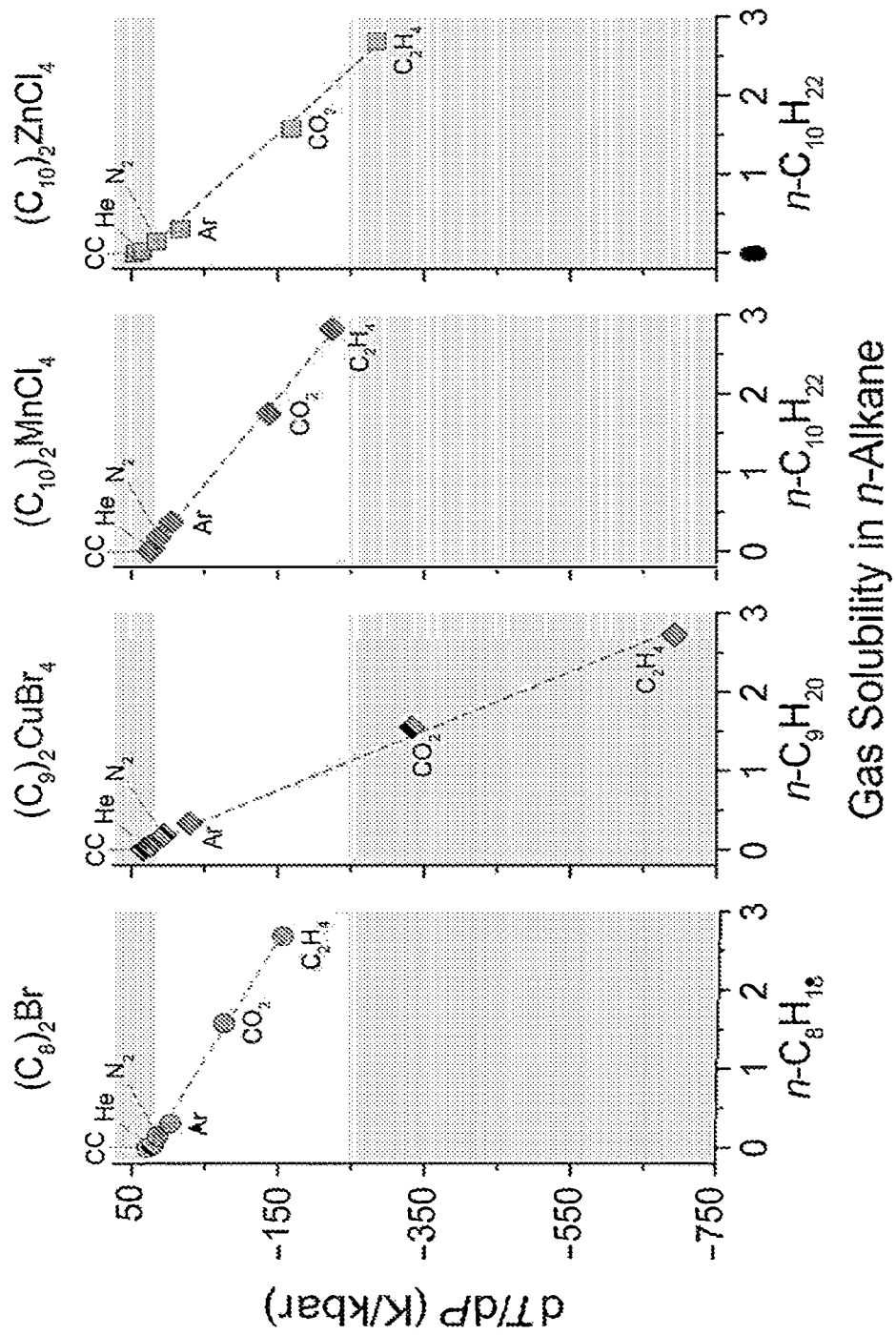
FIG. 28b shows example pressure sensitivity (dT/dP) of $(C_8)_2Br$ [$(Ca)_2$=dioctylammonium], $(C_9)_2CuBr_4$ [$C_9$=nonylammonium], $(C_{10})_2MnCl_4$ [$C_{10}$=decylammonium], and $(C_{10})_2ZnCl_4$ [$C_{10}$=decylammonium] for various gas PTM (Sealed (CC), He, $N_2$, Ar, $CO_2$, $C_2H_4$). Transition temperatures measured for heating transitions are shown. These four compounds, which represent different types of crystalline layered solids, can all display inverted barocaloric effects, and their pressure sensitivity can be directly proportional to the solubility in hydrocarbon media. Notably, under soluble PTM ($CO_2$, $C_2H_4$), these compounds can become ultra-sensitive to pressure, with dT/dP<−100 K/kbar.

Other types of crystalline solids with long-chain hydrocarbons—beyond two-dimensional perovskites—all displayed inverted barocaloric effects (FIG. 28a). For example, $(C_{10})_2ZnCl_4$ ($C_{10}$=decylammonium) is an organic-inorganic hybrid material that undergoes reversible order-disorder transitions (between an ordered phase with interdigitated organic bilayers and an expanded, disordered phase with non-interdigitated bilayers). Furthermore, di-n-alkylammonium halide salt (n-$C_8H_{17}$)$_2$NH$_2$Br(($C_8$)$_2$Br) is an all-organic layered material that undergoes high-entropy order-disorder transitions. Similar to 2-D perovskite, these compounds also feature bilayers of long chain hydrocarbons (from $C_8$ to $C_{10}$) templated either through charge-assisted hydrogen bonds [($C_8$)$_2$Br] or by isolated metal-halide tetrahedra [($C_{10}$)$_2$ZnCl$_4$]. Both compounds also display strong inverted barocaloric effects under soluble PTM such as $CO_2$ and $C_2H_4$ (FIG. 28b).

Figure 29:
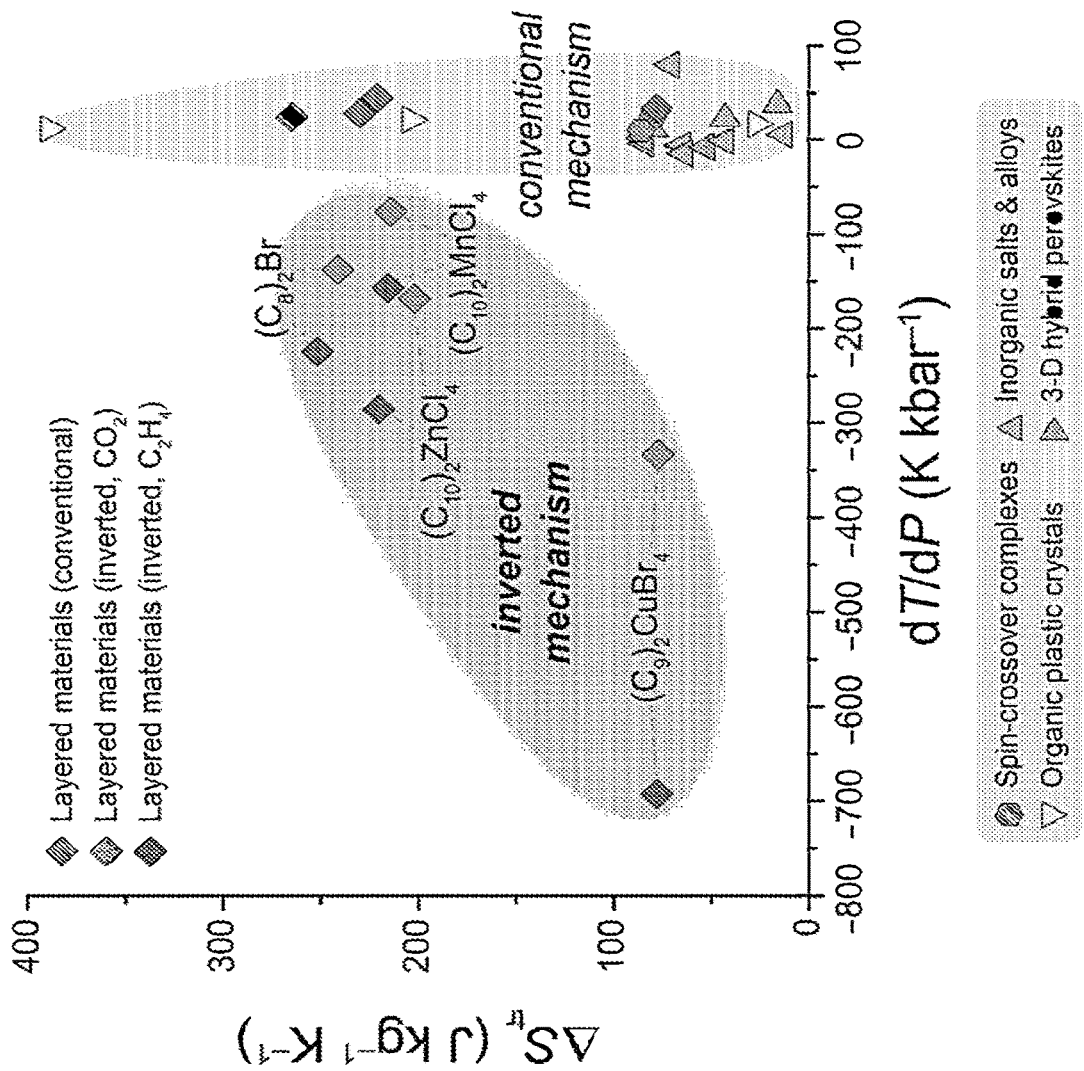
FIG. 29 shows example comparisons of the phase-change entropy ($\Delta S_{tr}$) and pressure sensitivity (dT/dP) for different classes of barocaloric materials.
Figure 30B:
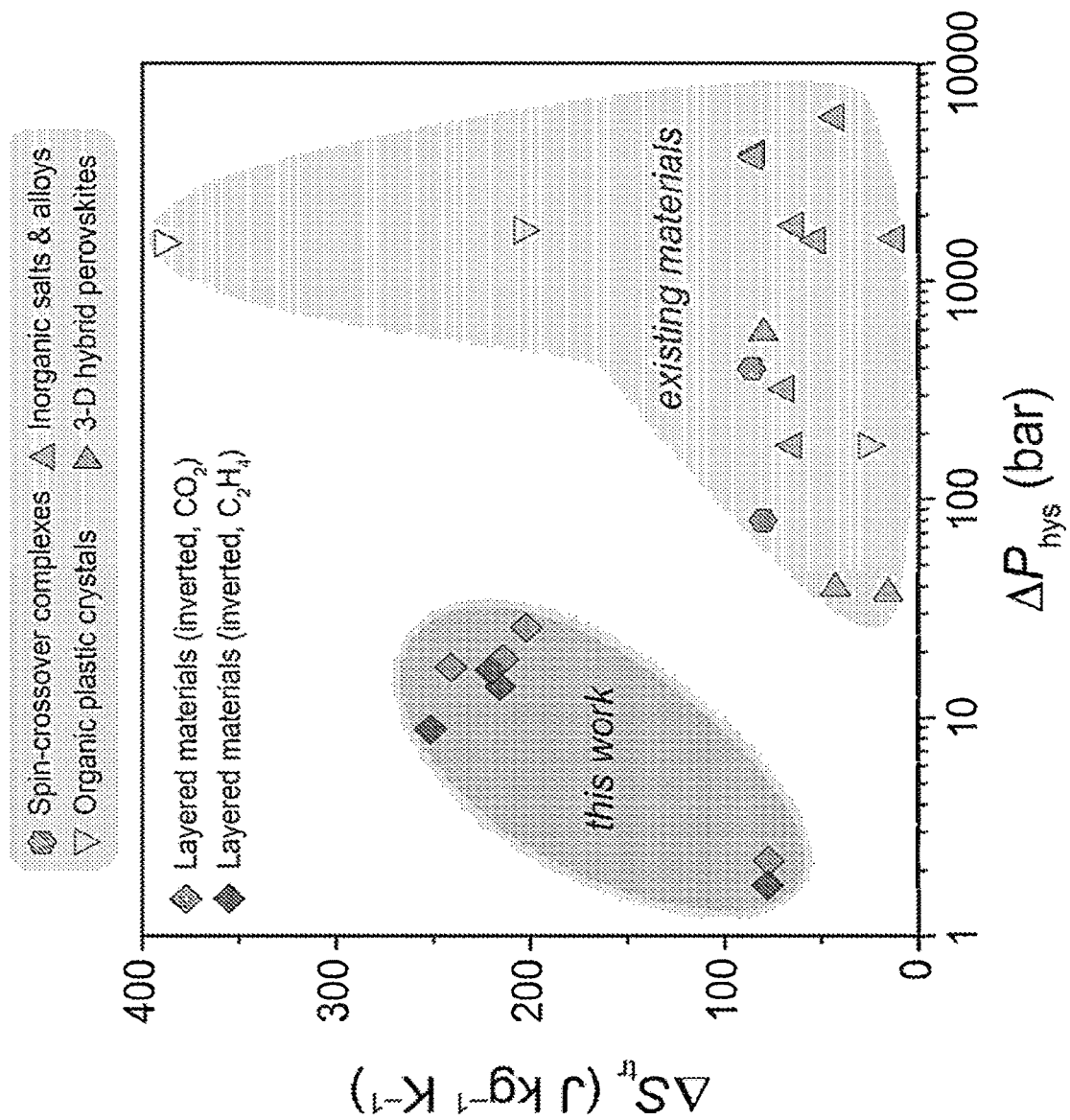
FIG. 30b shows example comparisons of transition entropy changes ($\Delta$Str) and pressure hysteresis ($\Delta$Str) for barocaloric materials.

The transition entropy changes and pressure sensitivity achievable through barocaloric inversion in these layered materials are compared with those measured in conventional barocaloric materials (FIG. 29). This comparison demonstrates that accessing the combination of entropy changes of this magnitude (>200 J K$^{-1}$ kg$^{-1}$) and ultrahigh pressure sensitivity (100-800 K kbar$^{-1}$) may be unprecedented in the field of barocaloric materials. Pressure sensitivity and pressure hysteresis for these layered barocaloric solids are also compared for various PTM, from helium that induces conventional barocaloric effects to $CO_2$ and $C_2H_4$ that induce inverted barocaloric effect (FIG. 30a). This comparison shows that the use of $CO_2$ and $C_2H_4$ PTM also inverts and enhances the pressure sensitivity of layered barocaloric solids by an order of magnitude, with dT/dP below −100 K kbar$^{-1}$ ($CO_2$) and −200 K kbar$^{-1}$ ($C_2H_4$). Due to the ultra-high pressure sensitivity, they all display $\Delta P_{hys}$ on the order of 10 bar-9-18 bar for ($C_8$)$_2$Br; 10-19 bar for ($C_{10}$)$_2$MnCl$_4$; and 17-26 bar for ($C_{10}$)$_2$ZnCl$_4$. This comparison shows that driving inverted barocaloric effects through the use of soluble PTM allows one to overcome transition hysteresis and induce large reversible thermal changes at extremely low pressures (FIG. 30b).

Other embodiments may be in the claims.

The invention claimed is:

1. A method of transferring energy comprising:
applying pressure to a working material with a pressure transmitting medium (PTM) comprising a hydrocarbon fluid, carbon dioxide, or a combination thereof, the working material comprising a plurality of layers, each layer of the plurality of layers comprising a hydrocarbon chain component;
wherein, while the pressure is applied, the PTM is absorbed into the working material, thereby driving a reversible phase transition of the working material, wherein the reversible phase transition is an order-to-disorder transition.

2. The method of claim 1, wherein the working material can absorb a greater amount of the PTM in a disordered phase compared to an ordered phase.

3. The method of claim 1, wherein the phase transition is substantially isothermal or substantially adiabatic.

4. The method of claim 3, wherein the reversible phase transition:
(i) is substantially isothermal;
(ii) is endothermic; and
(iii) increases the entropy of the working material.

5. The method of claim 3, wherein the phase transition:
(i) is substantially adiabatic; and
(ii) decreases the temperature of the working material.

6. The method of claim 1, wherein the pressure applied to the working material is less than 100 bar.

7. The method of claim 6, wherein the pressure applied to the working material is greater than 0.5 bar and less than 40 bar.

8. The method of claim 1, further comprising lowering a transition temperature of the working material.

9. The method of claim 1, further comprising transferring energy from a heat source to the working material.

10. The method of claim 1, further comprising, decreasing pressure applied to the working material with the PTM.

11. The method of claim 10, wherein the decreasing pressure releases less than 100 bar of pressure.

12. The method of claim 10, further comprising desorbing the PTM from the working material.

13. The method of claim 10, further comprising driving an additional reversible phase transition of the working material, wherein the additional reversible phase transition is a disorder-to-order phase transition.

14. The method of claim 13, wherein the additional reversible phase transition is substantially isothermal or substantially adiabatic.

15. The method of claim 14, wherein the additional reversible phase transition:
(i) is substantially isothermal;
(ii) is exothermic; and
(iii) decreases the entropy of the working material.

16. The method of claim 14, wherein the additional reversible phase transition:
(i) is substantially adiabatic; and
(ii) increases the temperature of the working material.

17. The method of claim 13, further comprising transferring energy from the working material to a heat sink.

18. The method of claim 17, wherein the transferring energy from the working material to the heat sink comprises transferring energy from the working material to the PTM and transferring energy from the PTM to the heat sink.

19. The method of claim 1, wherein the hydrocarbon chain component of the working material comprises greater than or equal to three carbon atoms.

20. The method of claim 19, wherein the hydrocarbon chain component comprises an organic molecule portion with the formula $C_nH_{2n+1}$, wherein n is greater than or equal to 4 and less than or equal to 36.

21. The method of claim 1, wherein the order-to-disorder transition is a solid-solid phase transition or a solid-liquid phase transition.

22. The method of claim 1, wherein the working material comprises a soft organic salt.

23. The method of claim 1, wherein the working material comprises a matrix comprising organic layers comprising compounds of formula (I):

(I)

and a counterion, wherein $R_1$ and $R_2$ are optionally substituted hydrocarbon groups, and A=N or P.

24. The method of claim 1, wherein the working material further comprises a mixture of materials.

25. The method of claim 1, wherein the working material further comprises a polymer.

26. The method of claim 1, wherein the PTM comprises one or more of ethane, propane, n-butane, 2-methylpropane, n-pentane, ethene, or propene.

27. The method of claim 1, wherein a pressure sensitivity of the working material is less than −50 K/kbar.

28. The method of claim 1, wherein the pressure transmitting medium is a gas and comprises a solubility in n-decane of at least 0.10 volume of gas per volume of n-decane at atmospheric pressure.

29. The method of claim 1, wherein the working material comprises an organic polymer that comprises the plurality of layers.

30. A system, comprising:
a chamber;
a working material disposed in the chamber, the working material comprising a plurality of layers, each layer of the plurality of layers comprising a hydrocarbon chain component;
a pressure transmitting medium (PTM) disposed in the chamber, the PTM comprising a hydrocarbon fluid, carbon dioxide, or a combination thereof; and
a pressure source configured to apply pressure to the working material with the pressure transmitting medium, wherein, while the pressure is applied, the PTM is absorbed into the working material, thereby driving a reversible phase transition of the working material, wherein the reversible phase transition is an order-to-disorder transition.

* * * * *